United States Patent
Suino et al.

(10) Patent No.: US 7,522,778 B2
(45) Date of Patent: Apr. 21, 2009

(54) IMAGE DECODING TECHNIQUE FOR SUPPRESSING TILE BOUNDARY DISTORTION

(75) Inventors: Tooru Suino, Kanagawa (JP); Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/980,580

(22) Filed: Oct. 31, 2007

(65) Prior Publication Data

US 2008/0131013 A1 Jun. 5, 2008

Related U.S. Application Data

(63) Continuation of application No. 10/600,333, filed on Jun. 23, 2003, now Pat. No. 7,330,596.

(30) Foreign Application Priority Data

| Jul. 17, 2002 | (JP) | ............................. 2002-208107 |
| Jul. 17, 2002 | (JP) | ............................. 2002-208156 |
| Sep. 13, 2002 | (JP) | ............................. 2002-267692 |

(51) Int. Cl.
*G06K 9/36* (2006.01)
*G06K 9/46* (2006.01)
(52) U.S. Cl. ...................... 382/240; 382/232; 382/233; 382/236; 382/245; 382/246
(58) Field of Classification Search ................ 382/232, 382/233, 236, 238, 239, 240, 245, 246, 248, 382/250, 251, 275
See application file for complete search history.

(56) References Cited

U.S. PATENT DOCUMENTS

| 5,166,810 | A | 11/1992 | Sorimachi et al. |
| 5,214,741 | A | 5/1993 | Akamine et al. |
| 5,224,062 | A | 6/1993 | McMillan et al. |
| 5,625,714 | A | 4/1997 | Fukuda |
| 5,787,204 | A | 7/1998 | Fukuda |
| 6,137,595 | A | 10/2000 | Sakuyama et al. |

(Continued)

FOREIGN PATENT DOCUMENTS

JP 58-125171 7/1983

(Continued)

OTHER PUBLICATIONS

J.X. Wei, et al., SPIE, SPIE Visual Communications and Image Processing, vol. 4067, pp. 1290-1295, "A New Method for Reducing Boundary Artifacts in Block-Based Wavelet Image Compression", Jun. 20-23, 2000.

*Primary Examiner*—Matthew C Bella
*Assistant Examiner*—Ali Bayat
(74) *Attorney, Agent, or Firm*—Oblon, Spivak, McClelland, Maier & Neustadt, P.C.

(57) ABSTRACT

An image decoding device for decoding a hierarchically encoded compressed code obtained by dividing an image into a plurality of tiles and performing discrete wavelet transform on the pixel values of the image tile by tile includes a tile boundary smoothing part that performs smoothing of tile boundary distortion on the image after the decoding by application of a low-pass filter. The tile boundary smoothing part controls the degree of smoothing of the low-pass filter according to the ratio of the decoding quantity to the entire quantity of the compressed code. The decoding quantity is the portion of the compressed code which portion is to be decoded.

18 Claims, 50 Drawing Sheets

U.S. PATENT DOCUMENTS

| | | | |
|---|---|---|---|
| 6,226,011 | B1 | 5/2001 | Sakuyama et al. |
| 6,859,558 | B2 * | 2/2005 | Hong .......................... 382/236 |
| 6,904,096 | B2 | 6/2005 | Kobayashi et al. |
| 7,013,049 | B2 | 3/2006 | Sakuyama |
| 7,016,546 | B2 | 3/2006 | Fukuhara et al. |
| 7,027,661 | B2 * | 4/2006 | Estevez et al. .............. 382/275 |
| 7,136,538 | B2 * | 11/2006 | Kitagawa ................... 382/275 |
| 7,174,091 | B2 | 2/2007 | Umeda |
| 7,330,596 | B2 * | 2/2008 | Suino et al. ................. 382/240 |
| 2003/0007186 | A1 | 1/2003 | Suino et al. |
| 2003/0218776 | A1 * | 11/2003 | Morimoto et al. ........... 358/2.1 |

FOREIGN PATENT DOCUMENTS

| | | |
|---|---|---|
| JP | 5-227518 | 9/1993 |
| JP | 5-316361 | 11/1993 |
| JP | 9-307855 | 11/1997 |
| JP | 10-191335 | 7/1998 |
| JP | 2839987 | 12/1998 |
| JP | 11-98505 | 4/1999 |
| JP | 2000-115542 | 4/2000 |
| JP | 2001-245294 | 9/2001 |
| JP | 2001-346208 | 12/2001 |
| JP | 2001-359048 | 12/2001 |

* cited by examiner

FIG.3
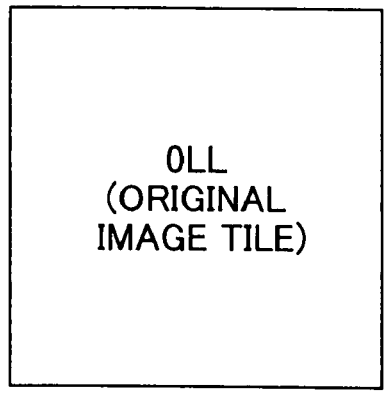
DECOMPOSITION_LEVEL_0
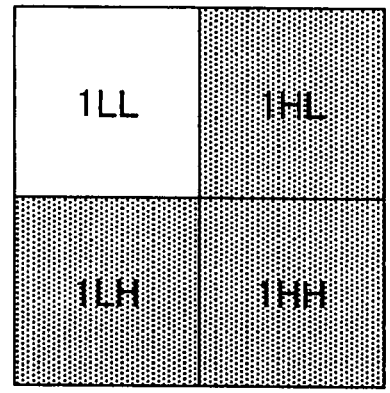
DECOMPOSITION_LEVEL_1
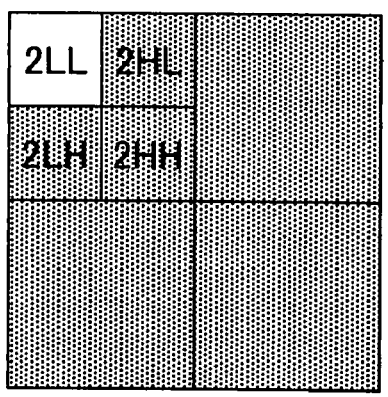
DECOMPOSITION_LEVEL_2
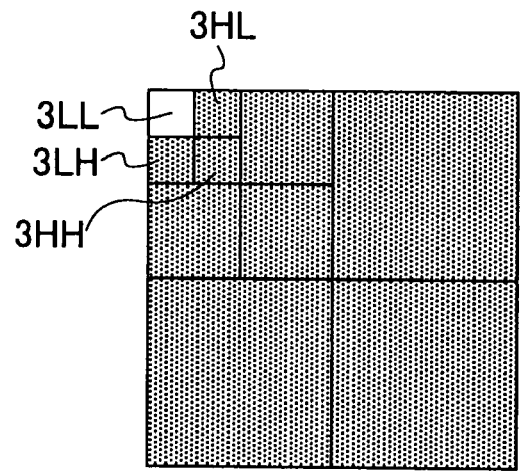
DECOMPOSITION_LEVEL_3

FIG.10

| SOC | MH | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 50 | 51 | 52 | 53 | 54 | EOC |

TILE BOUNDARY

SINGLE-FRAME IMAGE  SINGLE-FRAME IMAGE  ........  SINGLE-FRAME IMAGE  → TIME

FIG.35

TILE BOUNDARY

| | | | 2 | 1 | 0 | 0 | 1 | 2 | | | | |
|---|---|---|---|---|---|---|---|---|---|---|---|---|
| | | | 2 | 1 | 0 | 0 | 1 | 2 | | | | |
| | | | 2 | 1 | 0 | 0 | 1 | 2 | | | | |
| 2 | 2 | 2 | 1 | 0 | 0 | 1 | 2 | 2 | 2 | 2 | 2 |
| 1 | 1 | 1 | 1 | 0 | 0 | 1 | 1 | 1 | 1 | 1 | 1 |
| 0 | 0 | 0 | 0 | 0 | 0 | 0 | 0 | 0 | 0 | 0 | 0 |

TILE BOUNDARY

FIG.36

| -1 | 0 | 0 | 0 | -1 |
|---|---|---|---|---|
| 0 | -1 | 0 | -1 | 0 |
| 0 | 0 | 8 | 0 | 0 |
| 0 | -1 | 0 | -1 | 0 |
| -1 | 0 | 0 | 0 | -1 |

FIG.41
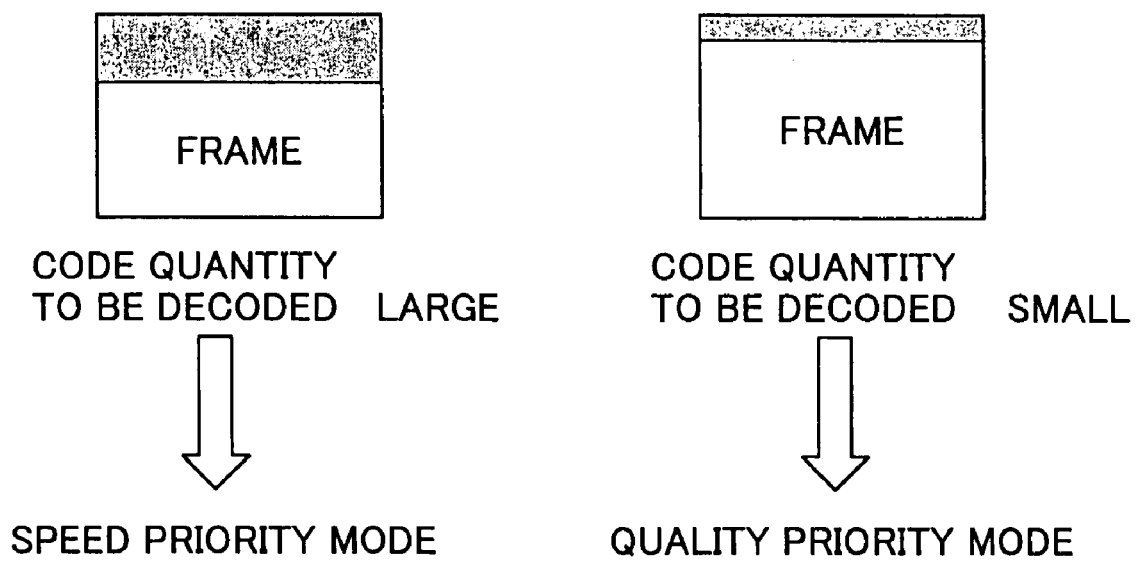
 : CODE TO BE DECODED

| 1LL | 1LH | 1HL | 1HH |

FIG.49

FIG.50
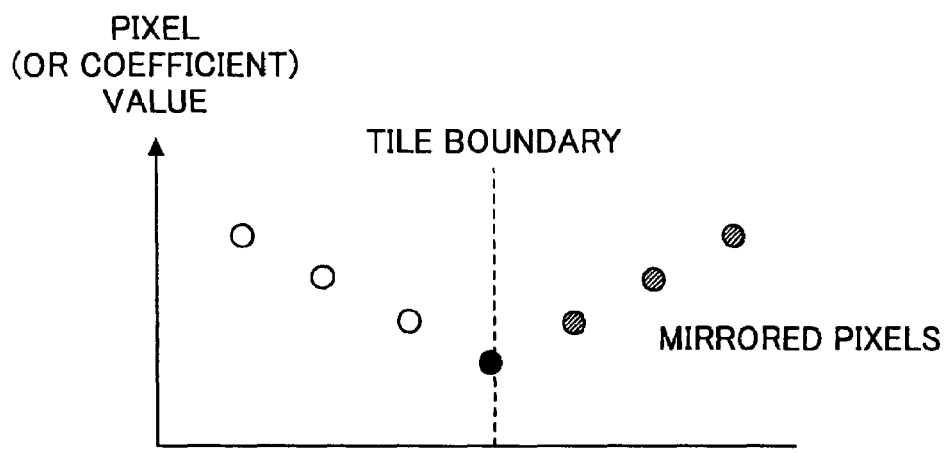
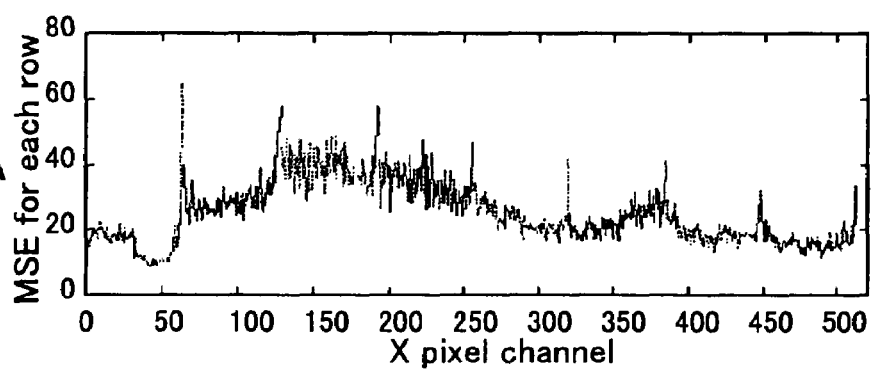
FIG.51A
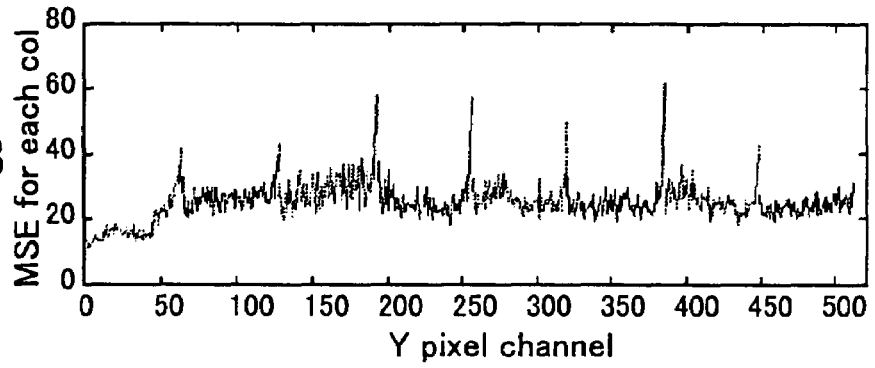
FIG.51B

TILE BOUNDARY

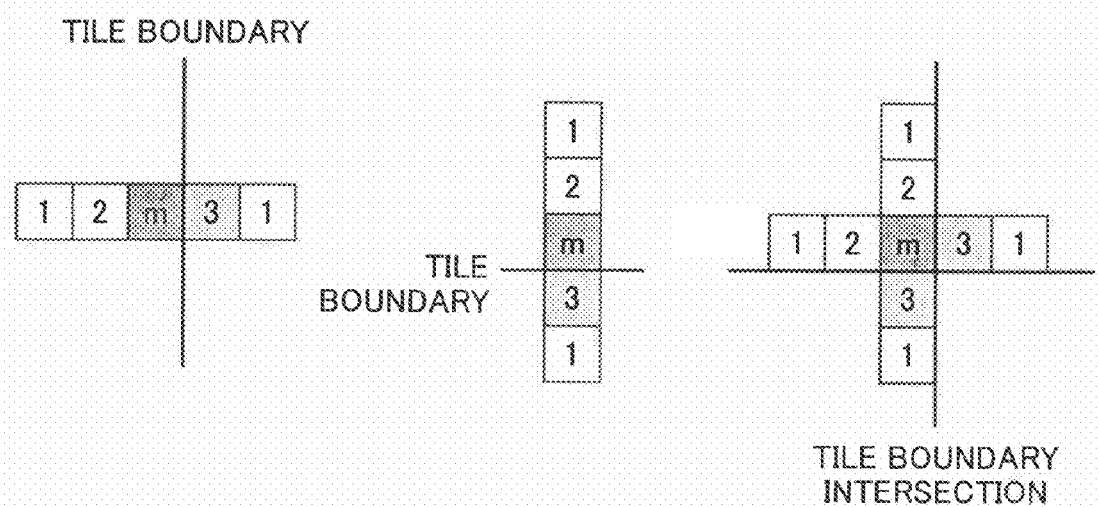

IMAGE DECODING TECHNIQUE FOR SUPPRESSING TILE BOUNDARY DISTORTION

CROSS REFERENCE TO RELATED APPLICATIONS

This application is a Continuation of and is based upon and claims the benefit of priority under 35 U.S.C. §120 for U.S. Ser. No. 10/600,333, filed Jun. 23, 2003, now U.S. Pat. No. 7,330,596 and claims the benefit of priority under 35 U.S.C. § 119 from Japanese Patent Application No. 2002-208107, filed Jul. 17, 2002, Japanese Patent Application No. 2002-208156, filed Jul. 17, 2002, and Japanese Patent Application No. 2002-267692, filed Sep. 13, 2002, the entire contents of each which are incorporated herein by reference.

BACKGROUND OF THE INVENTION

1. Field of the Invention

The present invention generally relates to image processing techniques for controlling the distortion of an inter-unit boundary in the case of decompressing, unit by unit, a compressed image divided into predetermined units, and more particularly to an image decoding device, an image processing apparatus, and an image processing method suitable for suppressing a tile boundary distortion on an image decompressed after being compressed according to JPEG2000. Such an image decoding device may be employed in personal computers (PCs), personal digital assistants (PDAs), mobile phones, and digital cameras, for example, which are apparatuses for handling images such as Internet-based images, medical images, and satellite communication images. Such an image processing apparatus may be a personal computer, a PDA, a mobile phone, or a digital camera, for example, using such an image decoding device.

2. Description of the Related Art

In many cases, image data is temporarily compressed to be stored or transmitted, and the compressed image data is decompressed and output to be processed whenever or wherever necessary. For image data compression, an image compression method such as JPEG, which divides an image into predetermined division units called blocks and encodes the image using discrete cosine transform for each block, is widely used. Such an image compression method has a problem in that when the compressed image is decompressed, the decompressed image includes block boundary distortion. There are well-known methods that detect the block boundary distortion and perform low-pass filtering on the pixels of the block boundaries of the decompressed image in order to make the block boundary distortion less conspicuous. Such methods are disclosed in Japanese Laid-Open Patent Applications No. 5-316361 and No. 9-307855 and Japanese Patent No. 2839987, for instance.

Recently, improvements in image input and output technologies have greatly increased demand for high-definition images. In the case of digital cameras as image input apparatuses, for instance, high-performance charge coupled devices (CCDs) having 3,000,000 pixels or more have been reduced in price to be widely used in digital cameras in a popular price range. It is expected that products employing CCDs having 5,000,000 pixels or more will be commercially available in the near future. It is expected that this trend toward an increasing number of pixels will continue for a while.

On the other hand, there have also been remarkable developments in the high-definition property and significant progress in the price reduction of image output apparatuses and image display apparatuses such as hard-copy apparatuses including laser printers, ink-jet printers, and sublimation-type printers, and soft-copy apparatuses including flat panel displays made of CRTs, liquid crystal displays (LCDs), and plasma display panels (PDPs).

Due to the introduction of these high-performance, inexpensive image input and output apparatuses to the market, high-definition images have become popular. As a result, it is expected that there will be an increasing demand for high-definition images in various fields in the future. Actually, the developments in technologies related to PCs and networks including the Internet have accelerated such trends at an increasing rate. Particularly in recent years, mobile equipment such as mobile phones and notebook personal computers has become so popular that opportunities to transmit or receive high-definition images anywhere through communication means have increased rapidly.

It seems inevitable that, with these background trends, demand for improvement in the performance and multi-functioning of image compression and/or decompression technologies will become stronger in the future so that processing of high-definition images can be facilitated.

Therefore, in recent years, a new image compression method called JPEG2000, which can restore with high-quality an image compressed at a high compression rate, has been standardized as one of image compression techniques satisfying such demand. According to JPEG2000, by dividing an image into rectangular regions called tiles, compression and decompression can be performed on the image with a small memory capacity. That is, each individual tile serves as a basic unit in performing compression and decompression processes, so that the tiles can be subjected to the compression and decompression processes independent of one another.

SUMMARY OF THE INVENTION

The process of dividing an image into tiles in JPEG2000, which is referred to as tiling, is effective in reducing memory requirements and increasing processing speed. According to JPEG2000, however, as described in "A New Method for Reducing Boundary Artifacts in Block-Based Wavelet Image Compression," by J. X. Wei, M. R. Pickering, M. R. Frater, and J. F. Arnold, SPIE Visual Communications and Image Processing 2000 International Conference proceedings Vol. 4067, pp. 1290-1295, 20-23 Jun., 2000, Perth, Australia, there is a problem in that performing compression and decompression at a high compression rate results in a decompressed image with discontinuous tile boundaries. That is, such tile boundary discontinuity (or distortion) is likely to be conspicuous in the decompressed image.

In solving the problem of the tile boundary distortion, it is effective to overlap the boundaries of adjacent tiles at the time of performing processing. However, the basic specifications of JPEG2000 (JPEG2000 Part I) provide that no adjacent tile boundaries shall be overlapped. Therefore, it is not desirable to overlap adjacent tile boundaries in terms of compliance with the JPEG2000 provisions.

Further, in order to solve such a problem, there has been proposed a technique that makes tile boundaries less conspicuous by performing low-pass filtering evenly only on the periphery of the tile boundaries.

The above-described technique is effective in controlling the distortion of a tile boundary. However, if the edge degree is strong in the tile boundaries, the low-pass filtering blurs the edges around the tile boundaries, so that the degradation of image quality appears as stripes.

Further, such single-frame JPEG2000 images may be successively displayed at a predetermined frame rate (representing the number of frames reproduced per unit of time) as a moving image.

However, the above-described low-pass filtering requires a relatively large number of operations and takes time. This may delay an image reproduction process. Particularly, in the case of reproducing a moving image, delay in the image reproduction process may cause problems such as loss of synchronization with audio and dropped frames.

Accordingly, it is a general object of the present invention to provide an image decoding device, an image processing apparatus, a moving image display system, and an image decoding method in which the above-described disadvantages are eliminated, a program for causing a computer to execute such a method, and a computer-readable recording medium storing such a program.

A more specific object of the present invention is to provide an image decoding device, an image processing apparatus, a moving image display system, and an image decoding method that can produce an image with good quality by effectively suppressing tile boundary distortion in the image.

Another more specific object of the present invention is to provide an image decoding device, an image processing apparatus, and an image decoding method that can reduce processing time for suppressing tile boundary distortion.

Yet another more specific object of the present invention is to provide an image decoding device, an image processing apparatus, a moving image display system, and an image decoding method that can suppress tile boundary distortion while eliminating an undesirable effect such as dropped frames caused by decoding delay with respect to reproduction, by balancing the rate of decoding with the image quality realized by smoothing the tile boundary distortion.

Yet another more specific object of the present invention is to provide a program for causing a computer to execute such a method, and a computer-readable recording medium storing such a program.

The above objects of the present invention are achieved by an image decoding device for decoding a hierarchically encoded compressed code obtained by dividing an image into a plurality of tiles and performing discrete wavelet transform on pixel values of the image tile by tile, the image decoding device including a tile boundary smoothing part that performs smoothing of tile boundary distortion on the image after the decoding by application of a low-pass filter, the tile boundary smoothing part controlling a degree of smoothing of the low-pass filter according to a ratio of decoding quantity to the entire quantity of the compressed code, the decoding quantity being a portion of the compressed code which portion is to be decoded.

According to the above-described image decoding device, the low-pass filter is applied to a tile boundary in the image while controlling the degree of smoothing of the low-pass filter based on the ratio of the decoding quantity to the entire quantity of the compressed image. That is, the low-pass filter is optimized based on the decoding quantity of the compressed code. Accordingly, an image with good quality can be reproduced.

Additionally, in the above-described image decoding device, the tile boundary smoothing part may be prevented from performing the smoothing of tile boundary distortion when the ratio of the decoding quantity to the entire quantity of the compressed code exceeds a predetermined threshold.

According to the above-described configuration, with respect to an image having the ratio larger than the predetermined value, it is determined that the image is compressed at such a low compression rate that the tile boundary distortion is inconspicuous, and the tile boundary smoothing part is prevented from performing the smoothing of tile boundary distortion on the image. As a result, the processing time for suppressing tile boundary distortion can be reduced.

Additionally, in the above-described image decoding device, the image may be a moving image including a plurality of frames successively decodable by the image decoding device, and the tile boundary smoothing part may perform the smoothing of tile boundary distortion on each of the frames after the decoding. Further, the image decoding device may further comprise a mode selection part that makes selectable one of a first mode for giving priority to image quality and a second mode for giving priority to processing speed in the smoothing of tile boundary distortion by said tile boundary smoothing part, and a tile boundary smoothing switching part that switches a processing mode between the first mode and the second mode based on the selection by said mode selection part in the smoothing of tile boundary distortion on the frames after the decoding by the tile boundary smoothing part.

Accordingly, the first and second modes are switched according to the selection made by the mode selection part, and the tile boundary smoothing part performs the smoothing of tile boundary distortion on each frame after the decoding. This allows the tile boundary smoothing part to perform the smoothing of tile boundary distortion, suitably selecting one of the first and second modes. Therefore, by balancing the rate of decoding and the image quality realized by smoothing the tile boundary distortion, the tile boundary distortion may be suppressed while eliminating an undesirable effect such as dropped frames caused by decoding delay with respect to reproduction.

The above objects of the present invention are also achieved by an image processing apparatus including: a code stream storing part that stores a hierarchically encoded compressed code obtained by dividing an image into a plurality of tiles and performing discrete wavelet transform on pixel values of the image tile by tile; a decoding quantity specifying part that specifies decoding quantity of the compressed code, the decoding quantity being a portion of the compressed code which portion is to be decoded; an image decoding part that decodes the compressed code by the decoding quantity specified by the decoding quantity specifying part; and an image display part that causes a display unit to display the image based on the compressed code decoded by said image decoding part, wherein the image decoding part includes a tile boundary smoothing part that performs smoothing of tile boundary distortion on the image after the decoding by application of a low-pass filter, the tile boundary smoothing part controlling a degree of smoothing of the low-pass filter according to a ratio of the decoding quantity to the entire quantity of the compressed code.

Additionally, in the above-described image processing apparatus, the tile boundary smoothing part may be prevented from performing the smoothing of tile boundary distortion when the ratio of the decoding quantity to the entire quantity of the compressed code exceeds a predetermined threshold.

Additionally, in the above-described image processing apparatus, the image may be a moving image including a plurality of frames successively decodable by the image decoding part, the tile boundary smoothing part may perform the smoothing of tile boundary distortion on each of the frames after the decoding, and the image decoding part may further comprise a mode selection part that makes selectable one of a first mode for giving priority to image quality and a second mode for giving priority to processing speed in the smoothing of tile boundary distortion by said tile boundary smoothing part, and a tile boundary smoothing switching part that switches a processing mode between the first mode and the second mode based on the selection by said mode selection part in the smoothing of tile boundary distortion on the frames after the decoding by the tile boundary smoothing part.

The above-described image processing apparatus may produce the same effects as the above-described image decoding device.

The above objects of the present invention are also achieved by a moving image display system including an image input part acquiring a moving image composed of a plurality of frames, an image compression part that divides each of the frames into a plurality of tiles and performs discrete wavelet transform on pixel values of each of the frames tile by tile so as to hierarchically compress and encode the moving image, an image decoding part that successively decodes the compressed and encoded frames, and an image display part that causes a display unit to display the image based on the decoded frames, wherein the image decoding part includes a tile boundary smoothing part that performs smoothing of tile boundary distortion in each of the frames after the decoding, a mode selection part that makes selectable one of a first mode for giving priority to image quality and a second mode for giving priority to processing speed in the smoothing of tile boundary distortion by the tile boundary smoothing part, and a tile boundary smoothing switching part that switches a processing mode between the first mode and the second mode based on the selection by the mode selection part in the smoothing of tile boundary distortion on the frames after the decoding by the tile boundary smoothing part.

According to the above-described moving image display system, by balancing the rate of decoding and the image quality realized by smoothing the tile boundary distortion, the tile boundary distortion may be suppressed while eliminating an undesirable effect such as dropped frames caused by decoding delay with respect to reproduction.

The above objects of the present invention are also achieved by a method of decoding a hierarchically encoded compressed code obtained by dividing an image into a plurality of tiles and performing discrete wavelet transform on pixel values of the image tile by tile, the method including the step of (a) performing smoothing of tile boundary distortion on the image after the decoding by application of a low-pass filter, wherein step (a) controls a degree of smoothing of the low-pass filter according to a ratio of decoding quantity to the entire quantity of the compressed code, the decoding quantity being a portion of the compressed code which portion is to be decoded.

Additionally, in the above-described method, step (a) may be prevented from performing the smoothing of tile boundary distortion when the ratio of the decoding quantity to the entire quantity of the compressed code exceeds a predetermined threshold.

Additionally, in the above-described method, the image may be a moving image including a plurality of frames successively decodable by the method, and step (a) may perform the smoothing of tile boundary distortion on each of the frames after the decoding. Further, the method may further comprise the step of (b) making selectable one of a first mode for giving priority to image quality and a second mode for giving priority to processing speed in the smoothing of tile boundary distortion by step (a) so that a processing mode is switched between the first mode and the second mode based on the selection by step (b) in the smoothing of tile boundary distortion on the frames after the decoding by step (a).

The above-described method may produce the same effects as the above-described image decoding device.

The above objects of the present invention are also achieved by a computer-readable recording medium storing a program for causing a computer to execute a method of decoding a hierarchically encoded compressed code obtained by dividing an image into a plurality of tiles and performing discrete wavelet transform on pixel values of the image tile by tile, the method including the step of (a) performing smoothing of tile boundary distortion on the image after the decoding by application of a low-pass filter, wherein step (a) controls a degree of smoothing of the low-pass filter according to a ratio of decoding quantity to the entire quantity of the compressed code, the decoding quantity being a portion of the compressed code which portion is to be decoded.

The above objects of the present invention are further achieved by a program for causing a computer to execute a method of decoding a hierarchically encoded compressed code obtained by dividing an image into a plurality of tiles and performing discrete wavelet transform on pixel values of the image tile by tile, the method including the step of (a) performing smoothing of tile boundary distortion on the image after the decoding by application of a low-pass filter, wherein step (a) controls a degree of smoothing of the low-pass filter according to a ratio of decoding quantity to the entire quantity of the compressed code, the decoding quantity being a portion of the compressed code which portion is to be decoded.

BRIEF DESCRIPTION OF THE DRAWINGS

Other objects, features and advantages of the present invention will become more apparent from the following detailed description when read in conjunction with the accompanying drawings, in which:

FIG. 3 is a diagram for illustrating sub-bands at each decomposition level when the decomposition level is 3 according to JPEG2000;

FIG. 10 is a diagram for illustrating a compressed code generated in accordance with the JPEG2000 algorithm based on the divided image of FIG. 9 according to the first embodiment of the present invention;

FIG. 35 is a diagram for illustrating a method of calculating the distance between a pixel and a tile boundary according to the third embodiment of the present invention;

FIG. 36 is a diagram showing an edge amount calculation filter according to the third embodiment of the present invention;

FIG. 41 is a diagram for illustrating mode selection based on decoding quantity according to the sixth embodiment of the present invention;

FIG. 46 is a diagram showing a coefficient array obtained by vertically performing a one-dimensional wavelet transform operation on the original image of FIG. 45;

FIG. 47 is a diagram showing a coefficient array obtained by laterally performing a one-dimensional wavelet transform operation on the coefficient array of FIG. 46;

FIG. 48 is a diagram showing a coefficient array into which the coefficients of FIG. 47 are rearranged;

FIG. 49 is a diagram showing a coefficient array into which the coefficients obtained by two-dimensional wavelet transform at decomposition level 2 are rearranged;

FIG. 50 is a diagram for illustrating mirroring of pixel values at a tile boundary;

FIGS. 51A and 51B are graphs showing distributions of the mean square errors of pixel values generated in the pixels within a tile;

FIG. 64 is a diagram showing an edge amount calculation filter according to the eighth embodiment of the present invention; and FIGS. 65A through 65C are diagrams showing configurations of the low-pass filter for application to tile boundaries according to the eighth embodiment of the present invention.

DETAILED DESCRIPTION OF THE PREFERRED EMBODIMENTS

A description will be given, with reference to the accompanying drawings, of embodiments of the present invention.

First, a description will be given schematically of the "hierarchical coding algorithm" and the "JPEG2000 algorithm," which are the premises of the embodiments of the present invention.

Figure 1:
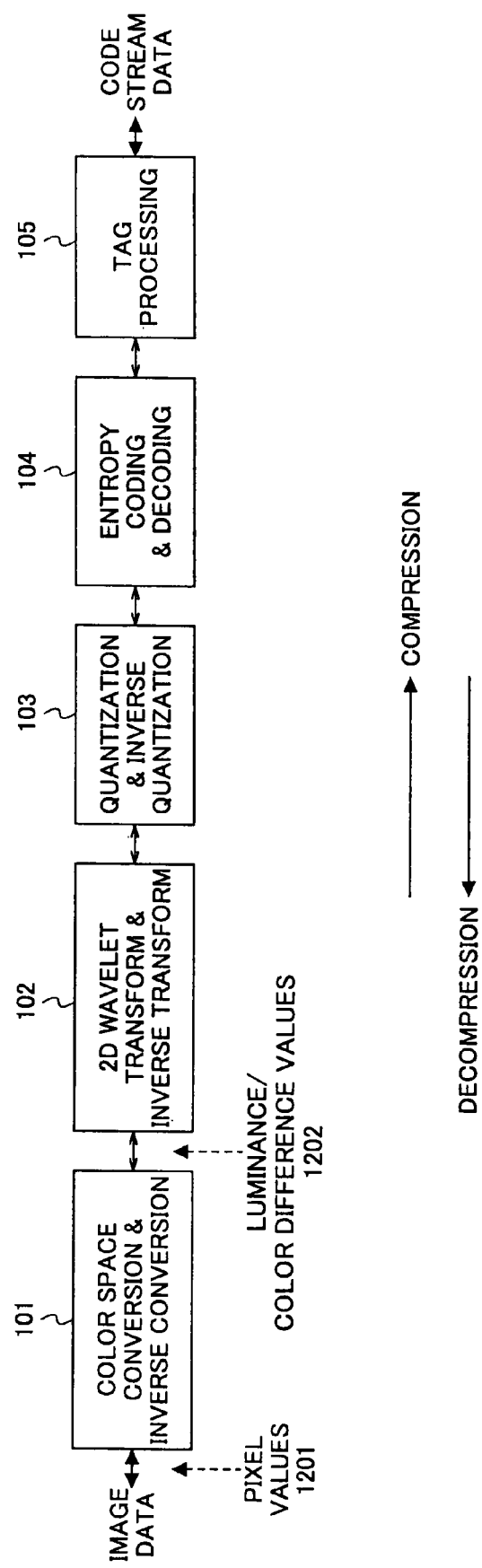
FIG. 1 is a functional block diagram of a system realizing a hierarchical coding algorithm that forms the basis of JPEG2000, which algorithm is a precondition for the present invention.

FIG. 1 is a functional block diagram of a system realizing the hierarchical coding algorithm that forms the basis of JPEG2000. This system includes a color space conversion and inverse conversion part 101, a two-dimensional (2D) wavelet transform and inverse transform part 102, a quantization and inverse quantization part 103, an entropy coding and decoding part 104, and a tag processing part 105.

One of the major differences between this system and the conventional JPEG algorithm is the transform method. JPEG employs discrete cosine transform (DCT) while the hierarchical coding algorithm employs discrete wavelet transform (DWT) in the 2D wavelet transform and inverse transform part 102. Compared with DCT, DWT enjoys the advantage of excellent image quality in a highly compressed region. This advantage is one of the major reasons DWT is employed in JPEG2000, which is a successor algorithm to JPEG.

Another major difference is that the hierarchical coding algorithm additionally includes a functional block called the tag processing part 105 at the final stage of the system so as to form codes. The tag processing part 105 generates compressed data as code stream data at the time of compression and interprets code stream data necessary for decompression at the time of decompression. The code stream data allows JPEG2000 to realize a variety of convenient functions. For instance, as shown in FIG. 3, the compression and decompression of a still image can be stopped freely at any hierarchy (decomposition level) corresponding to the octave division in block-based DWT.

The part for inputting and outputting an original image is often connected to the color space conversion and inverse conversion part 101 of FIG. 1. For instance, the color space conversion and inverse conversion part 101 converts the RGB calorimetric system made up of primary color system components of red (R), green (G), and blue (B) or the YMC calorimetric system made up of complementary color system components of yellow (Y), magenta (M), and cyan (C) to the YUV or YCbCr calorimetric system, or performs the inverse conversion thereof.

Next, a description will be given of the JPEG2000 algorithm.

Figure 2:
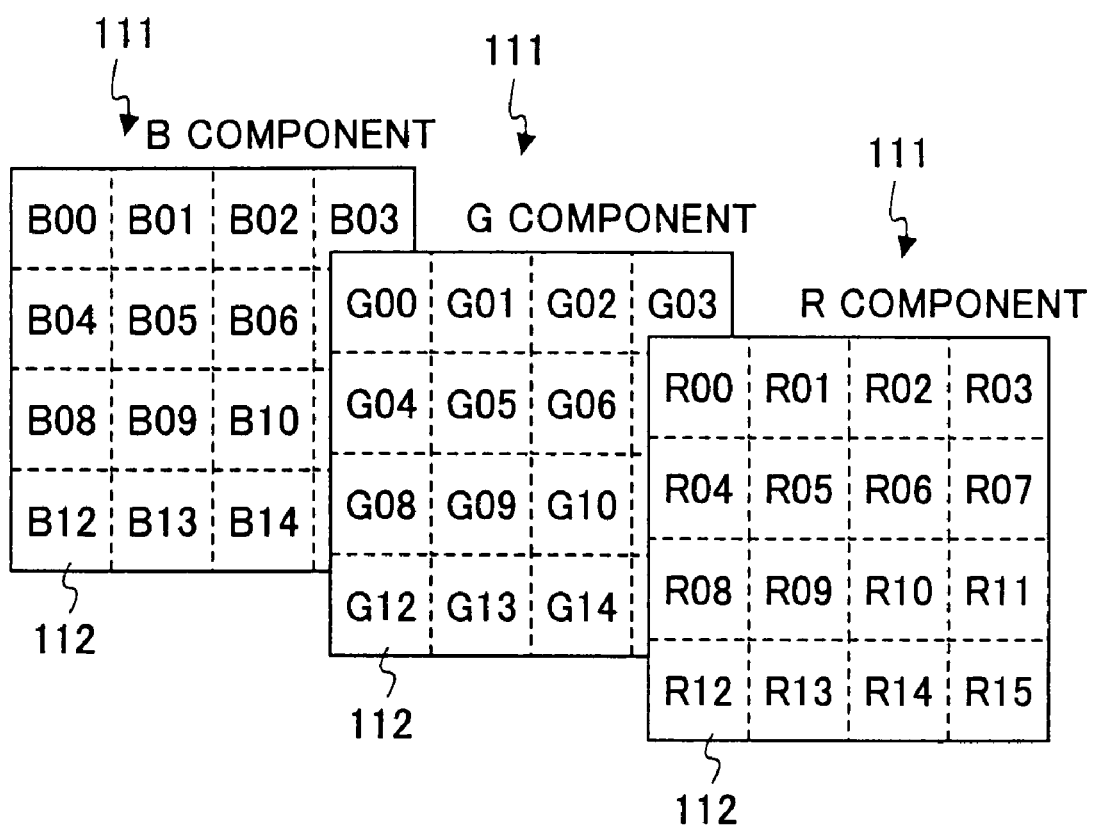
FIG. 2 is a diagram for illustrating rectangular regions of each component of an original image according to JPEG2000.

Generally, in a color image, each component 111 (RGB primary color system in this case) of the original image is divided into rectangular regions 112 as shown in FIG. 2. Generally, the rectangular regions 112 are referred to as blocks or tiles. Since the rectangular regions 112 are generally referred to as tiles in JPEG2000, the rectangular regions 112 are hereinafter referred to as tiles. In the case of FIG. 2, each component 111 is divided into 16 (4×4) rectangular tiles 112. Each of the tiles 112 (R00, R01, . . . , R15, G00, G01, . . . , G15, B00, B01, . . . , B15 in FIG. 2) becomes a basic unit in the image data compression and decompression process. Accordingly, the compression and decompression of image data is performed independently for each component 111 and each tile 112.

At the time of encoding the image data, the data of each tile 112 of each component 111 is input to the color space conversion and inverse conversion part 101 and subjected to color space conversion.

Thereafter, the data is subjected to 2D wavelet transform (forward transform) in the 2D wavelet transform and inverse transform part 102 and spatially divided into frequency bands.

FIG. 3 is a diagram showing the sub-bands of each decomposition level in the case where the decomposition level is 3. That is, the 2D wavelet transform is performed on the tile original image (0LL) of decomposition level 0 obtained by dividing the original image into tiles, so that the sub-bands (1LL, 1HL, 1LH, and 1HH) shown at decomposition level 1 are separated. Successively thereafter, the 2D wavelet transform is performed on the low-frequency component of 1LL at this level so that the sub-bands (2LL, 2HL, 2LH, and 2HH) shown at decomposition level 2 are separated. Similarly, the 2D wavelet transform is performed on the low-frequency component of 2LL so that the sub-bands (3LL, 3HL, 3LH, and 3HH) shown at decomposition level 3 are separated. In FIG. 3, the sub-bands to be subjected to encoding are indicated by hatching at each decomposition level. For instance, at decomposition level 3, the hatched sub-bands (3HL, 3LH, 3HH, 2HL, 2LH, 2HH, 1HL, 1LH, and 1HH) are to be subjected to encoding and the 3LL sub-band is not to be encoded.

Next, the target bits to be encoded are determined in a specified encoding order, and context is generated from the peripheral bits of each target bit in the quantization and inverse quantization part 103.

Figure 4:
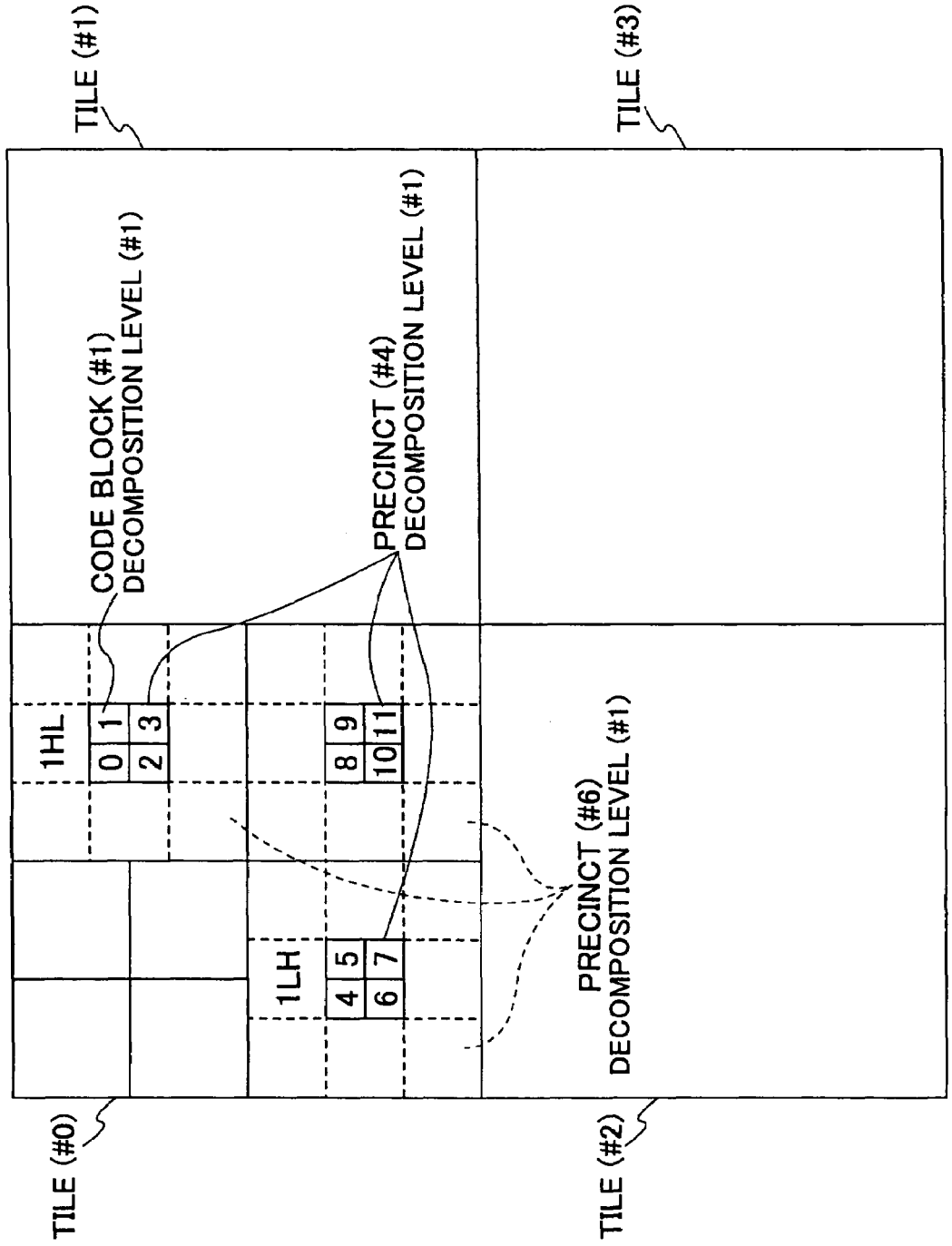
FIG. 4 is a diagram for illustrating a precinct according to JPEG2000.

The quantized wavelet coefficients are divided into non-overlapping rectangles called "precincts" sub-band by sub-band. The precincts are introduced to effectively utilize memory upon implementation. As shown in FIG. 4, each precinct is composed of three spatially matching rectangular regions. Further, each precinct is divided into non-overlapping rectangular "code blocks." Each code block becomes a basic unit in performing entropy coding.

The coefficient values after the wavelet transform may directly be quantized and encoded. In order to improve encoding efficiency, however, JPEG2000 decomposes the coefficient values into units called "bit planes," which may be placed in order in each pixel or code block.

Figure 5:
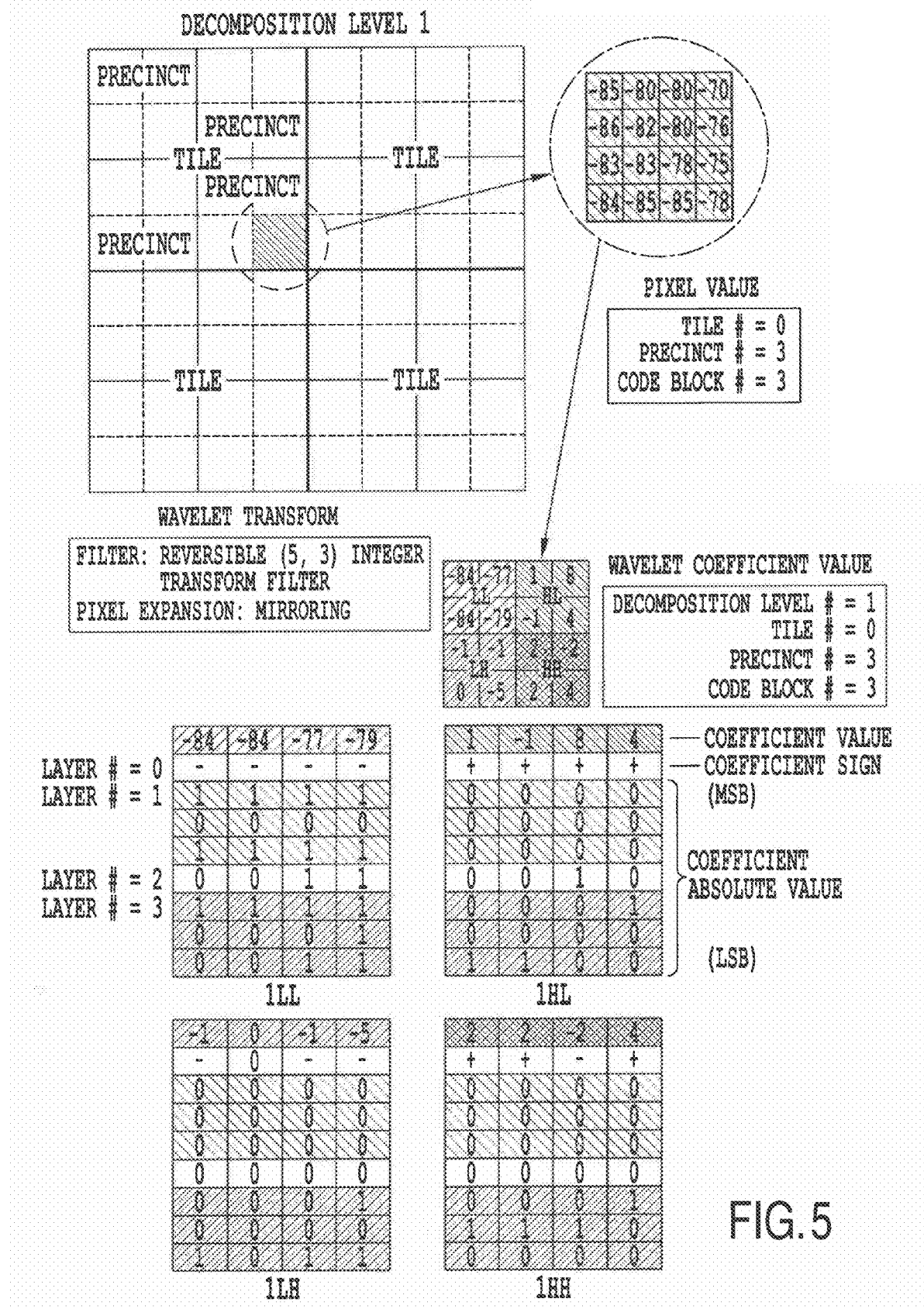
FIG. 5 is a diagram for illustrating a process for placing bit planes in order according to JPEG2000.

FIG. 5 is a diagram for illustrating a process for placing the bit planes in order. As shown in FIG. 5, an original image of 32×32 pixels is divided into four tiles each of 16×16 pixels in this case. The sizes of each precinct and each code block at decomposition level 1 are 8×8 and 4×4 pixels, respectively. The precincts and the code blocks are respectively numbered according to a raster sequence.

In this case, numbers 0 to 3 are assigned to the precincts and numbers 0 to 3 are assigned to the code blocks. A mirroring method is employed in pixel expansion beyond a tile boundary, and wavelet transform is performed with a reversible (5, 3) integer transform filter so that the wavelet coefficients of decomposition level 1 are obtained.

Further, FIG. 5 also shows a conceptual typical "layer" structure with respect to the tile 0, precinct 3, and code block 3. The transformed code block 3 is divided into sub-bands (1LL, 1HL, 1LH, and 1HH), and the sub-bands are allocated their respective wavelet coefficient values.

The layer structure is easier to understand when the wavelet coefficient values are viewed horizontally along the bit planes. One layer is composed of an arbitrary number of bit planes. In this case, the layers 0, 1, 2, and 3 are composed respectively of one, three, one, and three bit planes. The layer including a bit plane closer to the LSB (least significant bit) bit plane is subjected to the quantization earlier, and the layer including a bit plane closer to the MSB (most significant bit) bit plane is subjected to the quantization later. The method of discarding a layer closer to the LSB bit plane first is called truncation, by which the rate of quantization can be finely controlled.

The entropy coding and decoding part 104 of FIG. 1 performs encoding on the tiles 112 of each component 111 by probability estimation from the context and the target bits. Thus, the encoding is performed in units of the tiles 112 for each component 111 of the original image. Finally, the tag processing part 105 connects all the coded data supplied from the entropy coding and decoding part 104 into a single coded data stream (code stream data), and adds a tag thereto.

Figure 6:
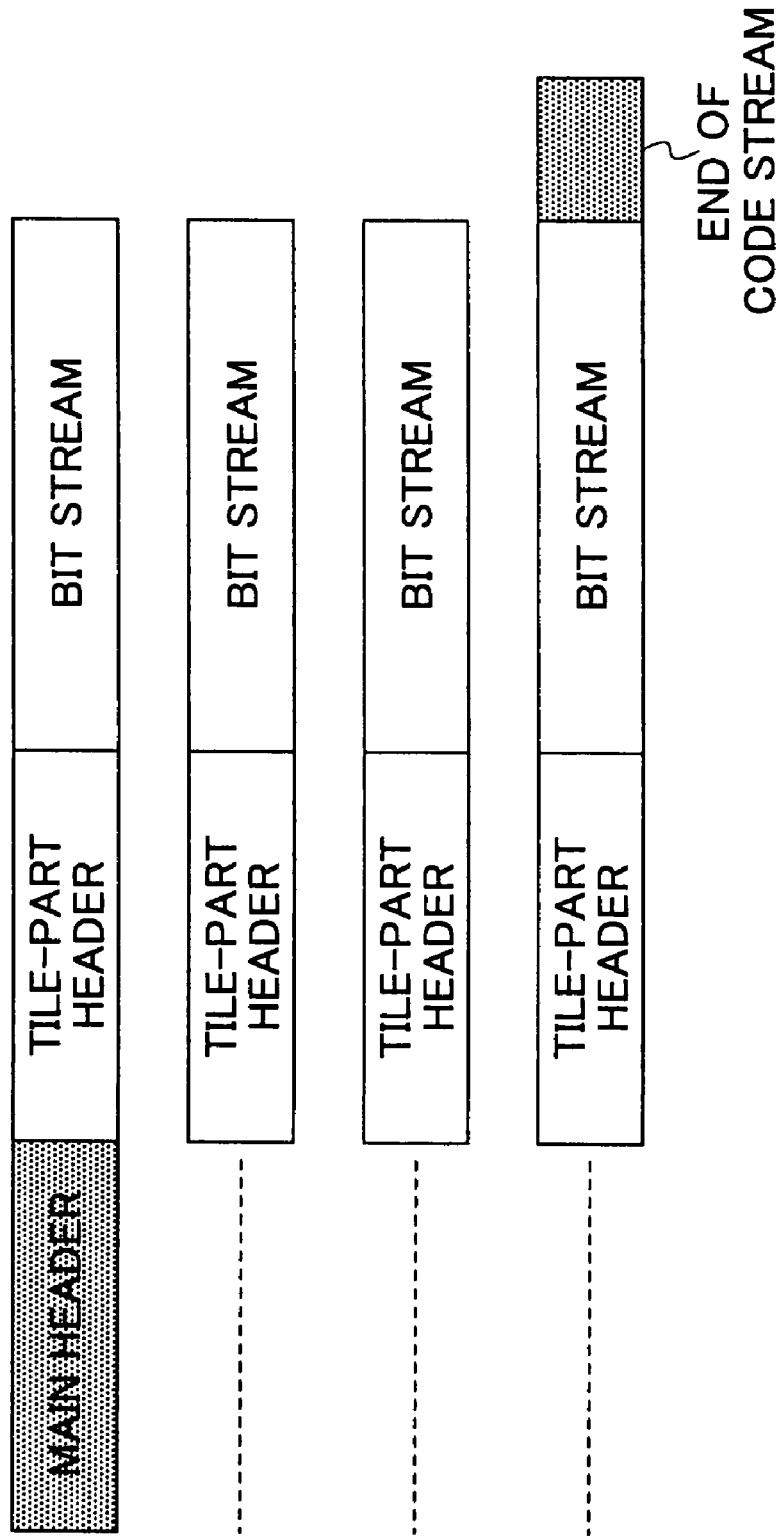
FIG. 6 is a schematic diagram showing a frame structure of code stream data according to JPEG2000.

FIG. 6 is a schematic diagram showing a frame structure of the code stream data. Tag information called a main header is added to the head of the code stream data, and tag information called a tile-part header is added to the head of each of the coded data (bit stream) of each tile 112. The tile-part header indicates a tile boundary position and a tile boundary direction and is followed by the coded data of the corresponding tile 112. Coding and quantization parameters are written to the main header. Another tag (end of code stream) is added to the terminal end of the code stream data.

On the other hand, at the time of decoding the coded data, image data is generated from the code stream data of the tiles 112 of each component 111, which is the reverse of the process at the time of encoding the image data. In this case, the tag processing part 105 interprets the tag information added to the code stream data input from the outside. Then, the tag processing part 105 decomposes the input code stream data into the code stream data of the tiles 112 of each component 111, and decodes (decompresses) the code stream data in units of the tiles 112 for each component 111. At this point, the positions of the target bits to be subjected to the decoding are determined according to the order based on the tag information within the code stream data, and the quantization and inverse quantization part 103 generates context from the arrangement of the peripheral bits (already decoded) of the position of each target bit. The entropy coding and decoding part 104 performs decoding based on probability estimation from the context and the code stream data so as to generate the target bits, and writes the target bits to their respective positions. The thus decoded data is spatially divided in every frequency band. Therefore, each tile 112 of each component 111 of the image data can be restored by subjecting the decoded data to 2D wavelet inverse transform in the 2D wavelet transform and inverse transform part 102. The color space conversion and inverse conversion part 101 converts the restored data to the image data of the original calorimetric system.

First Embodiment

Next, a description will be given of a first embodiment of the present invention.

Figure 7:
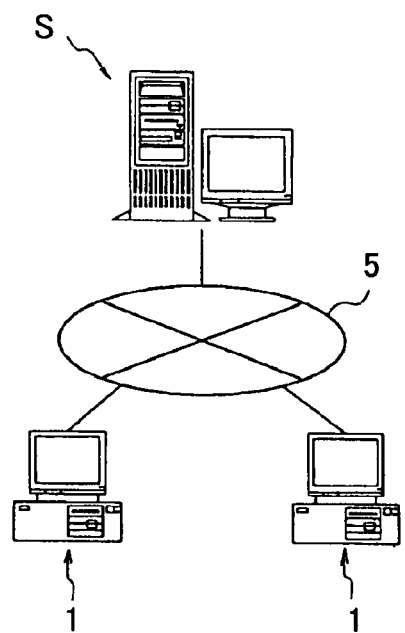
FIG. 7 is a diagram showing a system including an image processing apparatus according to a first embodiment of the present invention.
Figure 8:
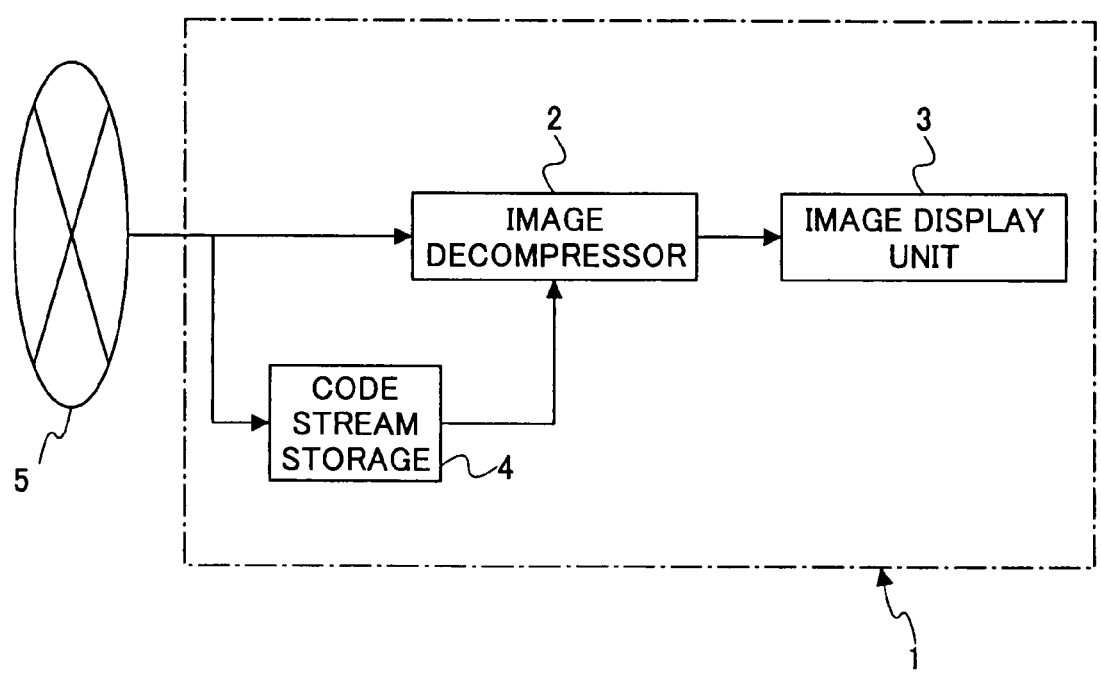
FIG. 8 is a functional block diagram of the image processing apparatus according to the first embodiment of the present invention.

FIG. 7 is a diagram showing a system including an image processing apparatus 1 according to the first embodiment of the present invention. FIG. 8 is a functional block diagram of the image processing apparatus 1. As shown in FIG. 7, the image processing apparatus 1 is a personal computer, for instance, and is connectable via a network 5, which may be the Internet, to a server computer S storing and retaining a variety of image data.

Figure 9:
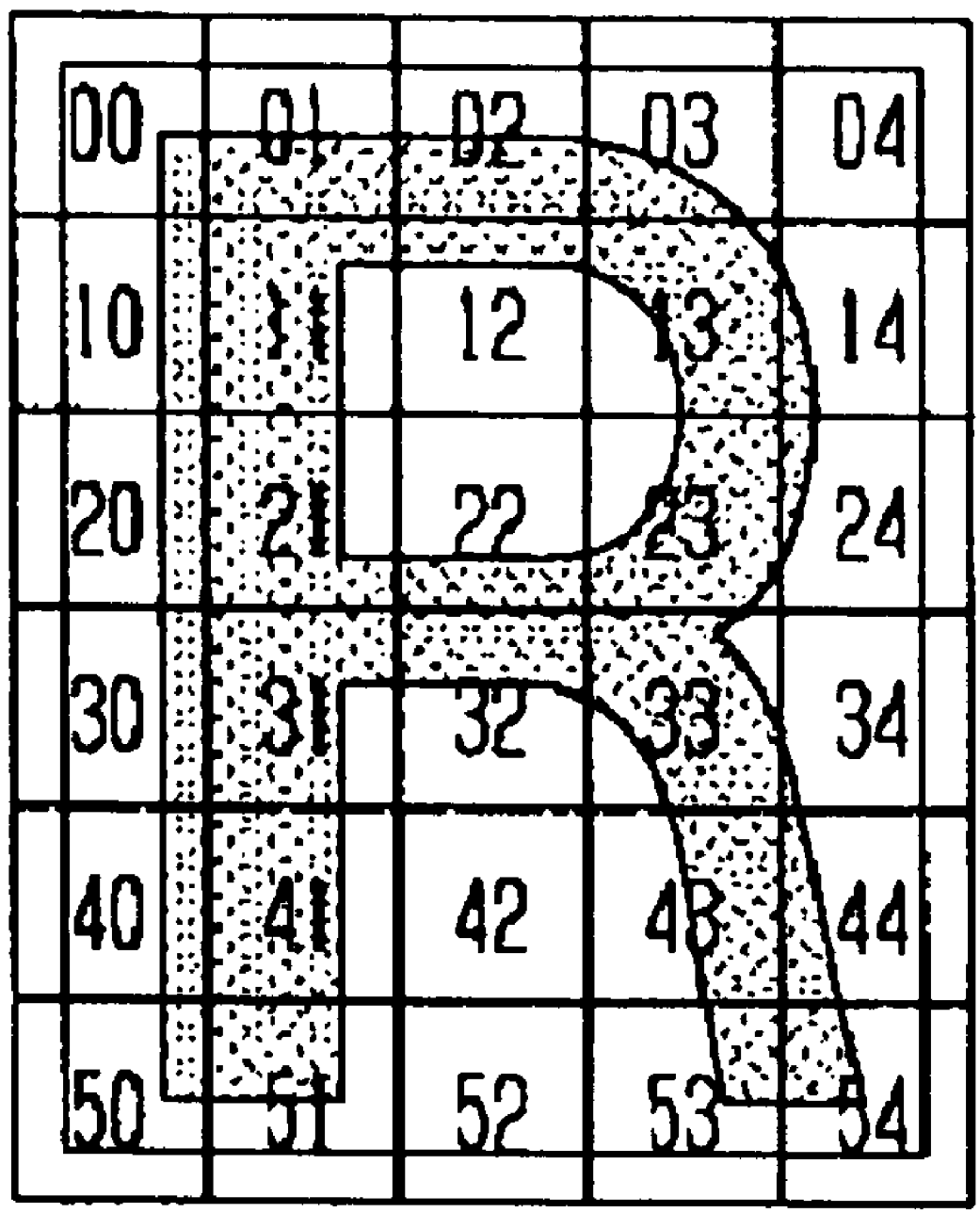
FIG. 9 is a diagram showing a two-dimensionally divided image according to the first embodiment of the present invention.

In this embodiment, the image data stored in the server computer S are compressed codes generated in accordance with the JPEG2000 algorithm. More specifically, a two-dimensionally divided image as shown in FIG. 9 is subjected to compression coding and arranged one-dimensionally, so that a compressed code as shown in FIG. 10 is generated. In FIG. 10, SOC is a marker segment indicating the start of a code stream. MH refers to a main header storing values common to the entire code stream. The recorded values common to the entire code stream include tile lateral quantity, tile vertical quantity, image lateral quantity, and image vertical quantity. The coded data of each file follows the MH. The data of the tiles of FIG. 9 are compressed in the main scanning direction and the sub scanning direction according to the tile numbers, and arranged as shown in FIG. 10. An EOC marker at the end of the compressed code is a marker segment indicating the end of a compressed code.

As shown in FIG. 8, the image processing apparatus 1 includes an image decompressor 2, an image display unit 3, and a code stream storage part 4. The image decompressor 2 is an image decoding device that decompresses (decodes) code stream data (JPEG2000 data) output via the network 5 to the image processing apparatus 1 into the data of an image. The image display unit 3 displays the image based on the decompressed image data. The code stream storage part 4 stores the code stream data (JPEG2000 data) output via the network 5 to the image processing apparatus 1. The code stream storage part 4, which functions as a common buffer or storage for the code stream data of images, is used differently for the different purposes.

Figure 11:
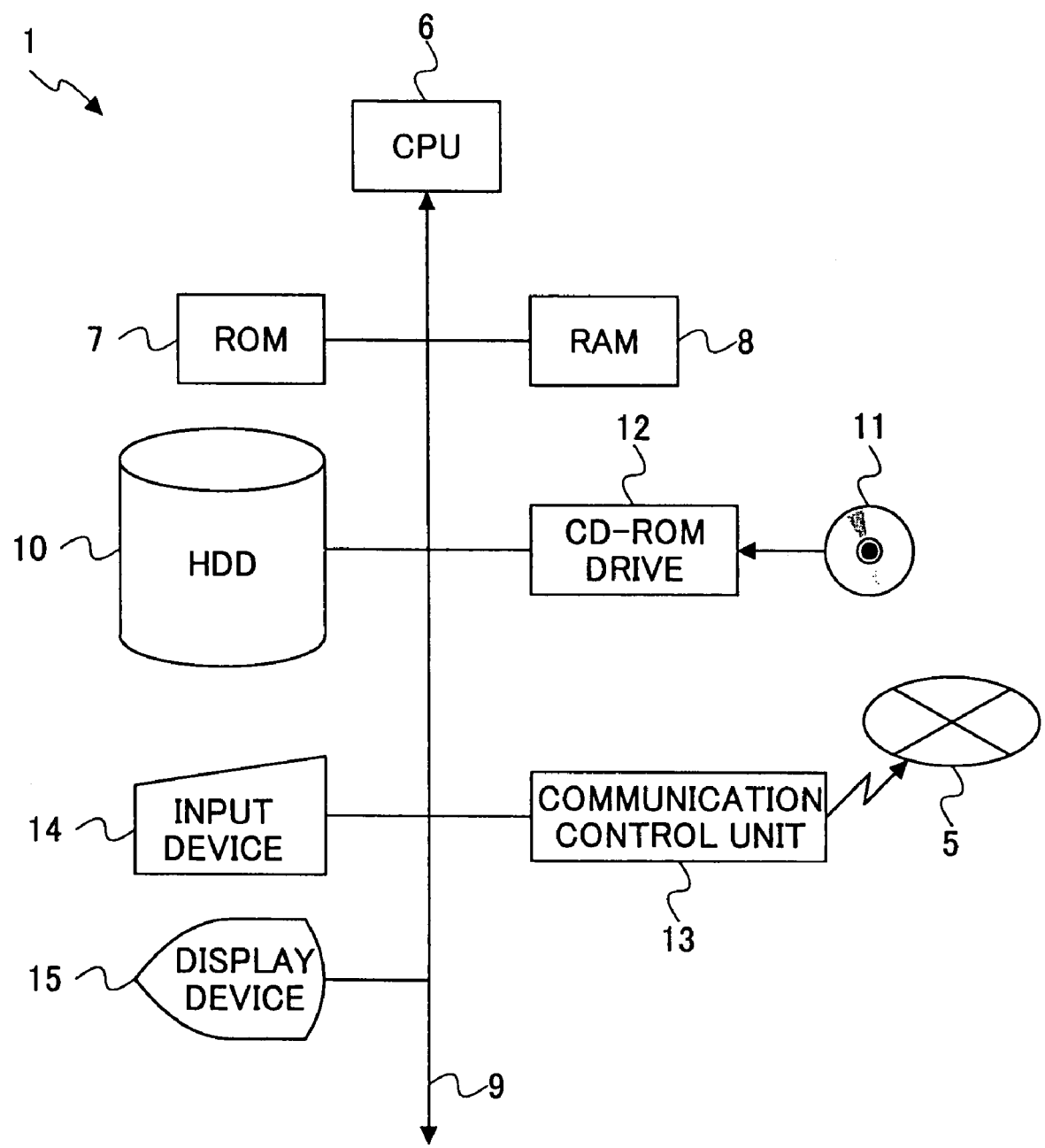
FIG. 11 is a block diagram showing a hardware configuration of the image processing apparatus according to the first embodiment of the present invention.

FIG. 11 is a block diagram showing a hardware configuration of the image processing apparatus 1. As shown in FIG. 11, the image processing apparatus 1 includes a CPU (central processing unit) 6 that is an important part of the computer and performs centralized control of each part of the computer. The CPU 6 is connected via a bus 9 to a ROM 7 that is a read-only memory storing a BIOS (basic input/output system) and a RAM (random access memory) 8 that rewritably stores a variety of data. The RAM 8, which has the characteristic of rewritably storing a variety of data, functions as a work area for the CPU 6, serving as an input buffer, for instance.

The bus 9 is further connected via input/output (I/O) parts (not shown in the drawing) to an HDD (hard disk drive) 10 functioning as the code stream storage part 4, a CD-ROM drive 12 for reading a CD-ROM 11 as a mechanism for reading computer software that is a distributed program, a communication control unit 13 controlling communication between the image processing apparatus 1 and the network 5, an input device 14 such as a keyboard or a mouse, and a display device 15 such as a CRT (cathode ray tube) or an LCD (liquid crystal display).

The compressed code (see FIG. 10) downloaded from the server computer S via the network 5 is stored in the HDD 10 functioning as the code stream storage part 4.

Further, the CD-ROM 11 shown in FIG. 11, which realizes a storage medium according to the present invention, stores an operation system (OS) and a variety of computer software. The CPU 6 reads the computer software stored in the CD-ROM 11 in the CD-ROM drive 12, and installs the read computer software in the HDD 10.

The computer software stored in the HDD 10 of the above-described image processing apparatus 1 includes an image processing program for processing images. The image processing program realizes a program according to the present invention. The function of the image decompressor 2 is realized by the processing performed by the CPU 6 based on the image processing program.

The CD-ROM 11 is not the only storage medium, but media of a variety of types, such as optical disks including DVDs, magneto-optical disks, magnetic disks including flexible disks, and semiconductor memory devices, may be employed as storage media according to the present invention. Alternatively, the computer software may be downloaded via the communication control unit 13 from the network 5 so as to be installed in the HDD 10. In this case, the storage device that stores the computer software on the transmitter-side server is also a storage medium of the present invention. The computer software may operate on a predetermined OS. In this case, part of later-described operations may be executed by the OS. Alternatively, the computer software may be included in a group of program files composing a predetermined application or OS.

A brief description will be given, with reference to FIG. 8, of the operation of each part of the image processing apparatus 1. Code stream data (JPEG2000 data) output via the network 5 to the image processing apparatus 1 is stored in the code stream storage part 4 and decompressed in the image decompressor 2. The data of an image generated by decompressing the code stream data in the image decompressor 2 is output to the image display unit 3, where the image based on the decompressed image data is displayed on the display device 15.

Figure 12:
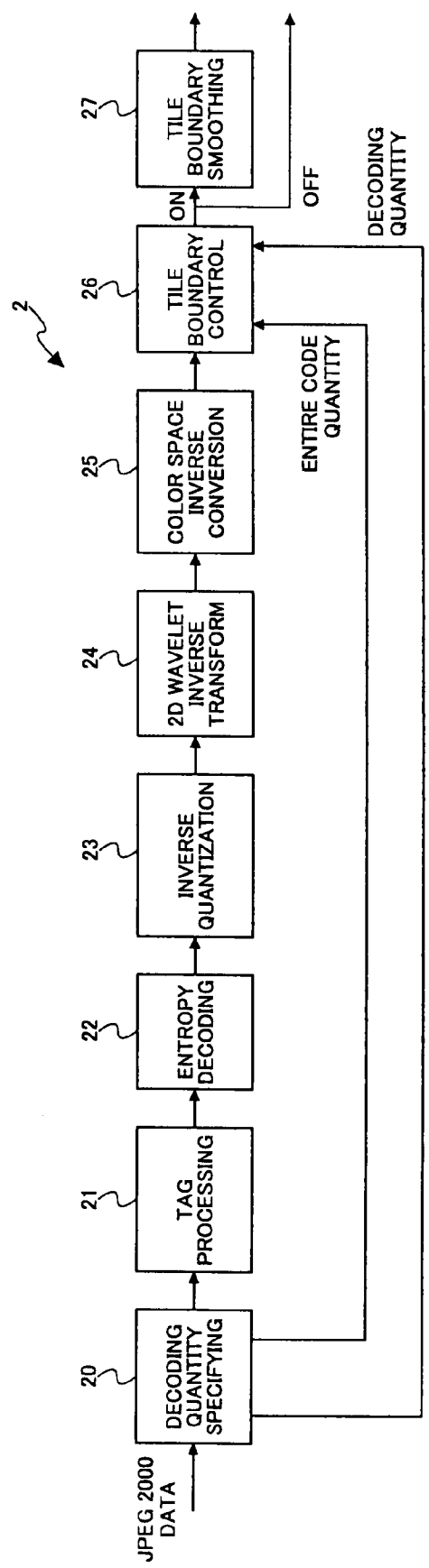
FIG. 12 is a functional block diagram of an image decompressor of the image processing apparatus according to the first embodiment of the present invention.

Next, an expatiation will be given of the image decompressor 2, which forms an important part of the present invention. FIG. 12 is a functional block diagram of the image decompressor 2. As shown in FIG. 12, by the CPU 6 operating based on the computer software (image processing program), the image decompressor 2 realizes the functions of a decoding quantity specifying part 20, a tag processing part 21, an entropy decoding part 22, an inverse quantization part 23, a two-dimensional (2D) wavelet inverse transform part 24, a color space inverse conversion part 25, a tile boundary control part 26, and a tile boundary smoothing part 27. The functions realized by the processing part 21, the entropy decoding part 22, the inverse quantization part 23, the 2D wavelet inverse transform part 24, and the color space inverse conversion part 25 are described with reference to the color space conversion and inverse conversion part 101, the 2D wavelet transform and inverse transform part 102, the quantization and inverse quantization part 103, the entropy coding and decoding part 104, and the tag processing part 105, respectively, of FIG. 1. Therefore, a description thereof is omitted.

Figure 13:
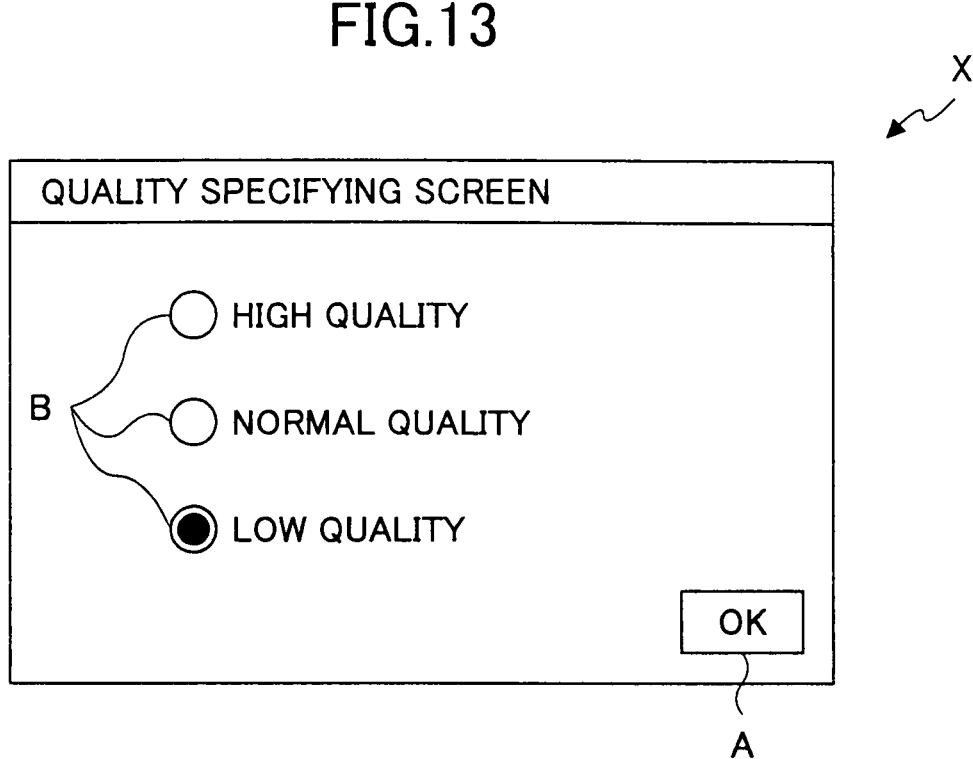
FIG. 13 is a diagram showing an image quality specifying screen displayed by a decoding quantity specifying part of the image decompressor according to the first embodiment of the present invention.

The decoding quantity specifying part 20 specifies the portion of a compressed code which is to be decoded. Hereinafter, this portion may be referred to as decoding quantity. Specifically, the decoding quantity specifying part 20 displays an image quality specifying screen X as shown in FIG. 13 on the display device 15. The image quality specifying screen X includes radio buttons B for selecting the image quality of the image to be displayed on the display device 15 based on a predetermined compressed code from three image quality levels (High, Normal, and Low). When the operator operates the input device 14 to specify one of the three radio buttons B, and then operates an OK button A, the decoding quantity of the compressed code is determined based on the specified image quality level. When the decoding quantity of the compressed code is thus determined, the compressed code to be decoded is output to the tag processing part 21 according to the determined decoding quantity, and simultaneously, the entire (code) quantity of the compressed code and the decoding quantity of the compressed code are output to the tile boundary control part 26.

The tile boundary control part 26 determines whether it is necessary to perform smoothing on the periphery of the tile boundaries in the tile boundary smoothing part 27. The RGB data (R, G, and B component data) obtained in the color space inverse conversion part 25, and the entire quantity of the compressed code and the decoding quantity of the compressed code output from the decoding quantity specifying part 20 are input to the tile boundary control part 26.

Figure 14:
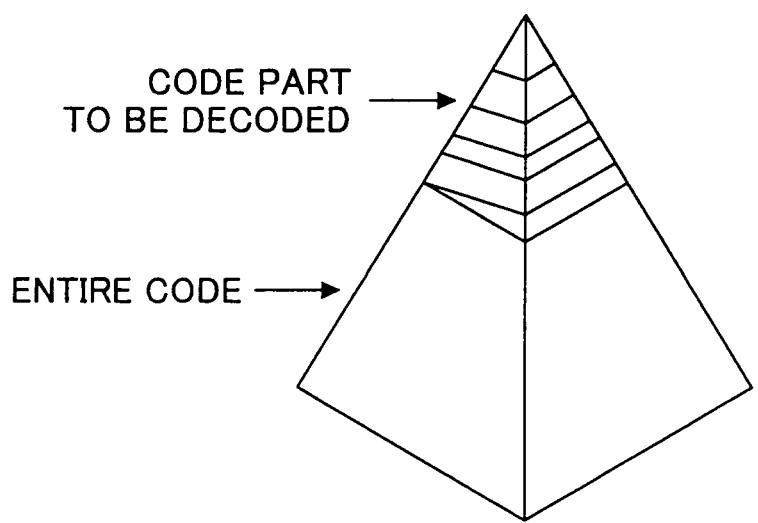
FIG. 14 is a diagram for illustrating a ratio of the decoding quantity to the entire quantity of a compressed code according to the first embodiment of the present invention.

It is determined based on the ratio of the decoding quantity (the quantity of the decoded portion of the compressed data) to the entire quantity of the compressed code whether the smoothing of the periphery of the tile boundaries is required. FIG. 14 is a diagram for illustrating the ratio of the decoding quantity to the entire quantity of the compressed code. As previously described, in JPEG2000, it is possible to extract and decode part of the compressed code. Such partial decoding may be performed by methods such as LRCP, RLCP, RPCL, PCRL, and CPRL, depending on the priorities of layer (L), spatial resolution level (R), position (P), and color component (C). In this embodiment, LRCP is employed for the partial decoding.

According to LRCP, the smaller the decoding quantity, the higher the compression rate of the decoded image; alternatively, the larger the decoding quantity, the lower the compression rate of the decoded image.

In other words, the ratio R of the decoding quantity to the entire quantity of the compressed code is given by:

$$R = \text{Decode}/\text{Code}$$

where Decode is the decoding quantity and Code is the entire quantity.

In an image where the ratio R is larger than a predetermined threshold (for instance, 0.2), the compression rate is low so as to prevent the tile boundary distortion from standing out. Therefore, the tile boundary control part 26 determines that the smoothing of the periphery of the tile boundaries is unnecessary. As a result, the processing time for suppressing the tile boundary distortion can be shortened. On the other hand, in an image where the ratio R is smaller than the predetermined threshold, the compression rate is high so that the tile boundary distortion stands out. Therefore, the tile boundary control part 26 determines that the smoothing of the periphery of the tile boundaries is necessary.

When the tile boundary control part 26 determines that the smoothing of the periphery of the tile boundaries is necessary, the tile boundary control part 26 outputs the RGB data obtained in the color space inverse conversion part 25 to the tile boundary smoothing part 27. On the other hand, when the tile boundary control part 26 determines that the smoothing of the periphery of the tile boundaries is unnecessary, the RGB data obtained in the color space inverse conversion part 25 are directly output to the image display unit 3 from the tile boundary control part 26 without the smoothing of the periphery of the tile boundaries.

The tile boundary smoothing part 27 smoothes the peripheral pixels of the tile boundaries of the RGB data obtained in the color space inverse conversion part 25 so that the tile boundary distortion may become less conspicuous. More specifically, the tile boundary smoothing part 27 smoothes the peripheral pixels of the tile boundaries by varying the strength (or the degree of smoothing) of a low-pass filter for suppressing the tile boundary distortion in accordance with the ratio R.

Figure 15:
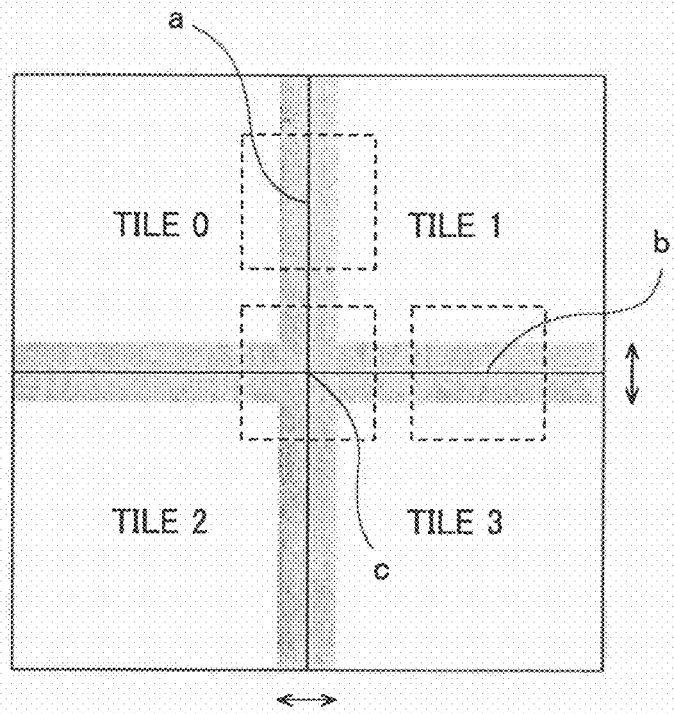
FIG. 15 is a diagram for illustrating an operation of a tile boundary smoothing part of the image decompressor according to the first embodiment of the present invention.

A description will be given of a specific operation of the tile boundary smoothing part 27. FIG. 15 is a diagram for illustrating an operation of the tile boundary smoothing part 27. As shown in FIG. 15, the tile boundary smoothing part 27 performs low-pass filtering on the peripheral pixels of the tile boundaries (or the pixels of the gray-colored region of FIG. 15 including the tile boundary pixels).

Figure 16:
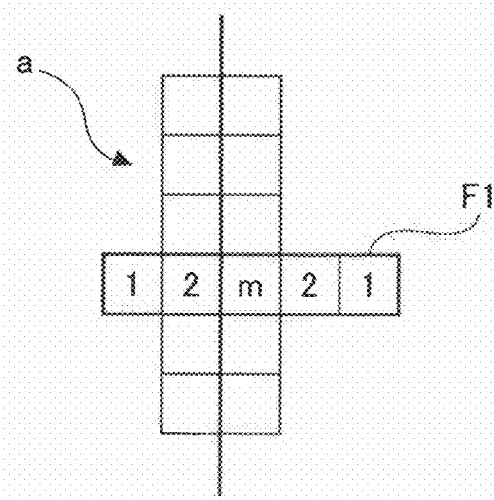
FIG. 16 is a diagram for illustrating low-pass filtering on a vertical tile boundary according to the first embodiment of the present invention.

FIG. 16 is a diagram for illustrating low-pass filtering on a vertical tile boundary. As shown in FIG. 16, by subjecting a vertical tile boundary a (see FIG. 15) to a low-pass filter F1 (a one-dimensional filter extending laterally) perpendicular to the vertical tile boundary a, the lateral tile boundary distortion can be suppressed. In this embodiment, the low-pass filter F1 is a filter extending laterally. However, any low-pass filter that has such a frequency characteristic as to cut a lateral frequency component may replace the low-pass filter F1.

Figure 17:
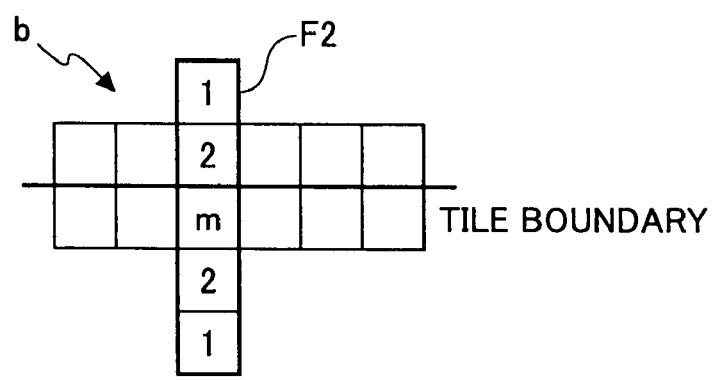
FIG. 17 is a diagram for illustrating low-pass filtering on a lateral tile boundary according to the first embodiment of the present invention.

FIG. 17 is a diagram for illustrating low-pass filtering on a lateral tile boundary. As shown in FIG. 17, by subjecting a lateral tile boundary b (see FIG. 15) to a low-pass filter F2 (a one-dimensional filter extending vertically) perpendicular to the lateral tile boundary b, the vertical tile boundary distortion can be suppressed. In this embodiment, the low-pass filter F2 is a filter extending vertically. However, any low-pass filter that has such a frequency characteristic as to cut a vertical frequency component may replace the low-pass filter F2.

Figure 18:
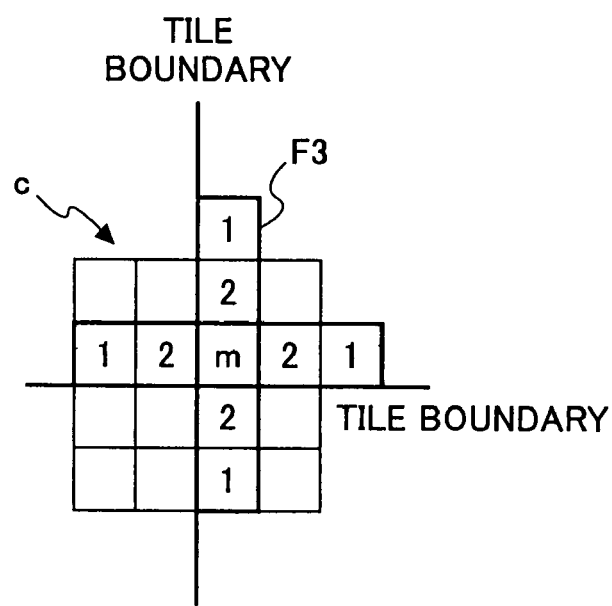
FIG. 18 is a diagram for illustrating low-pass filtering on the periphery of the intersection of a vertical tile boundary and a lateral tile boundary according to the first embodiment of the present invention.

FIG. 18 is a diagram for illustrating low-pass filtering on the periphery of the intersection of a vertical tile boundary and a lateral tile boundary. As shown in FIG. 18, by subjecting the periphery of the intersection of the vertical and lateral tile boundaries a and b to a cross-shaped low-pass filter F3, the tile boundary distortion in the periphery of the vertical and lateral tile boundaries a and b can be suppressed. In this embodiment, the low-pass filter F3 is a cross-shaped filter. However, any low-pass filter that has such a frequency characteristic as to cut both vertical and lateral frequency components may replace the low-pass filter F3.

A weighting factor m in the center of each of the low-pass filters F1, F2, and F3 may be variably controlled based on the decoding quantity of a compressed code. The weighting factor m is controlled in accordance with the ratio R based on the following equation:

$$m = 32 * R$$

This control method is only an example, and any control method that increases the value of the weighting factor m in proportion to the ratio R is employable according to the present invention.

Thus, the tile boundary distortion is smoothed by subjecting the tile boundaries of each decoded frame to low-pass filtering while controlling the degree of smoothing of the low-pass filtering in accordance with the ratio R of the decoding quantity to the entire quantity of the compressed code. As a result, optimum low-pass filtering may be performed (or an optimum adaptive post-filter may be applied) in accordance with the ratio R, so that a reproduced image having good quality can be obtained.

In this embodiment, the description is given based on the image compression and decompression method based on the "JPEG2000 algorithm." However, any image compression and decompression method according to which tile boundary position information is included in a compressed code is employable according to the present invention.

Further, according to this embodiment, the compressed code to be decoded is downloaded from the server computer S to be stored in the code stream storage part 4, and then the decoding quantity specifying part 20 specifies the decoding quantity of the compressed code. Alternatively, however, the decoding quantity specifying part 20 may specify the decoding quantity of a compressed code stored in the code stream storage part (not shown in the drawings) of the server computer S, and only the specified quantity of the compressed code may be downloaded from the code stream storage part.

Second Embodiment

Next, a description will be given of a second embodiment of the present invention. In this embodiment, the same elements as those described in the first embodiment are referred to by the same numerals, and a description thereof will be omitted. The second embodiment differs from the first embodiment in the function of the image decompressor 2. Schematically, low-pass filtering is performed not on the peripheral pixels of every tile boundary, but on the peripheral pixels of only a specified tile boundary.

Figure 19:
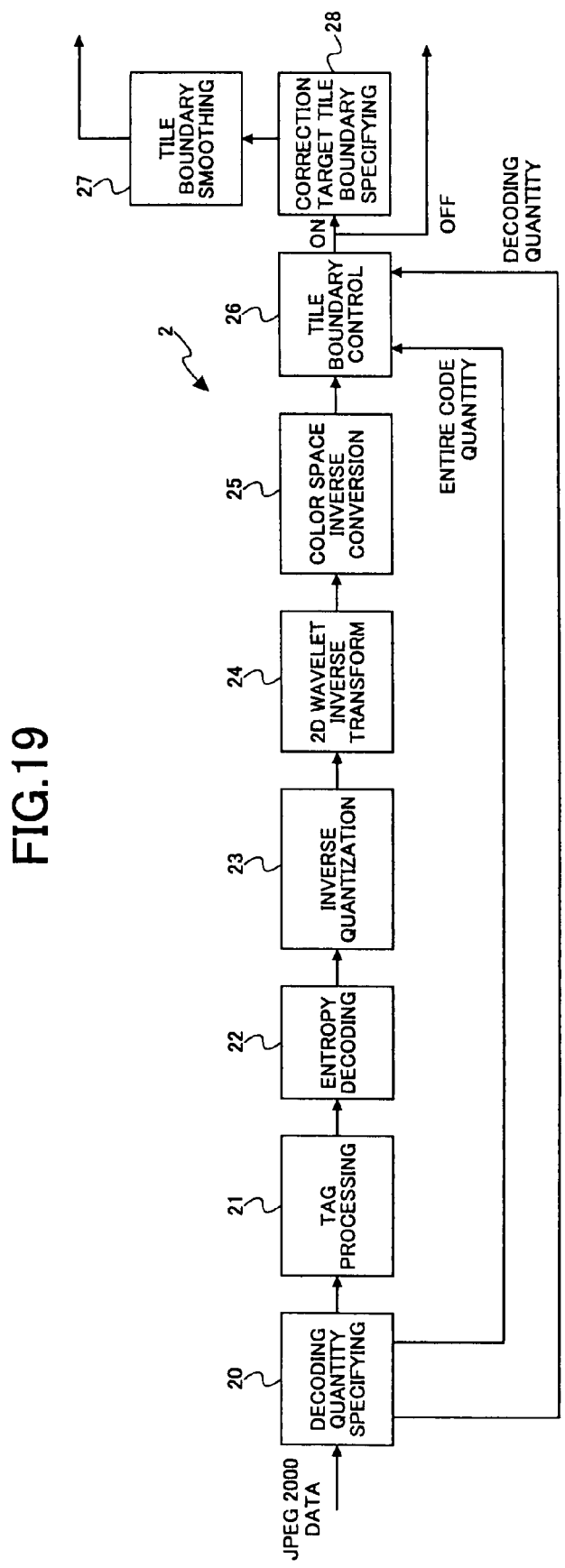
FIG. 19 is a functional block diagram of the image decompressor according to a second embodiment of the present invention.

FIG. 19 is a functional block diagram of the image decompressor 2 according to the second embodiment. As shown in FIG. 19, by the CPU 6 operating based on the computer software (image processing program), the image decompressor 2 realizes the functions of the decoding quantity specifying part 20, the tag processing part 21, the entropy decoding part 22, the inverse quantization part 23, the 2D wavelet inverse transform part 24, the color space inverse conversion part 25, the tile boundary control part 26, a correction target tile boundary specifying part 28, and the tile boundary smoothing part 27.

The correction target tile boundary specifying part 28 specifies a tile boundary to be subjected to low-pass filtering in the tile boundary smoothing part 27. The RGB data obtained in the color space inverse conversion part 25 and determined to require smoothing of the periphery of its tile boundaries by the tile boundary control part 26 is input to the correction target tile boundary specifying part 28.

FIGS. 20A through 21B are diagrams for illustrating low-pass filtering only on the tile boundaries within an ROI (region of interest). The ROI is part (or a region) of the entire image which part is cut out from the entire image to be enlarged or emphasized compared with other parts of the image.

Figure 20A:
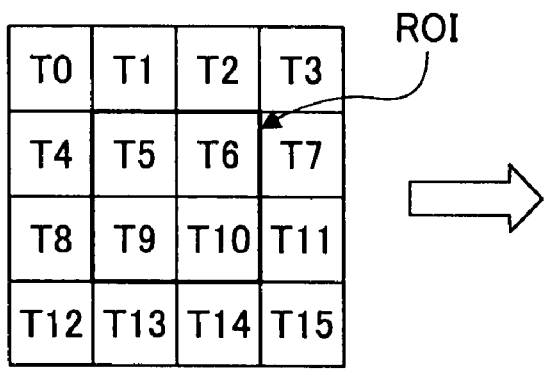
FIGS. 20A and 20B are diagrams for illustrating a case of performing low-pass filtering only on the tile boundaries within an ROI according to the second embodiment of the present invention.
Figure 20B:
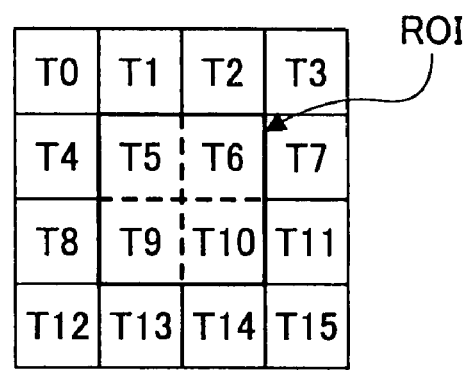

FIGS. 20A and 20B show the case where the ROI is formed along tile boundaries. Once the boundary of the ROI is set as shown in FIG. 20A, the tile boundaries to be subjected to low-pass filtering are set as indicated by the broken lines in FIG. 20B. No low-pass filtering is performed on the boundary of the ROI indicated by the solid line in FIG. 20B.

Figure 21A:
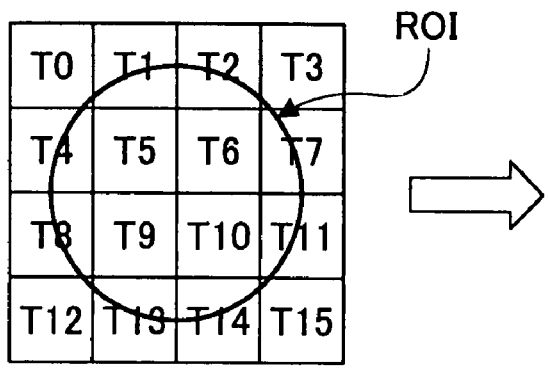
FIGS. 21A and 21B are diagrams for illustrating another case of performing low-pass filtering only on the tile boundaries within an ROI according to the second embodiment of the present invention.
Figure 21B:
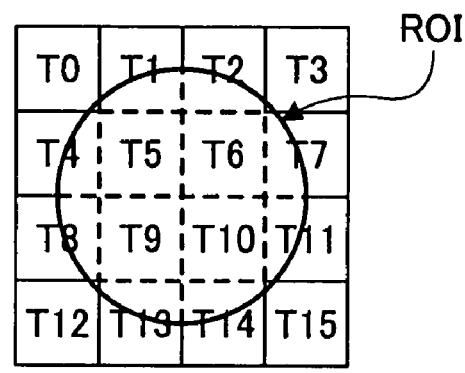

FIGS. 21A and 21B show the case where the ROI is not formed along tile boundaries. Once the boundary of the ROI is set as shown in FIG. 21A, the tile boundaries to be subjected to low-pass filtering are set as indicated by the broken lines in FIG. 21B. It is calculated by operations whether a tile boundary pixel is inside the ROI. If the tile boundary pixel is inside the ROI, the tile boundary pixel is subjected to low-pass filtering. If the tile boundary pixel is not inside the ROI, no low-pass filtering is performed on the tile boundary pixel.

According to this embodiment, whether to perform low-pass filtering on a tile boundary pixel is determined based on whether the tile boundary pixel is inside the ROI. Alternatively, it is also possible to perform low-pass filtering only on the tile boundary pixels of an image region having a large vertical or lateral edge amount.

Thus, the correction target tile boundary specifying part 28 specifies the tile boundary pixels to be subjected to low-pass filtering, and outputs the RGB data obtained in the color space inverse conversion part 25 to the tile boundary smoothing part 27.

By thus specifying the tile boundary pixels to be subjected to low-pass filtering, the processing time for suppressing the tile boundary distortion can be shortened.

In the above-described embodiments, the image processing apparatus 1 is a personal computer. Alternatively, the image processing apparatus 1 may be a digital camera, a PDA, or a mobile phone according to the present invention.

Third Embodiment

Figure 22:
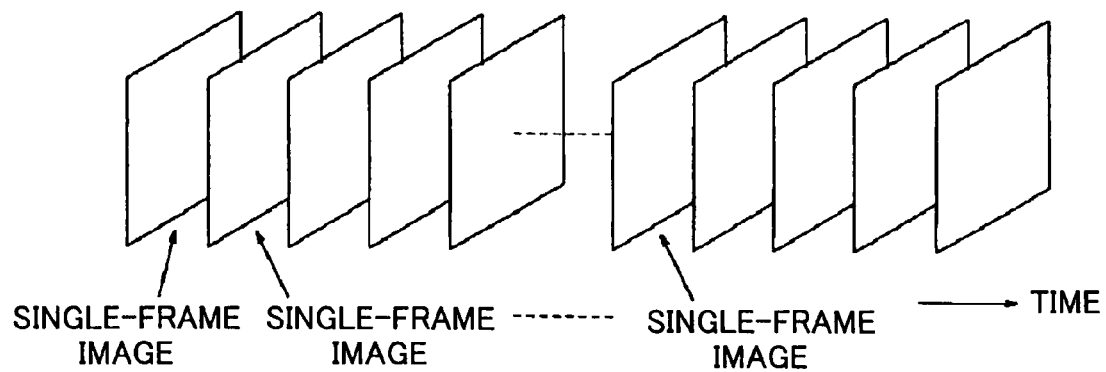
FIG. 22 is a diagram for illustrating the concept of Motion JPEG2000.

A description will be given of a third embodiment of the present invention. This embodiment relates to a moving image compression and decompression technique represented by "Motion JPEG2000." In the "Motion JPEG2000 algorithm," the "JPEG2000 algorithm," which is applied to a still image, or a single frame, is extended to be applied to a plurality of frames. That is, as shown in FIG. 22, "Motion JPEG2000" successively displays single-frame JPEG2000 images at a predetermined frame rate as a moving image.

Figure 23:
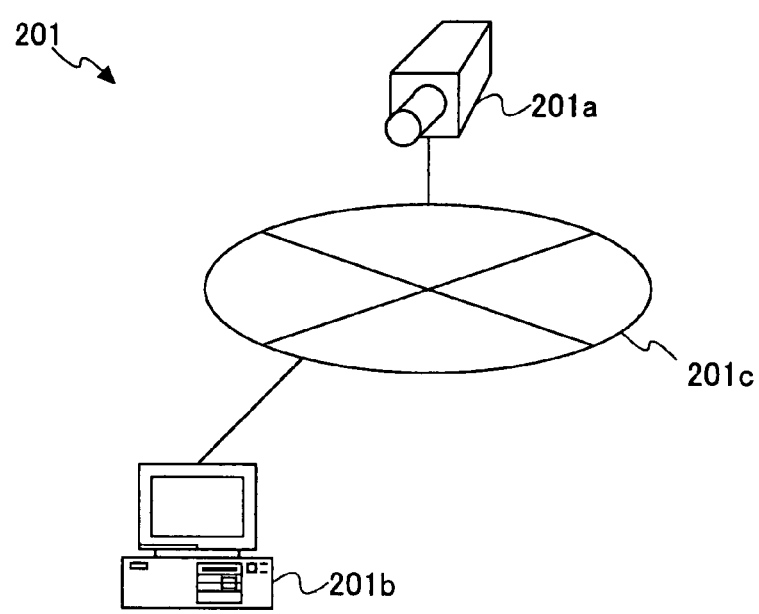
FIG. 23 is a diagram showing a monitor camera system according to a third embodiment of the present invention.
Figure 24:
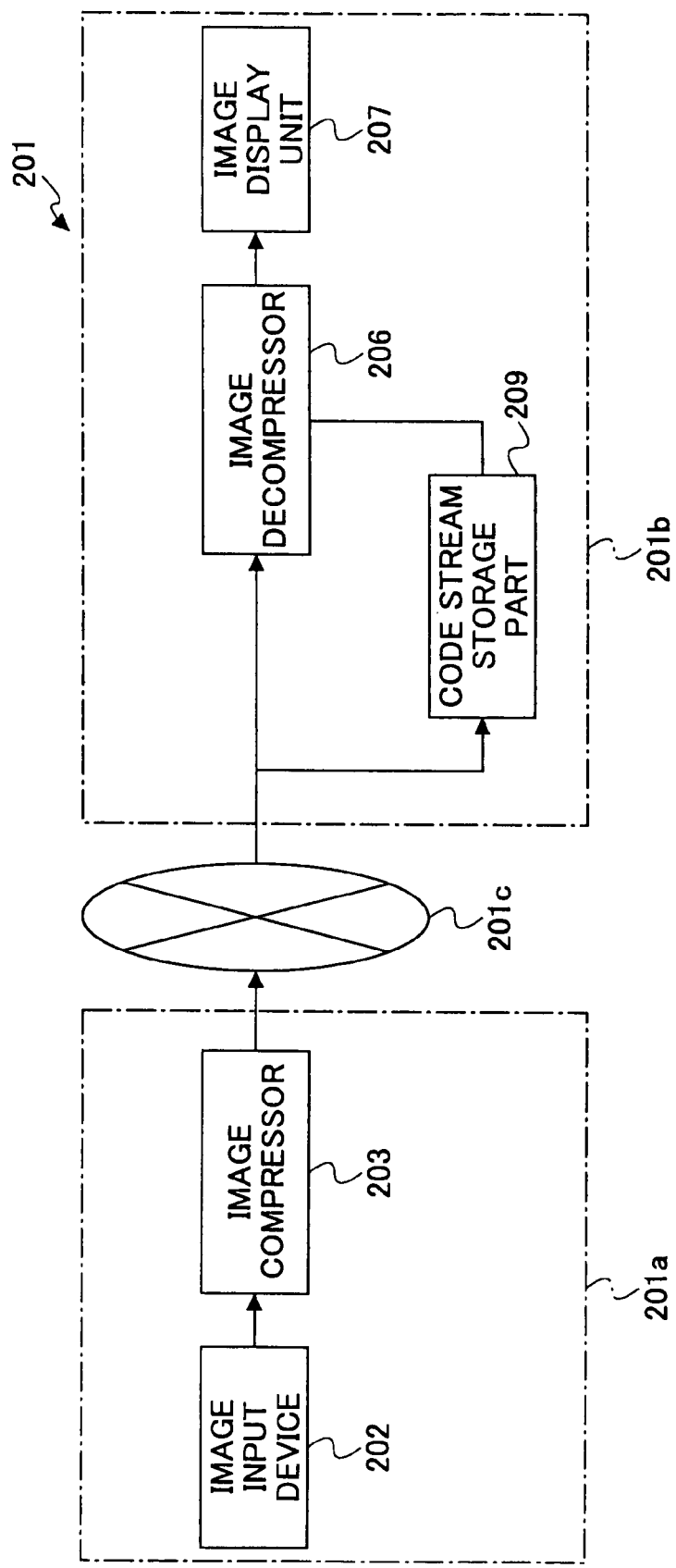
FIG. 24 is a functional block diagram of the monitor camera system according to the third embodiment of the present invention.

FIG. 23 is a diagram showing a monitor camera system 201 according to the third embodiment. FIG. 24 is a functional block diagram of the monitor camera system 201. As shown in FIG. 23, the monitor camera system 1, to which a moving image display system according to the present invention is applied, includes a monitor camera 201a functioning as an image recorder and a personal computer (PC) 201b functioning as an image processor. The monitor camera 201a and the PC 201b are connected via a network 201c, which may be the Internet.

As shown in FIG. 24, the monitor camera 201a of the monitor camera system 201 includes an image input device 202 and an image compressor 203. The image input device 202 captures a moving image using a photoelectric transducer device such as a CCD or a MOS image sensor. The image compressor 3 performs compression coding on the captured image data. The PC 201b includes an image decompressor 206, an image display unit 207, and a code stream storage part 209. The image decompressor 206 is an image decoding device that decompresses (decodes) the code stream data generated in the image compressor 203 of the monitor camera 201a into the image data of the moving image. The image display unit 207 displays the moving image based on the decompressed image data. The code stream storage part 209 stores the code stream data generated in the image compressor 203 of the monitor camera 201a. The code stream storage part 209, which functions as a common buffer or storage for storing the code stream data of moving images for a long period of time, is used differently for the different purposes.

Figure 25:
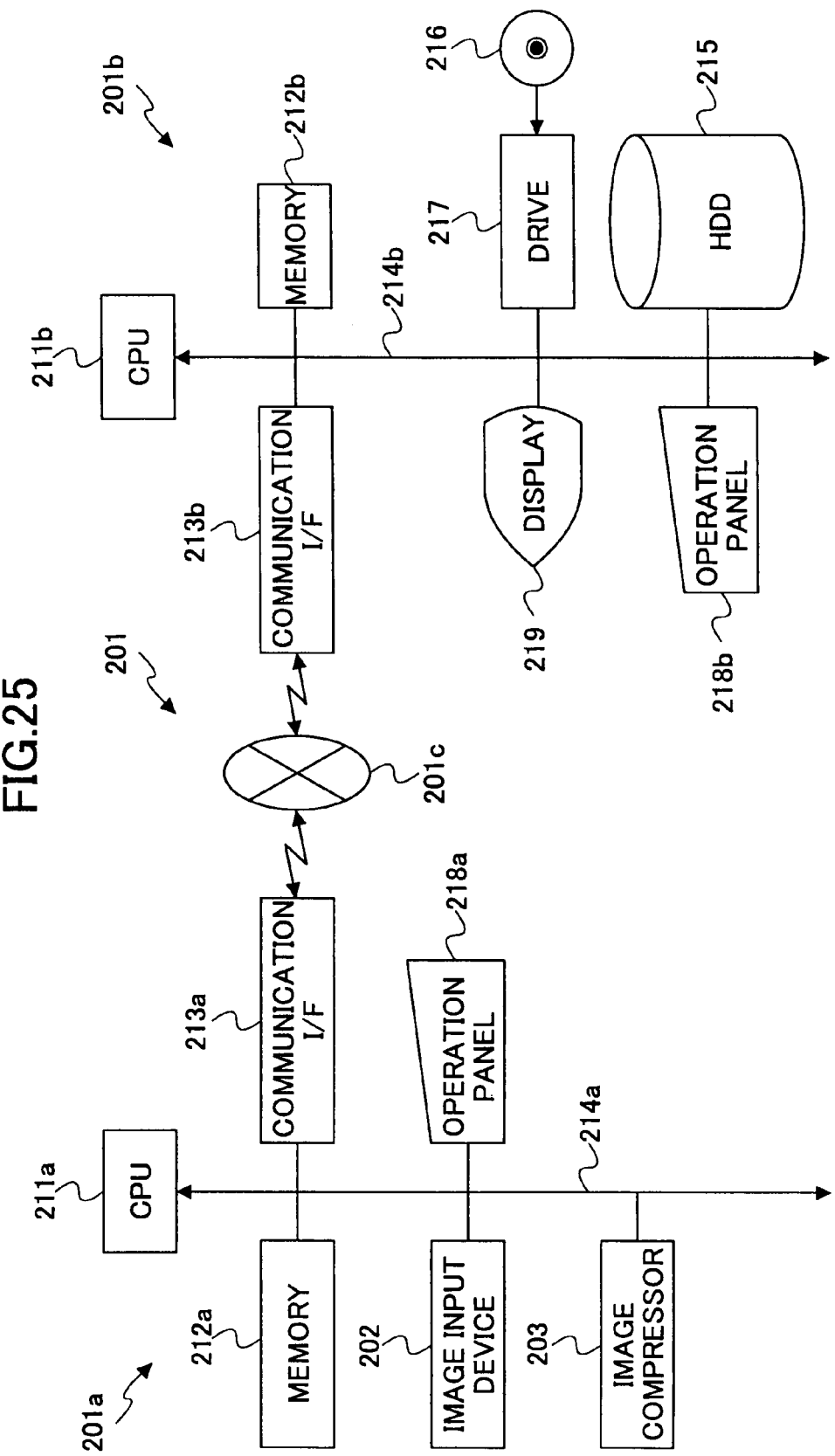
FIG. 25 is a block diagram showing a hardware configuration of the monitor camera system according to the third embodiment of the present invention.

FIG. 25 is a block diagram showing a hardware configuration of the monitor camera system 201. As shown in FIG. 25, the monitor camera 201a and the PC 201b forming the monitor camera system 201 include respective CPUs 211a and 211b each forming an important part of the computer and controlling each part of the computer. The CPUs 211a and 211b are connected via buses 214a and 214b to memories 212a and 212b that are recording media composed of a variety of ROMs and RAMs, predetermined communication interfaces (I/Fs) 213a and 213b communicating with the network 201c, and operation panels 218a and 218b receiving operations input by users, respectively.

As previously described, the monitor camera 201a includes the image input device 202 and the image compressor 203, which are also connected via the bus 214a to the CPU 211a.

The PC 201b includes the image display unit 207, a display 219 that is a display device such as a CRT or an LCD, an HDD 215 that is an external storage device functioning as the code stream storage part 209, and a drive 217 that is a mechanism for reading from a storage medium 216 computer software that is a distributed program (for instance, a moving image processing program). The image display unit 207, the display 219, the HDD 215, and the drive 217 are also connected via the bus 214b to the CPU 211b.

A ROM of the memory 212b of the PC 201b stores control programs such as a moving image processing program for processing moving images. The moving image processing program realizes a program according to the present invention. The function of the image decompressor 206 is realized by the processing executed by the CPU 211b based on the moving image processing program.

Any of media of a variety of types, such as optical disks including CDs and DVDs, magneto-optical disks, magnetic disks including flexible disks, and semiconductor memory devices, may be employed as the storage medium 16 according to the present invention. Alternatively, the moving image processing program may be downloaded from the network 201c to be installed in the memory 212b. In this case, the storage device that stores the moving image processing program on the transmitter-side server is also a storage medium of the present invention. The moving image processing program may operate on a predetermined OS. In this case, part of later-described operations may be executed by the OS. Alternatively, the moving image processing program may be included in a group of program files composing a predetermined application or OS.

Next, a brief description will be given of the operation of each part of the monitor camera system 201. First, the image input device 202 of the monitor camera 201a captures a moving image in units of frames using a photoelectric transducer device such as a CCD or a MOS image sensor, and outputs the digital pixel value signal of the moving image to the image compressor 203. The image compressor performs compression coding on the digital pixel value signal in accordance with the "Motion JPEG2000 algorithm." By this processing in the image compressor 203, normally, the moving image data of each of the R, G, and B components of the original moving image is divided into a plurality of tiles in each frame so as to be hierarchically compressed and encoded into coded data tile by tile. The moving image data may not be divided into tiles. In this case, each frame is considered as a single tile. The code stream data (Motion JPEG2000 data) thus generated in accordance with the "Motion JPEG2000 algorithm" is output via the network 201c to the PC 201b.

The code stream data output via the network 201c to the PC 201b is stored in the code stream storage part 209 and decompressed in the image decompressor 206 in the PC 201b. The image data of the moving image generated by the decompression in the image decompressor 206 is output to the image display unit 207, and the moving image based on the decompressed image data is displayed on the display 219.

Figure 26:
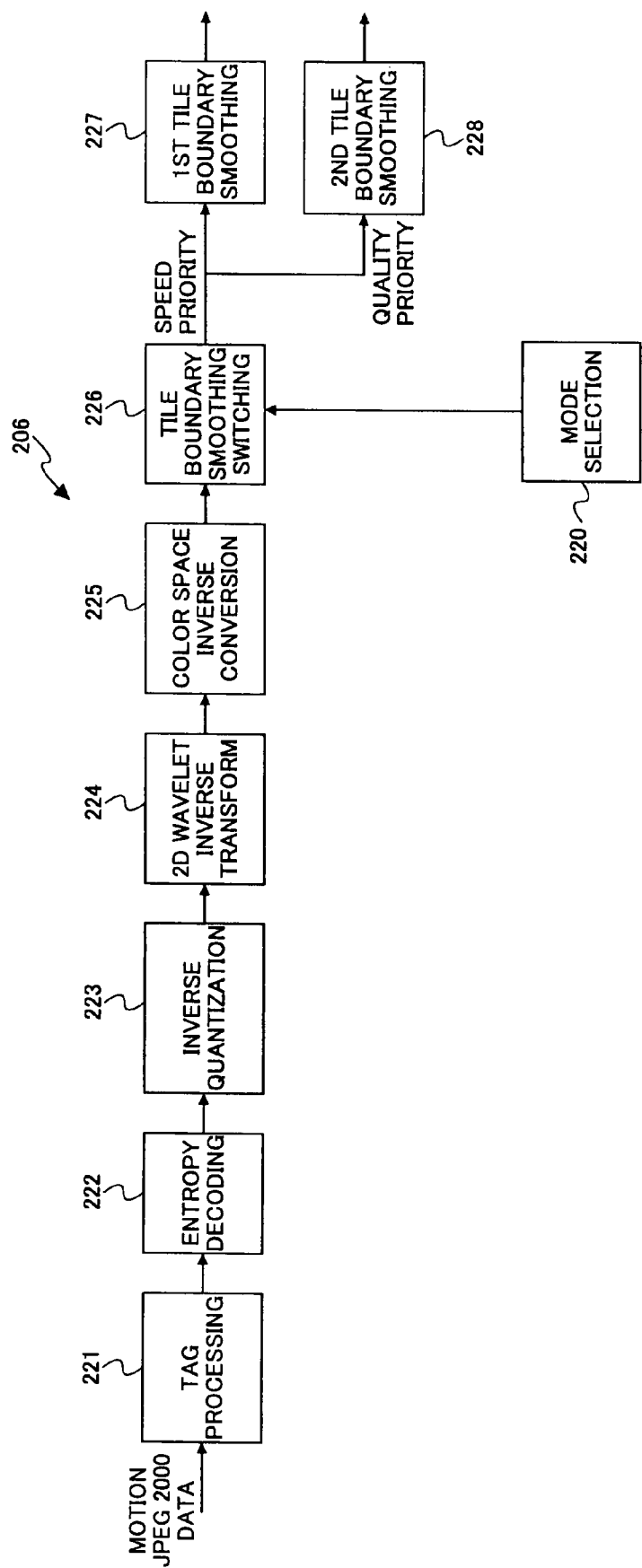
FIG. 26 is a functional block diagram of an image decompressor of a PC of the monitor camera system according to the third embodiment of the present invention.

Next, an expatiation will be given of the image decompressor 206, which is an important part of the present invention. FIG. 26 is a functional block diagram of the image decompressor 206. As shown in FIG. 26, by the CPU 211b operating based on the moving image processing program, the image decompressor 206 realizes the functions of a mode selection part 220, a tag processing part 221, an entropy decoding part 222, an inverse quantization part 223, a 2D wavelet inverse transform part 224, a color space inverse conversion part 225, a tile boundary smoothing switching part 226, a first tile boundary smoothing part 227, and a second tile boundary smoothing part 228. The functions realized by the tag processing part 221, the entropy decoding part 222, the inverse quantization part 223, the 2D wavelet inverse transform part 224, and the color space inverse conversion part 225 are described with reference to the color space conversion and inverse conversion part 101, the 2D wavelet transform and inverse transform part 102, the quantization and inverse quantization part 103, the entropy coding and decoding part 104, and the tag processing part 105, respectively, of FIG. 1. Therefore, a description thereof will be omitted.

Figure 27:
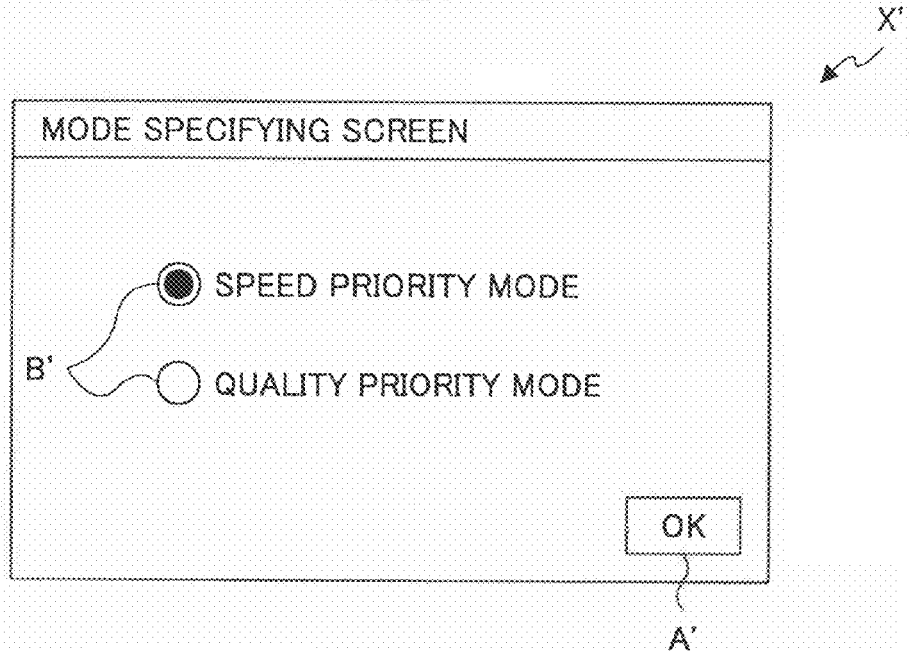
FIG. 27 is a diagram showing an image quality specifying screen displayed by a mode selection part of the image decompressor according to the third embodiment of the present invention.

The mode selection part 220 specifies a processing mode. Specifically, the mode selection part 220 displays a mode specifying screen X' as shown in FIG. 27 on the display 219. The mode specifying screen X' includes radio buttons B' for selecting one of a speed priority mode giving priority to processing speed and a quality priority mode giving priority to image quality. When an operator operates the operation panel 218B to specify one of the radio buttons B' and operate an OK button A', the processing mode is specified. Once the processing mode is thus specified, a signal indicating the specified processing mode is output to the tile boundary smoothing switching part 226.

The tile boundary smoothing switching part 226 determines whether the smoothing of the periphery of a tile boundary is to be performed in the first tile boundary smoothing part 227 or in the second tile boundary smoothing part 228. The RGB data obtained in the color space inverse conversion part 225 and the processing mode indicating signal output from the mode selection part 220 are input to the tile boundary smoothing switching part 226.

If the tile boundary smoothing switching part 226 determines that the speed priority mode is selected, the tile boundary smoothing switching part 226 outputs the RGB data to the first tile boundary smoothing part 227. If the tile boundary smoothing switching part 226 determines that the quality priority mode is selected, the tile boundary smoothing switching part 226 outputs the RGB data to the second tile boundary smoothing part 228.

Figure 28:
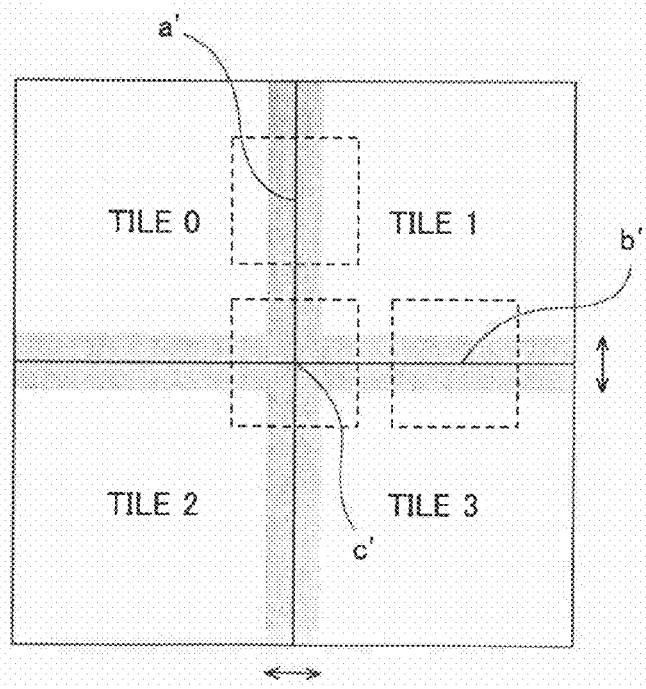
FIG. 28 is a diagram for illustrating operations of first and second tile boundary smoothing parts of the image decompressor according to the third embodiment of the present invention.

Each of the first and second tile boundary smoothing parts 227 and 228 smoothes the peripheral pixels of the tile boundaries of the RGB data so that the tile boundary distortion may become less conspicuous. FIG. 28 is a diagram for illustrating operations of the first and second tile boundary smoothing parts 227 and 228. As shown in FIG. 28, each of the first and second tile boundary smoothing parts 227 and 228 performs low-pass filtering on the peripheral pixels of the tile boundaries (or the pixels of the gray-colored region of FIG. 28 including the tile boundary pixels).

Figure 29:
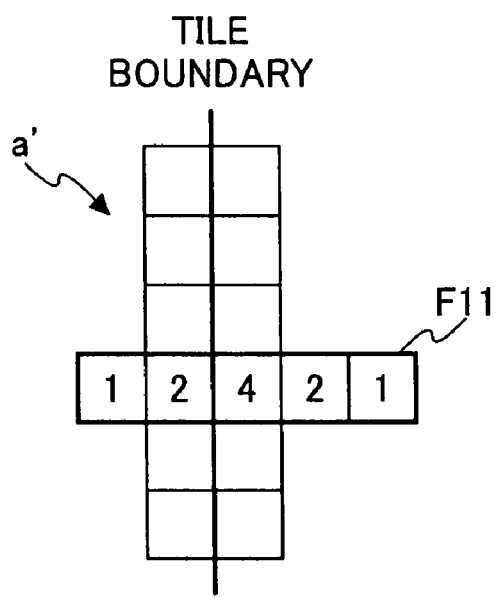
FIG. 29 is a diagram for illustrating low-pass filtering on a vertical tile boundary by the first tile boundary smoothing part according to the third embodiment of the present invention.

First, a description will be given of a specific operation of the first tile boundary smoothing part 227. FIG. 29 is a diagram for illustrating low-pass filtering on a vertical tile boundary. As shown in FIG. 29, by subjecting a vertical tile boundary a' (see FIG. 28) to a low-pass filter F11 (a one-dimensional filter extending laterally) perpendicular to the vertical tile boundary a', the lateral tile boundary distortion can be suppressed. In this embodiment, the low-pass filter F11 is a filter extending laterally. However, any low-pass filter that has such a frequency characteristic as to cut a lateral frequency component may replace the low-pass filter F11.

Figure 30:
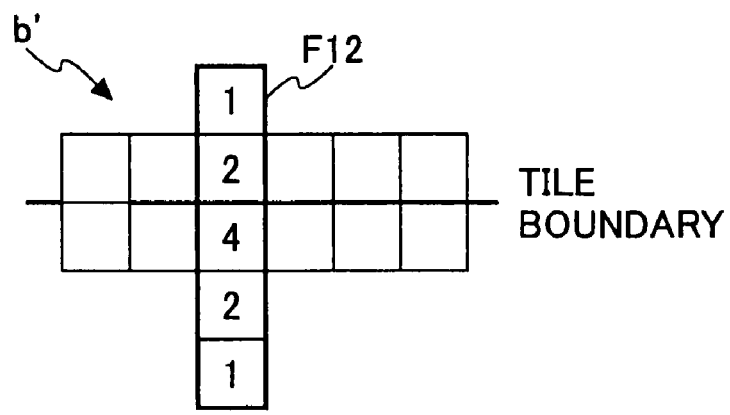
FIG. 30 is a diagram for illustrating low-pass filtering on a lateral tile boundary by the first tile boundary smoothing part according to the third embodiment of the present invention.

FIG. 30 is a diagram for illustrating low-pass filtering on a lateral tile boundary. As shown in FIG. 30, by subjecting a lateral tile boundary b' (see FIG. 28) to a low-pass filter F12 (a one-dimensional filter extending vertically) perpendicular to the lateral tile boundary b', the vertical tile boundary distortion can be suppressed. In this embodiment, the low-pass filter F12 is a filter extending vertically. However, any low-pass filter that has such a frequency characteristic as to cut a vertical frequency component may replace the low-pass filter F12.

Figure 31:
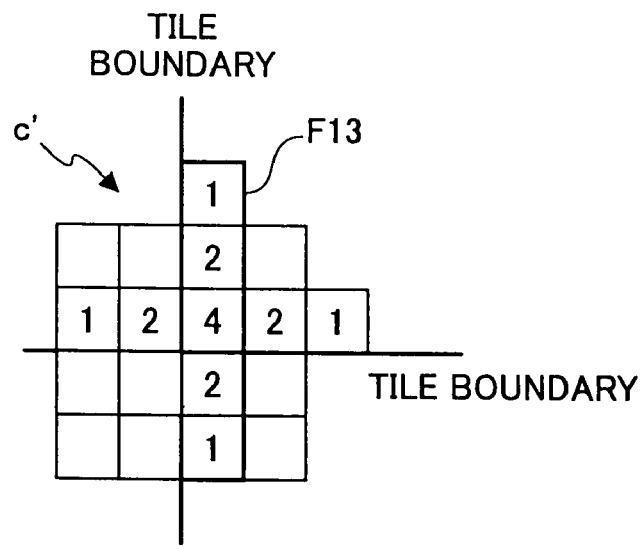
FIG. 31 is a diagram for illustrating low-pass filtering on the periphery of the intersection of a vertical tile boundary and a lateral tile boundary by the first tile boundary smoothing part according to the third embodiment of the present invention.

FIG. 31 is a diagram for illustrating low-pass filtering on the periphery of the intersection of a vertical tile boundary and a lateral tile boundary. As shown in FIG. 31, by subjecting the periphery of the intersection of the vertical and lateral tile boundaries a' and b' to a cross-shaped low-pass filter F13, the tile boundary distortion in the periphery of the vertical and lateral tile boundaries a' and b' can be suppressed. In this embodiment, the low-pass filter F13 is a cross-shaped filter. However, any low-pass filter that has such a frequency characteristic as to cut both vertical and lateral frequency components may replace the low-pass filter F13.

Figure 32:
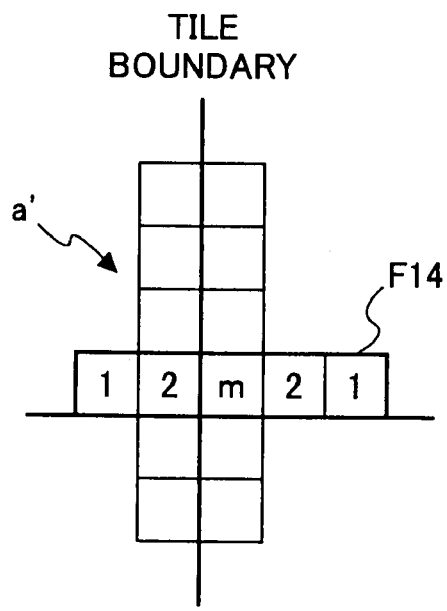
FIG. 32 is a diagram for illustrating low-pass filtering on a vertical tile boundary by the second tile boundary smoothing part according to the third embodiment of the present invention.

Next, a description will be given of a specific operation of the second tile boundary smoothing part 228. FIG. 32 is a diagram for illustrating low-pass filtering on a vertical tile boundary. As shown in FIG. 32, by subjecting a vertical tile boundary a' (see FIG. 28) to a low-pass filter F14 (a one-dimensional filter extending laterally) perpendicular to the vertical tile boundary a', the lateral tile boundary distortion can be suppressed. In this embodiment, the low-pass filter F14 is a filter extending laterally. However, any low-pass filter that has such a frequency characteristic as to cut a lateral frequency component may replace the low-pass filter F14.

Figure 33:
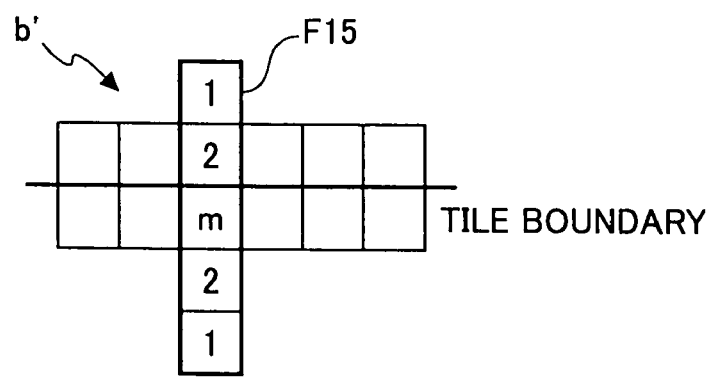
FIG. 33 is a diagram for illustrating low-pass filtering on a lateral tile boundary by the second tile boundary smoothing part according to the third embodiment of the present invention.

FIG. 33 is a diagram for illustrating low-pass filtering on a lateral tile boundary. As shown in FIG. 33, by subjecting a lateral tile boundary b' (see FIG. 28) to a low-pass filter F15 (a one-dimensional filter extending vertically) perpendicular to the lateral tile boundary b', the vertical tile boundary distortion can be suppressed. In this embodiment, the low-pass filter F15 is a filter extending vertically. However, any low-pass filter that has such a frequency characteristic as to cut a vertical frequency component may replace the low-pass filter F15.

Figure 34:
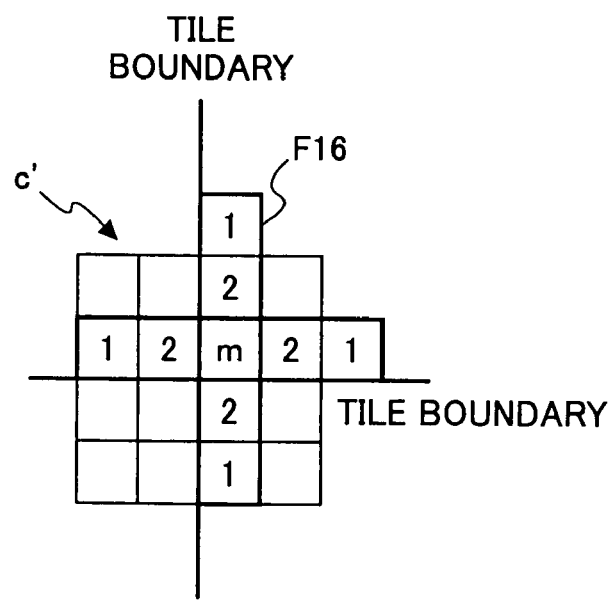
FIG. 34 is a diagram for illustrating low-pass filtering on the periphery of the intersection of a vertical tile boundary and a lateral tile boundary by the second tile boundary smoothing part according to the third embodiment of the present invention.

FIG. 34 is a diagram for illustrating low-pass filtering on the periphery of the intersection of a vertical tile boundary and a lateral tile boundary. As shown in FIG. 34, by subjecting the periphery of the intersection of the vertical and lateral tile boundaries a' and b' to a cross-shaped low-pass filter F16, the tile boundary distortion in the periphery of the vertical and lateral tile boundaries a' and b' can be suppressed. In this embodiment, the low-pass filter F16 is a cross-shaped filter. However, any low-pass filter that has such a frequency characteristic as to cut both vertical and lateral frequency components may replace the low-pass filter F16.

A weighting factor m in the center of each of the low-pass filters F14, F15, and F16 may be variably controlled based on the distance between a pixel and its closest tile boundary side (hereinafter referred to as a pixel-boundary distance) and the edge amount of the pixel. That is, the second tile boundary smoothing part 228 switches the degree of smoothing of each of the low-pass filters F14, F15, and F16 based on the pixel-boundary distance of a peripheral pixel of a tile boundary and the edge amount of the peripheral pixel.

First, a description will be given of a method of calculating the pixel-boundary distance of a peripheral pixel of a tile boundary. As shown in FIG. 35, with respect to each pixel in a tile, the distances from all four sides of the tile boundary (or the upper, lower, right, and left tile boundaries) are calculated. The minimum of the calculated distances is set as the pixel-boundary distance of the pixel.

Next, a description will be given of a method of calculating the edge amount of a peripheral pixel of a tile boundary. FIG. 36 is a diagram showing an edge amount calculation filter according to this embodiment. The edge amount of the peripheral pixel is calculated using the edge amount calculation filter shown in FIG. 36. The edge amount calculation filter calculates the edge amount in the diagonal directions. If the edge amount is calculated vertically and laterally, the edge amount is calculated to be larger on the tile boundary, so that the tile boundary becomes conspicuous. In order to avoid this, the edge amount is calculated diagonally in this embodiment. The tile boundary direction is obtained from the information included in the coded data.

That is, letting the pixel-boundary distance and the edge amount of a peripheral pixel of a tile boundary be d and E, respectively, the weighting factor m in the center of each of the low-pass filters F14, F15, and F16 is calculated based on one of the following equations (1) through (3) depending on the conditions of d and E. That is:

if $d=0$ and $abs(E) \geq 255$, $m=4+abs(E)$ \qquad (1);

if $d=0$ and $abs(E)<255$, $m=4$ \qquad (2); and if $d>0$, $m=\max(4+64*d, 4+abs(E))$ \qquad (3).

The above-described equations mean that the degree of smoothing of the low-pass filter is reduced as the pixel-boundary distance or the absolute value of the edge amount is increased. The value of m is separately controlled based on the condition of E only in case of d=0 because the tile boundary becomes conspicuous unless the most peripheral pixels of the tile boundary are subjected to low-pass filtering of a somewhat high degree of smoothing.

As a result, an image can be reproduced with better quality in the quality priority mode, in which the second tile boundary smoothing part 228 adaptively controls the smoothing degree of low-pass filtering, than in the speed priority mode, in which the first tile boundary smoothing part 227 performs uniform low-pass filtering on the pixels.

Further, the second tile boundary smoothing part 228 for the quality priority mode, which adaptively controls the smoothing degree of low-pass filtering based on the pixel-boundary distance and the edge amount of a peripheral pixel of a tile boundary, can suppress image degradation that occurs when the periphery of the tile boundary has strong edges while controlling tile boundary distortion.

The smoothing of tile boundary distortion can be performed by suitably selecting the quality priority mode, which gives priority to image quality, or the speed priority mode, which gives priority to processing speed. By balancing the rate of decoding with the image quality realized by smoothing the tile boundary distortion, the tile boundary distortion can be suppressed while eliminating an undesirable effect such as dropped frames caused by decoding delay with respect to reproduction.

In this embodiment, the description is given based on the image compression and decompression method based on the "JPEG2000 algorithm." However, any image compression and decompression method according to which tile boundary position information is included in a compressed code is employable according to the present invention.

Fourth Embodiment

Next, a description will be given of a fourth embodiment of the present invention. In the fourth embodiment, the same elements as those of the third embodiment are referred to by the same numerals, and a description thereof will be omitted. The same applies to the following embodiments.

Figure 37:
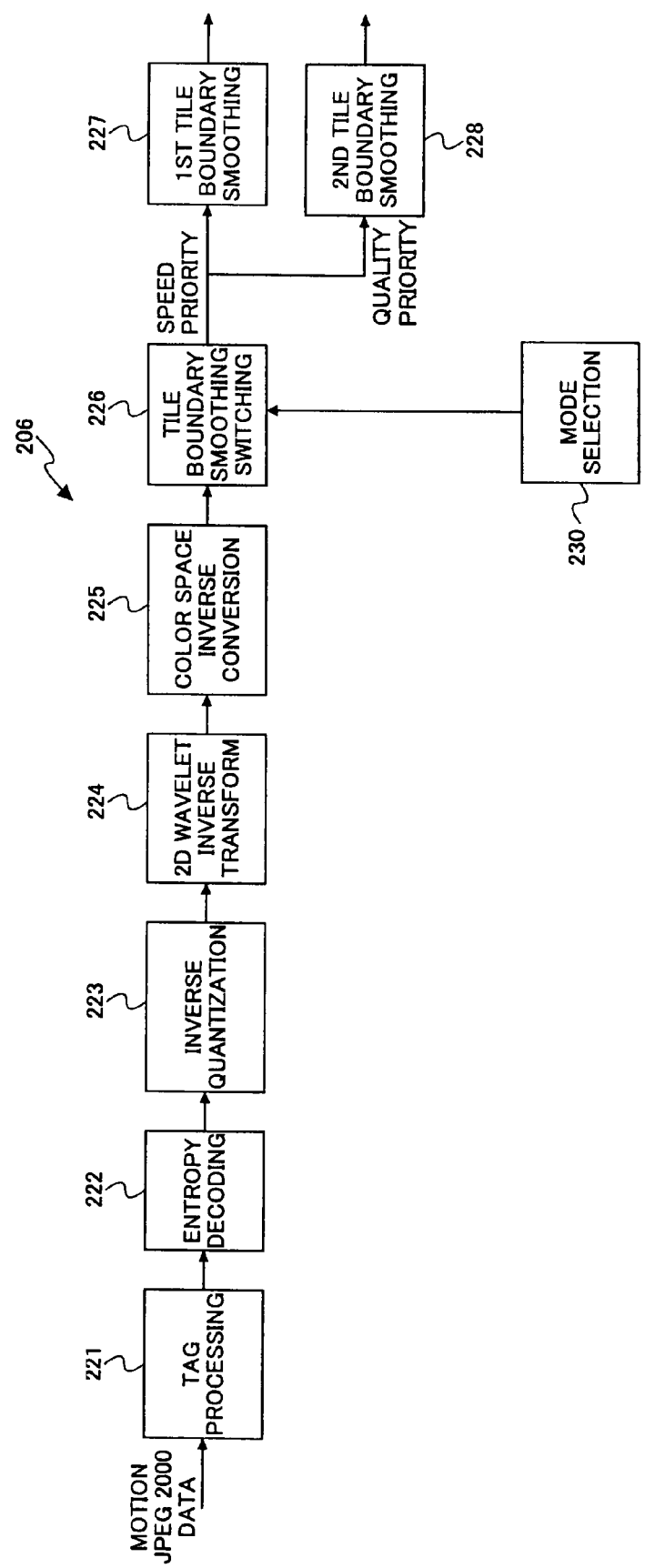
FIG. 37 is a functional block diagram of the image decompressor according to a fourth embodiment of the present invention.

FIG. 37 is a functional block diagram of the image decompressor 206 according to the fourth embodiment. As shown in FIG. 37, the image decompressor 206 of the fourth embodiment includes a mode selection part 230 instead of the mode selection part 220 of the third embodiment.

Figure 38:
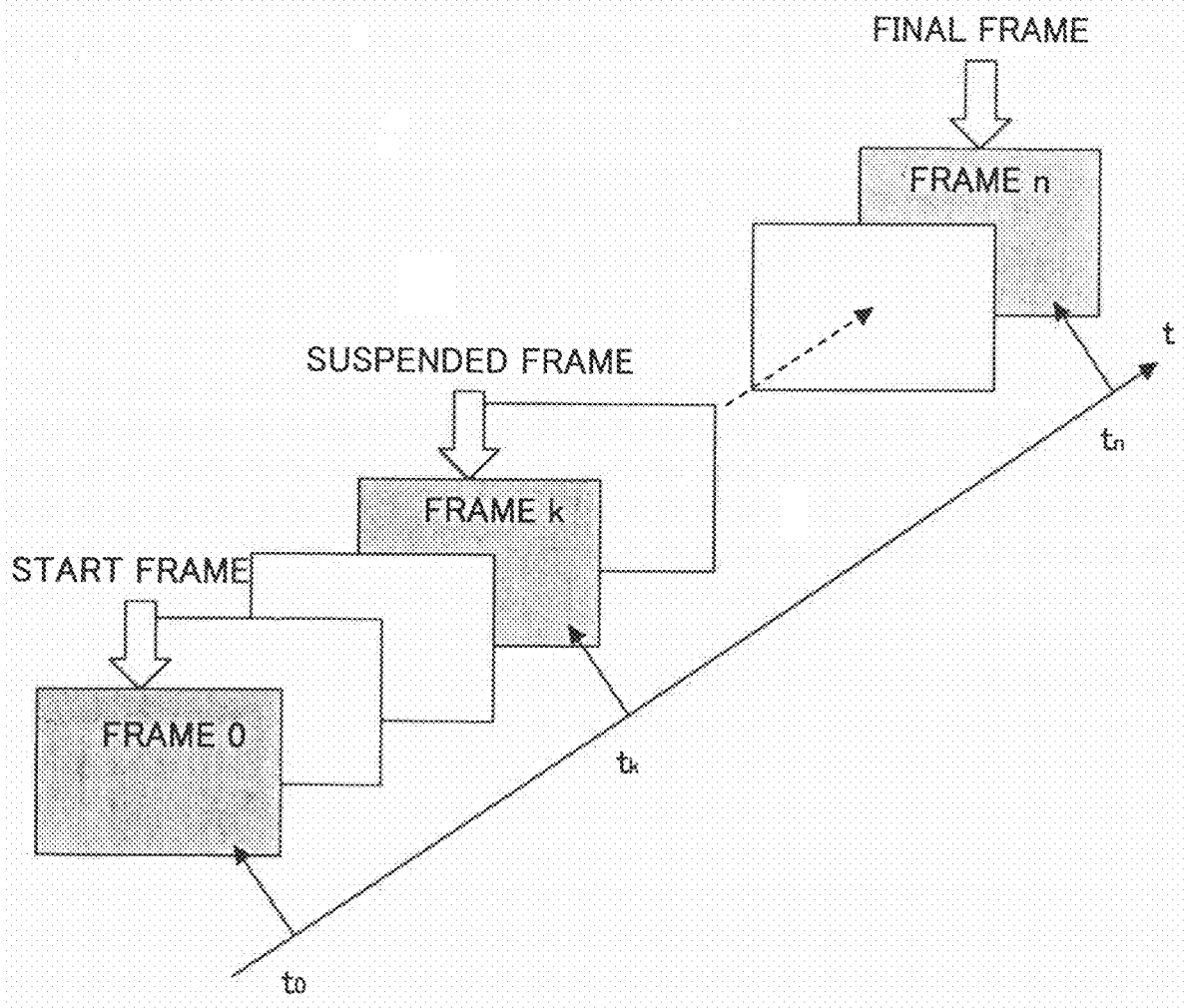
FIG. 38 is a diagram for illustrating a start frame, a final frame, and a suspended frame according to the fourth embodiment of the present invention.

The mode selection part 230 is equal to the mode selection part 220 in specifying a processing mode. Specifically, the mode selection part 230 selects one of the speed priority mode and the quality priority mode with respect to each frame based on a frame type. For instance, as shown in FIG. 38, the quality priority mode is specified only for a start frame 0 at a time $t_0$, a final frame n at a time $t_n$, and a suspended frame k at a time $t_k$. Since the tile boundary distortion is less conspicuous during the reproduction of a moving image, the smoothing operation mode is performed in favor of image quality only on the start frame 0, the final frame n, and the suspended frame k in which the tile boundary distortion is likely to be conspicuous. Once the processing mode is thus specified, a signal indicating the specified processing mode is output to the tile boundary smoothing switching part 226.

The tile boundary distortion is more conspicuous in a still image than in a moving image. Therefore, by selecting the quality priority mode for the start and final frames of a moving image and the suspended frame of the moving image at the suspension of reproduction thereof, the tile boundary distortion can be controlled at high speed with good accuracy.

Fifth Embodiment

Figure 39:
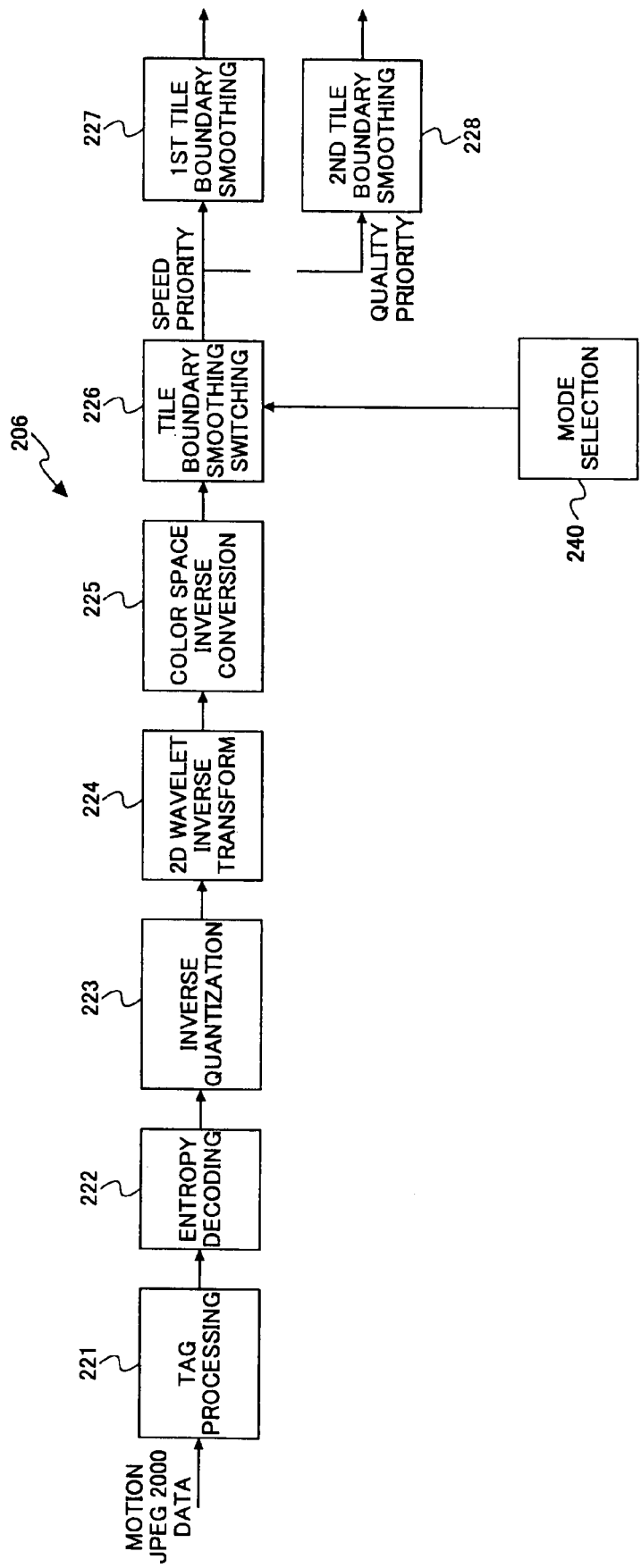
FIG. 39 is a functional block diagram of the image decompressor according to a fifth embodiment of the present invention.

A description will be given of a fifth embodiment of the present invention. FIG. 39 is a functional block diagram of the image decompressor 206 according to the fifth embodiment. As shown in FIG. 39, the image decompressor 206 of the fifth embodiment includes a mode selection part 240 instead of the mode selection part 220 of the third embodiment.

The mode selection part 240 is equal to the mode selection part 220 in specifying a processing mode. Specifically, the mode selection part 240 specifies one of the speed priority mode and the quality priority mode based on a frame rate (the number of frames reproduced per unit time). That is, the mode selection part 240 selects the speed priority mode if the frame rate is higher than a predetermined threshold, and selects the quality priority mode if the frame rate is lower than or equal to the predetermined threshold. For instance, the mode selection part 240 is controlled to select the speed priority mode if the frame rate is higher than "5," and the quality priority mode if the frame rate is lower than or equal to "5." This is because as the frame rate becomes higher, the reproduction rate becomes higher, so that the tile boundary distortion becomes less conspicuous. Once the processing mode is thus specified, a signal indicating the specified processing mode is output to the tile boundary smoothing switching part 226.

As the frame rate increases, the tile boundary distortion becomes less conspicuous in a moving image. Therefore, by selecting the speed priority mode if the frame rate is higher than a predetermined threshold, and the quality priority mode if the frame rate is lower than or equal to the predetermined threshold, the tile boundary distortion can be suppressed while eliminating an undesirable effect such as dropped frames caused by decoding delay with respect to reproduction.

Sixth Embodiment

Figure 40:
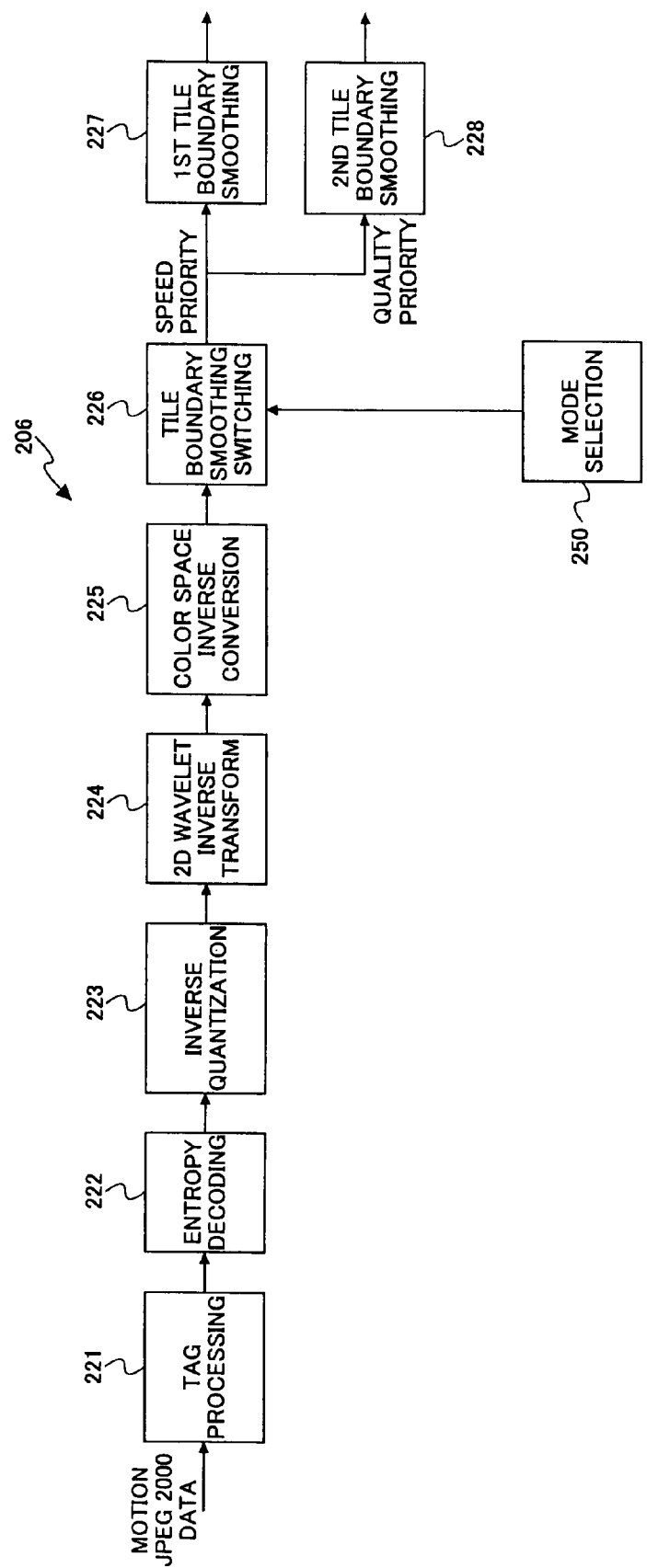
FIG. 40 is a functional block diagram of the image decompressor according to a sixth embodiment of the present invention.

A description will be given of a sixth embodiment of the present invention. FIG. 40 is a functional block diagram of the image decompressor 206 according to the sixth embodiment. As shown in FIG. 40, the image decompressor 206 of this embodiment includes a mode selection part 250 instead of the mode selection part 220 of the third embodiment.

The mode selection part 250 is equal to the mode selection part 220 in specifying a processing mode. Specifically, the mode selection part 250 selects one of the speed priority mode and the quality priority mode with respect to each frame based on the code quantity of the frame by which code quantity the frame is to be decoded (that is, based on the decoding quantity of the frame).

According to JPEG2000, the frames of a moving image have different code quantities so as to set the code quantity (compression rate) of the moving image to a predetermined value. For instance, a frame with dense information has a large code quantity, and a frame in which the degradation of image quality is less conspicuous, such as a frame after a scene change, has a small code quantity. Further, JPEG2000 may decode a predetermined portion of the code instead of decoding all the code at the time of decompressing the code.

Generally, the smaller the decoding quantity of a frame, the higher the compression rate in the frame and, consequently, the more conspicuous the tile boundary distortion. In reverse, the larger the decoding quantity of a frame, the lower the compression rate in the frame and, consequently, the less conspicuous the tile boundary distortion.

Thus, as shown in FIG. 41, the speed priority mode is selected if the decoding quantity is larger than a predetermined value, and the quality priority mode is selected if the decoding quantity is smaller than or equal to the predetermined value.

The quality priority mode is selected for a frame having a small code quantity since the compression rate for the frame is so high that the tile boundary distortion is conspicuous. On the other hand, the speed priority mode is selected for a frame having a large code quantity since the compression rate for the frame is so low that the tile boundary distortion is inconspicuous. Thereby, the smoothing of tile boundary distortion is optimized in each frame, so that an image with good quality can be obtained.

Seventh Embodiment

Next, a description will be given of a seventh embodiment of the present invention. The seventh embodiment is different from the third embodiment in the function of the image decompressor 206. Schematically, according to the seventh embodiment, the image decompressor 206 specifies a tile boundary to be subjected to low-pass filtering and performs low-pass filtering only on the peripheral pixels of the specified tile boundary instead of performing low-pass filtering on the peripheral pixels of all tile boundaries.

Figure 42:
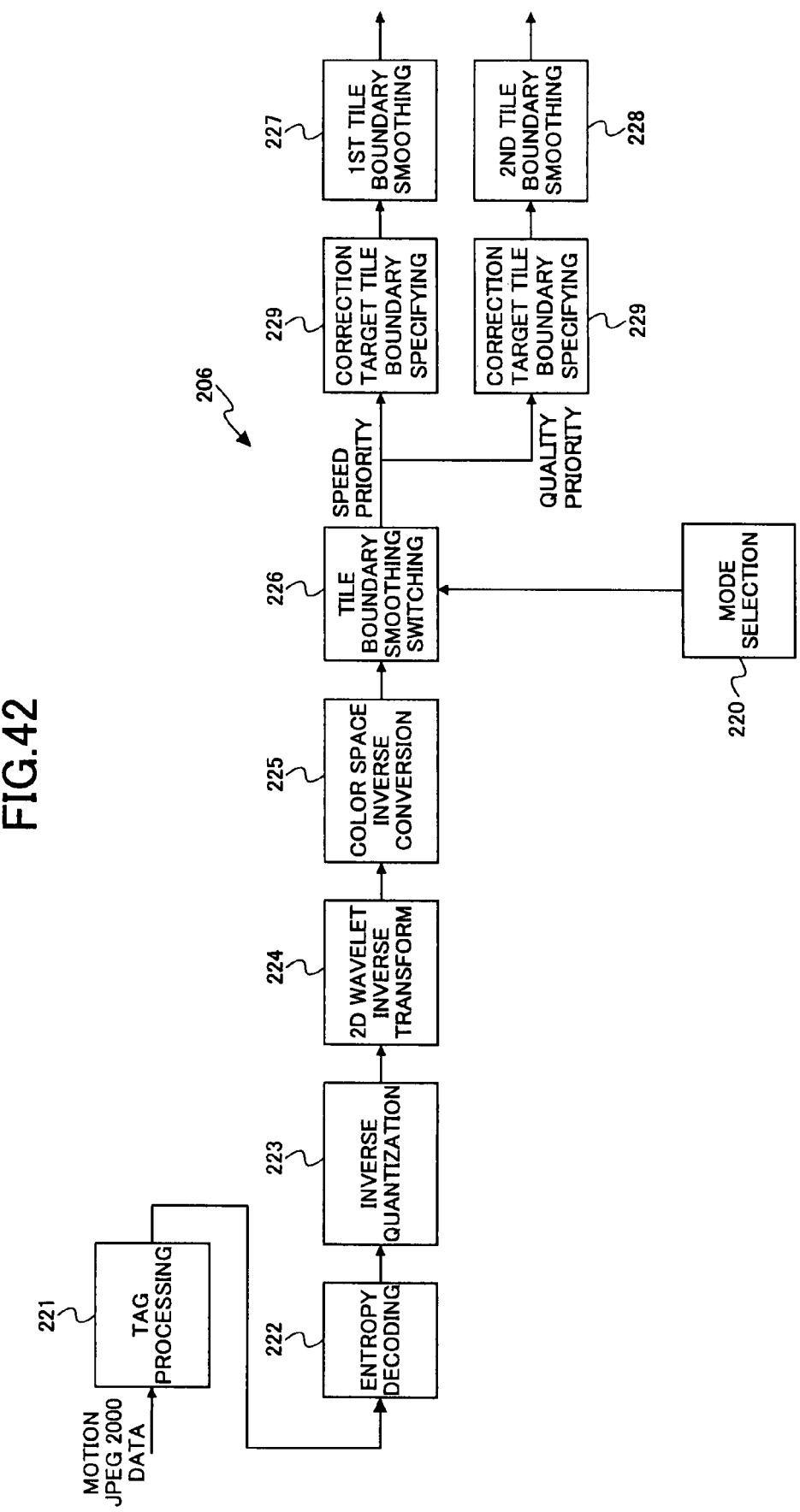
FIG. 42 is a functional block diagram of the image decompressor according to a seventh embodiment of the present invention.

FIG. 42 is a functional block diagram of the image decompressor 206 according to the seventh embodiment. As shown in FIG. 42, by the CPU 211*b* operating based on the moving image processing program, the image decompressor 206 realizes the functions of the mode selection part 220, the tag processing part 221, the entropy decoding part 222, the inverse quantization part 223, the 2D wavelet inverse transform part 224, the color space inverse conversion part 225, the tile boundary smoothing switching part 226, the first tile boundary smoothing part 227, the second tile boundary smoothing part 228, and a correction target tile boundary specifying part 229.

The correction target tile boundary specifying part 229 specifies a tile boundary to be subjected to low-pass filtering in the first tile boundary smoothing part 227 and the second tile boundary smoothing part 228.

FIGS. 43A through 44B are diagrams for illustrating low-pass filtering only on the tile boundaries within an ROI.

Figures 43A, 43B:
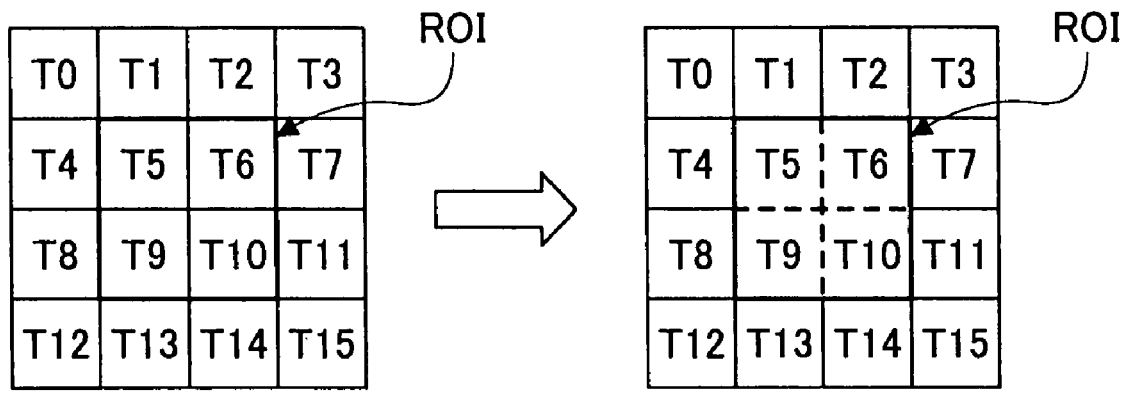
FIGS. 43A and 43B are diagrams for illustrating a case of performing low-pass filtering only on the tile boundaries within an ROI according to the seventh embodiment of the present invention.

FIGS. 43A and 43B show the case where the ROI is formed along tile boundaries. Once the boundary of the ROI is set as shown in FIG. 43A, the tile boundaries to be subjected to low-pass filtering are set as indicated by the broken lines in FIG. 43B. No low-pass filtering is performed on the boundary of the ROI indicated by the solid line in FIG. 43B.

Figures 44A, 44B:
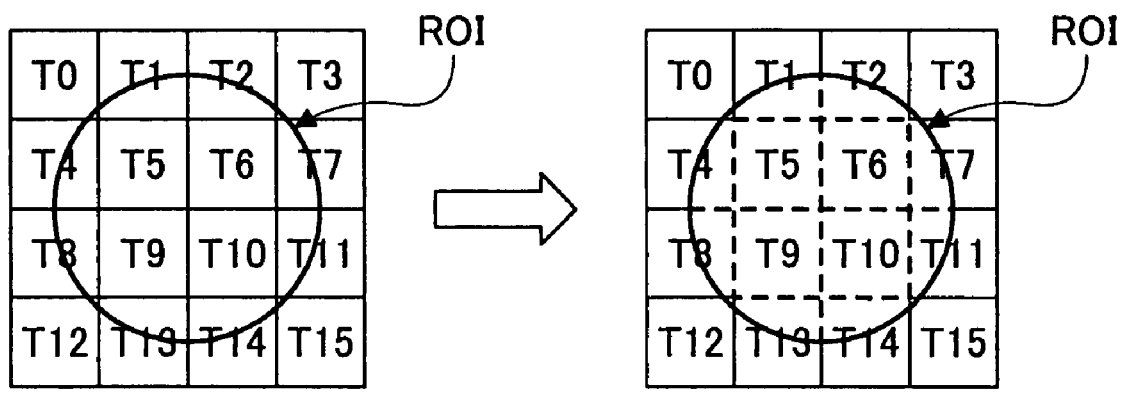
FIGS. 44A and 44B are diagrams for illustrating another case of performing low-pass filtering only on the tile boundaries within an ROI according to the seventh embodiment of the present invention.

FIGS. 44A and 44B show the case where the ROI is not formed along tile boundaries. Once the boundary of the ROI is set as shown in FIG. 44A, the tile boundaries to be subjected to low-pass filtering are set as indicated by the broken lines in FIG. 44B. It is calculated by operations whether a tile boundary pixel is inside the ROI. If the tile boundary pixel is inside the ROI, the tile boundary pixel is subjected to low-pass filtering. If the tile boundary pixel is not inside the ROI, no low-pass filtering is performed on the tile boundary pixel.

According to this embodiment, whether to perform low-pass filtering on a tile boundary pixel is determined based on whether the tile boundary pixel is inside the ROI. Alternatively, it is also possible to perform low-pass filtering only on the tile boundary pixels of an image region having a large vertical or lateral edge amount.

Thus, the correction target tile boundary specifying part 229 specifies the tile boundary pixels to be subjected to low-pass filtering, and outputs the RGB data obtained in the color space inverse conversion part 225 to the first and second tile boundary smoothing parts 227 and 228.

By thus specifying the tile boundary pixels to be subjected to low-pass filtering, the processing time for suppressing the tile boundary distortion can be shortened. Particularly, by performing low-pass filtering only on the tile boundaries within the ROI, the processing time for suppressing the tile boundary distortion can be shortened.

In the above-described third through seventh embodiments, the PC 201*b* is employed as the moving image reproduction apparatus (image processing apparatus) forming the monitor camera system 201. In stead of the PC 201*b*, a digital camera, a PDA, or a mobile phone, for example, may be employed as the moving image reproduction apparatus according to the present invention.

Further, in the above-described third through seventh embodiments, applied as a moving image display system is the monitor camera system 201, which has the monitor camera 201*a* and the PC 201*b* connected via the network 201*c*, the monitor camera 201*a* having the image input device 202 and the image compressor 203, and the PC 201*b* having the image decompressor 206, which is a moving image processing apparatus, and the image display unit 207. However, the moving image display system according to the present invention is not limited to the above-described monitor camera system 201. For instance, a digital camera that integrates a camera part that is the image input device 202, a control part having the image compressor 203 and the image decompressor 206 that is a moving image processing apparatus, and a display that is the image display unit 207 may be applied as the moving image display system according to the present invention.

Eighth Embodiment

Next, a description will be given, with reference to the particular characteristics of tile boundary distortion according to JPEG2000, of an eighth embodiment of the present invention.

It is expected that the tile boundary distortion is suppressed by performing low-pass filtering on the tile boundaries, which complies with the JPEG2000 provisions.

There have been proposed a variety of such methods including: a method that controls the degree of smoothing of low-pass filtering based on the distance from a tile boundary; a method that gradually decreases the degree of smoothing of low-pass filtering in proportion to the distance from a tile boundary; a method that calculates the edge amount of a peripheral pixel of a tile boundary and controls the degree of smoothing of low-pass filtering based on the edge amount; a method that gradually decreases the degree of smoothing in proportion to the edge amount; and a method that controls low-pass filtering in accordance with the distance between a pixel and a tile boundary and the edge amount of the pixel, that is, a method that decreases the degree of smoothing of low-pass filtering in proportion to the distance and the edge amount. By applying these methods, the generation of a blurred image with stripes may be prevented while suppressing the tile boundary distortion even if the edge amount is large in the periphery of the tile boundaries. In order to increase the processing speed and reduce the processing amount of such methods, there has been proposed a method that performs low-pass filtering for cutting lateral frequency components on vertical tile boundaries, performs low-pass filtering for cutting vertical frequency components on lateral tile boundaries, and performs low-pass filtering for cutting both vertical and lateral frequency components on the intersection of lateral and vertical boundaries.

Due to the particularity of the tile boundary distortion according to JPEG2000, however, the above-described methods may not sufficiently produce the expected effects. In order to optimize suppression of the tile boundary distortion of JPEG2000, it is necessary to fully study the symmetry of a low-pass filter applied to the tile boundary pixels.

First, a description will be given, referring back to FIG. 1, of the basic flow of the compression and decompression process according to JPEG2000. The image data to be subjected to compression is divided, component by component, into tiles, and input to the color space conversion and inverse conversion part 101, where the image data is subjected to color conversion. Then, the 2D wavelet transform and inverse transform part 102 performs 2D discrete wavelet transform (forward transform) on each tile image obtained after the color conversion. The wavelet coefficients obtained as a result of the 2D wavelet transform are quantized in the quantization and inverse quantization part 103 to be encoded in the entropy coding and decoding part 104. Both lossless compression and lossy compression are performable according to JPEG2000. In the case of lossless compression, the quantization step size is always one. Therefore, substantially, no quantization is performed. The entropy coding in the entropy coding and decoding part 104 employs a block-based bit plane encoding method called EBCOT (embedded block coding with optimized truncation) composed of block division, coefficient modeling, and binary arithmetic coding. The wavelet coefficients to be encoded are integers (or integers expressed as real numbers) each having a positive or negative sign. The coefficients expressed in absolute values are subjected to encoding in units of bit planes from the MSB (most significant bit) to LSB (least significant bit) bit plane while being scanned in a determined order. The code streams generated in the entropy coding and decoding part 104 are output from the tag processing part 105 as a bit stream of a predetermined format.

Decompression is the reverse process of compression. Compressed image data (code data) is input to the tag processing part 105 to be decomposed into the code streams of the tiles of each component. The code streams are subjected to entropy decoding in the entropy coding and decoding part 104. The decoded wavelet coefficients are inversely quantized in the quantization and inverse quantization part 103 to be subjected to 2D wavelet inverse transform in the 2D wavelet transform and inverse transform part 102, so that the image of each tile of each component is reproduced. Each tile image of each component is input to the color space conversion and inverse conversion part 101 and subjected to inverse color conversion so as to be output as a tile image composed of the R, G, and B components.

An image processing apparatus or method according to the present invention is applied so as to suppress the tile boundary distortion in image data 1201 (R, G, and B values or C, M, and Y values) obtained after the inverse color conversion by the color space conversion and inverse conversion part 101, or the tile boundary distortion in image data 1202 (a luminance value Y and color difference values Cb and Cr) before the inverse color conversion.

Figure 45:
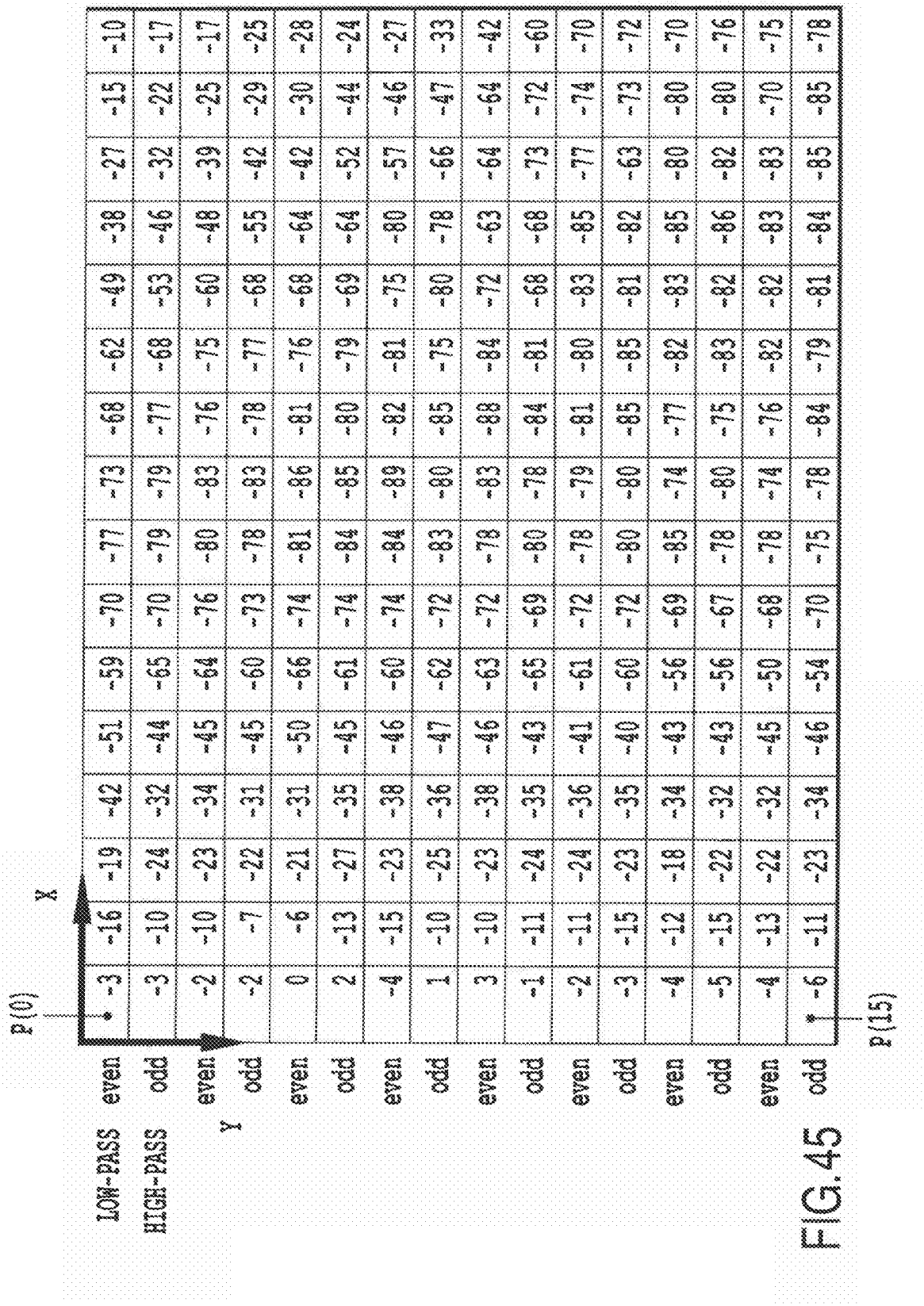
FIG. 45 is a diagram showing an original image and a coordinate system therefor for illustrating 5×3 wavelet transform employed in JPEG2000.

FIGS. 45 through 49 are diagrams for illustrating the process for performing two-dimensional (vertical and lateral) wavelet transform employed in JPEG2000 called 5×3 transform on a 16×16 monochrome image (or a component image of a color image). FIG. 45 is a diagram showing the original image before the wavelet transform. As shown in the drawings, an X-Y coordinate plane is formed on the image, so that the pixel value of a pixel having a Y-coordinate value y for an X-coordinate value x is expressed as P(y) (0≦y≦15). In JPEG 2000, first, with respect to each X-coordinate value x, high-pass filtering is performed vertically on each pixel having an odd Y-coordinate value y (y=2i+1) using its adjacent pixels, so that a coefficient C(2i+1) is obtained. Next, low-pass filtering is performed on each pixel having an even Y-coordinate value y (y=2i) using its adjacent coefficients, so that a coefficient C(2i) is obtained. The high-pass filtering and the low-pass filtering are given by the following equations (4) and (5), respectively:

$$C(2i+1) = P(2i+1) - \lfloor (P(2i) + P(2i+2))/2 \rfloor \quad (4)$$

$$C(2i) = P(2i) + \lfloor (C(2i-1) + C(2i+1) + 2)/4 \rfloor \quad (5)$$

where the symbol $\lfloor x \rfloor$ represents a floor function of x that replaces a real number x with the largest of all the integers smaller than or equal to x.

In the edge parts of the image, center pixels may lack adjacent pixels. In this case, the lacking pixel values are supplemented by a method called mirroring. The mirroring is literally the operation of mirroring pixel values with respect to a boundary line so as to regard the obtained pixel values as the lacking pixel values. FIG. 50 is a diagram for illustrating the mirroring of pixel values (or coefficient values). FIG. 50 shows the case where the pixel values indicated by the hatched circles are supplemented by mirroring the pixel values indicated by the white circles at the time of performing wavelet transform on the pixel P (indicated by the black circle) on the right-side boundary of a tile.

For the purpose of simplification, the coefficients obtained by high-pass filtering are expressed as H, and the coefficients obtained by low-pass filtering are expressed as L. Then, the image of FIG. 45 is transformed to the array of L and H coefficients as shown in FIG. 46 by the above-described vertical transform.

Figure 46:
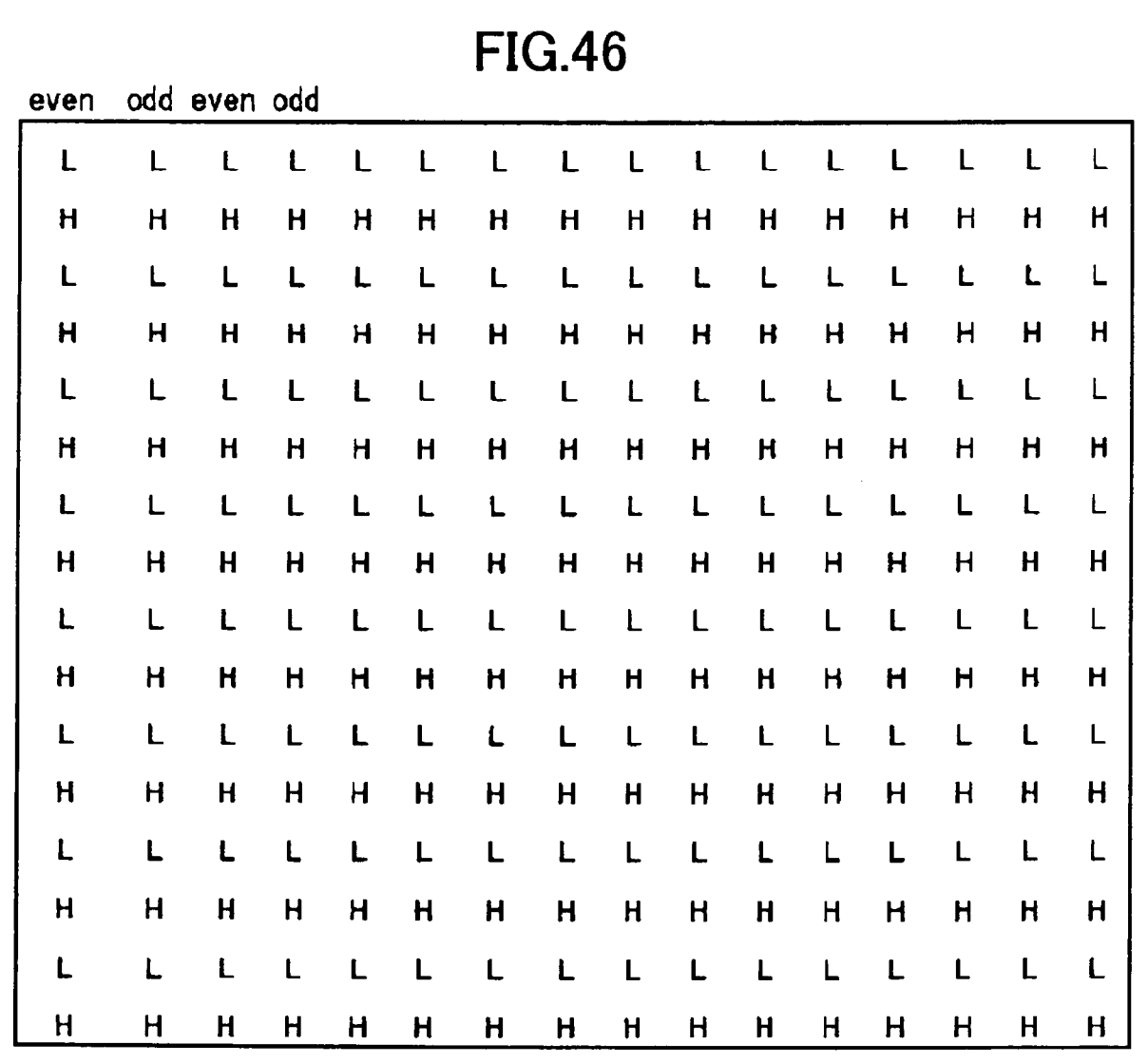

Next, with respect to each Y-coordinate value y, high-pass filtering is performed laterally on each coefficient of an odd X-coordinate value x (x=2i+1) using its adjacent coefficients in the coefficient array of FIG. 46, and then, low-pass filtering is performed on each coefficient of an even X-coordinate value x (x=2i) using its adjacent coefficients. In this case, P(2i), P(2i+1), . . . in the above-described equations (4) and (5) are understood to mean coefficient values.

Figure 47:
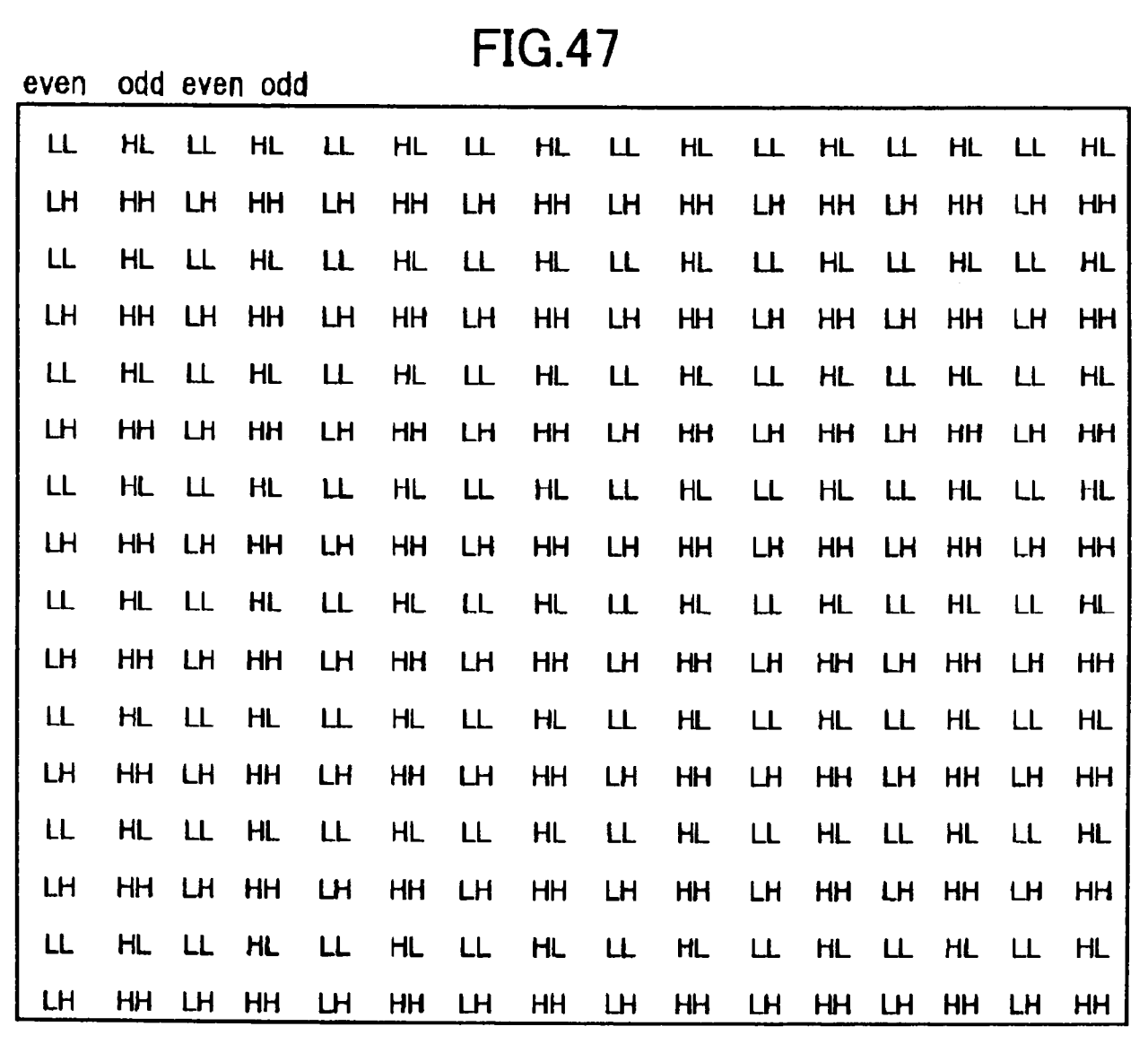

For the purpose of simplification, the coefficients obtained by performing low-pass filtering on the above-described coefficients L using their adjacent coefficients are expressed as LL, the coefficients obtained by performing high-pass filtering on the above-described coefficients L using their adjacent coefficients are expressed as HL, the coefficients obtained by performing low-pass filtering on the above-described coefficients H using their adjacent coefficients are expressed as LH, and the coefficients obtained by performing high-pass filtering on the above-described coefficients H using their adjacent coefficients are expressed as HH, then, the coefficient array of FIG. 46 is transformed to the coefficient array of FIG. 47. Here, a group of coefficients assigned the same symbol (LL, for instance) is called a sub-band, and the image of FIG. 47 is composed of four sub-bands.

Figure 48:
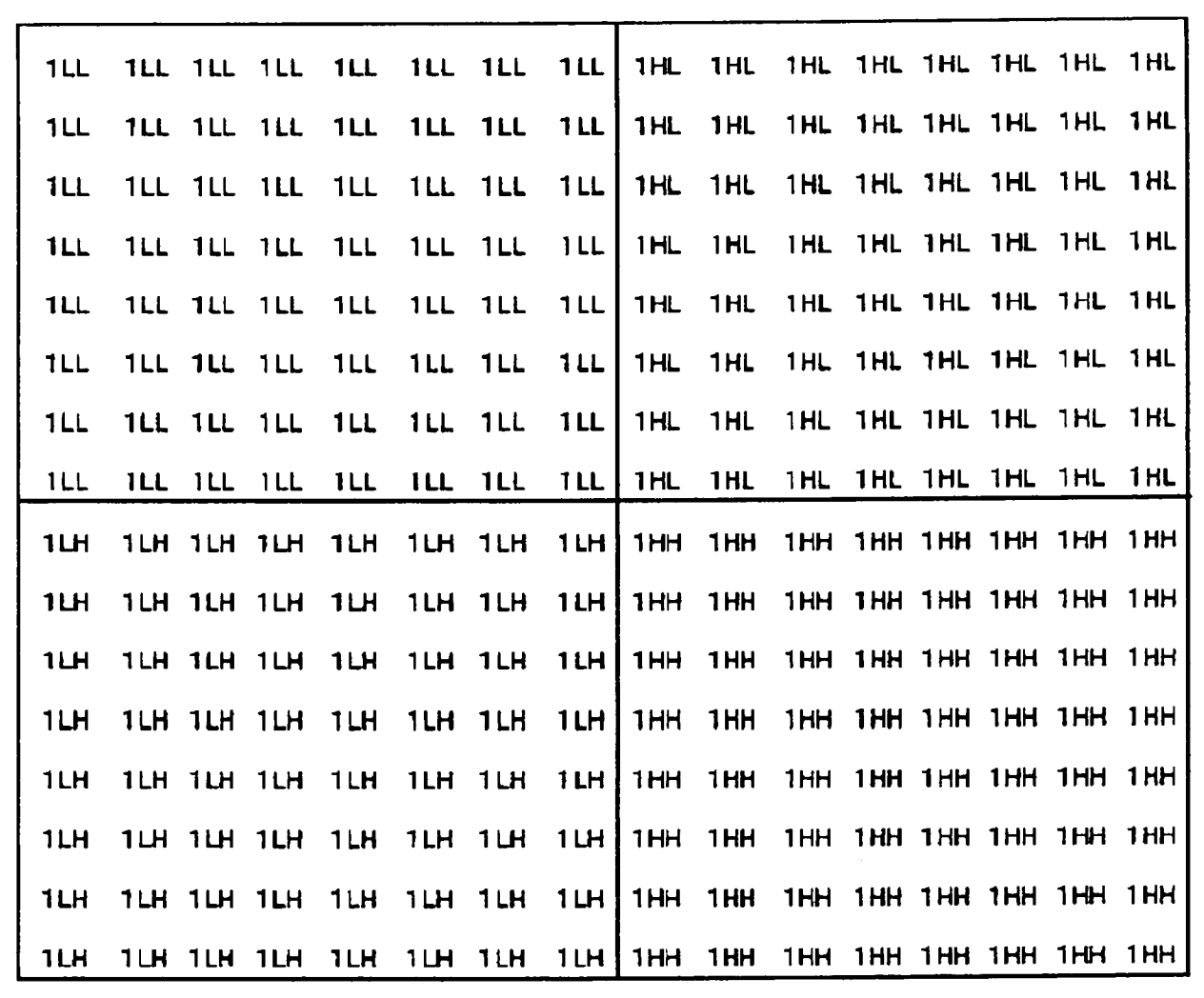

Thereby, one wavelet transform operation (one decomposition) is completed. At this point, by collecting only the LL coefficients, or by grouping the coefficients according to the sub-bands as shown in FIG. 48 and extracting only the LL sub-band, the exactly half-resolution "image" of the original image is obtained. Such grouping by the sub-band is referred to as deinterleaving, while the coefficients arranged in the state of FIG. 47 are described as "interleaved."

Figure 49:
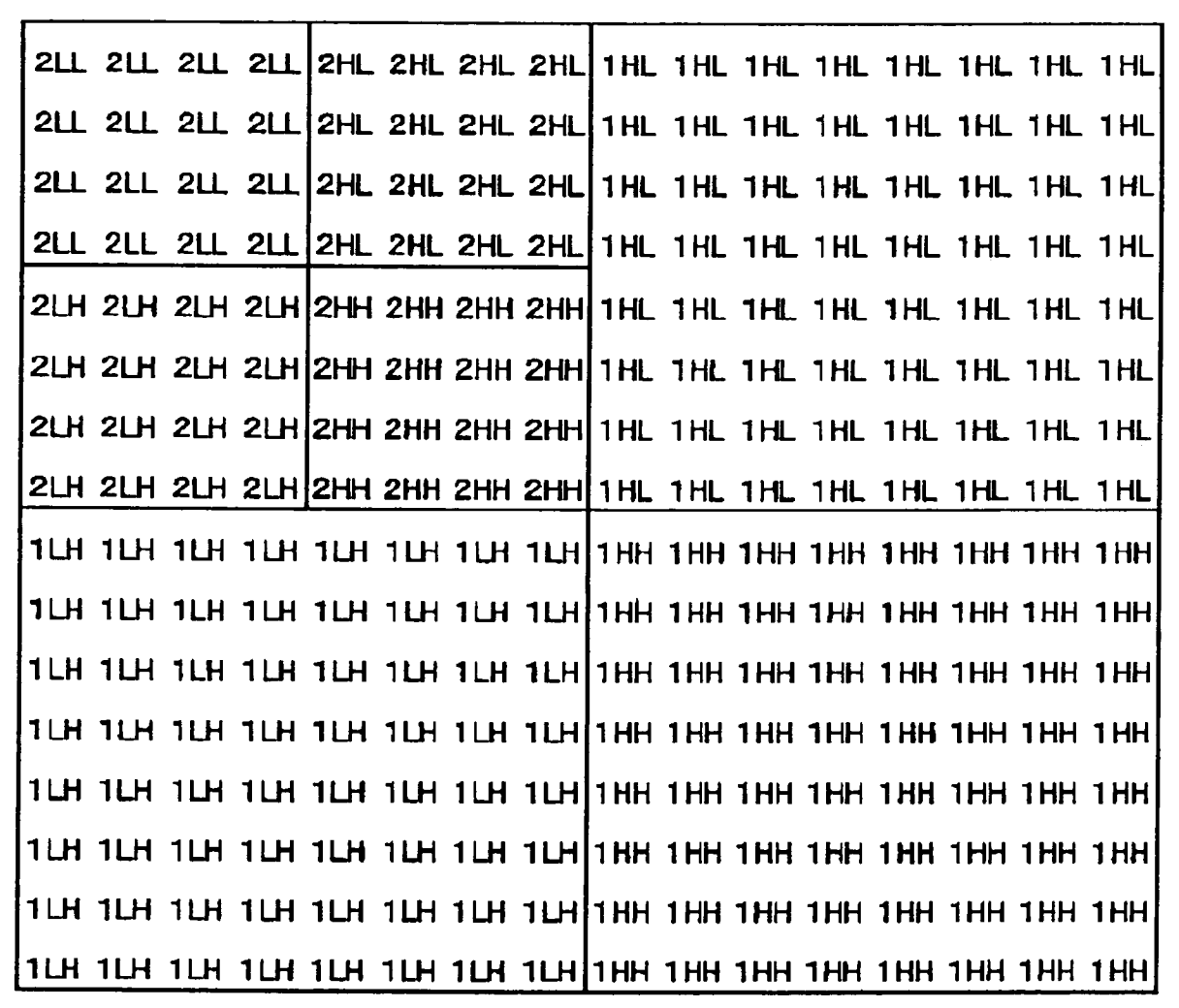

In the next (second) wavelet transform operation, the same processing as described above is performed, considering the LL sub-band as an original image. When the coefficients obtained as a result of the second wavelet transform operation are deinterleaved, the coefficients of the sub-bands as shown in FIG. 49 are obtained. In FIGS. 48 and 49, the prefix of 1 or 2 to the coefficients indicates the number of wavelet transform operations by which the coefficients are obtained. This number is referred to as a decomposition level. Accordingly, a sub-band of a higher (numbered) decomposition level has a lower resolution. If it is desired that one-dimensional wavelet transform be performed, the wavelet transform may be performed only in one of the lateral and vertical directions.

On the other hand, the inverse wavelet transform is performed by first performing inverse low-pass filtering laterally on each coefficient of an even X-coordinate value x (x=2i+1) using its adjacent coefficients and then performing inverse high-pass filtering on each coefficient of an odd X-coordinate value x (x=2i) using its adjacent results of the inverse low-pass filtering in the interleaved coefficient array shown in FIG. 47. This process is performed on each Y-coordinate value y. The inverse low-pass filtering and the inverse high-pass filtering are given by the following equations (6) and (7), respectively:

$$P(2i)=C(2i)-\lfloor\_(C(2i-1)+C(2i+1)+2)/4\_\rfloor \quad (6)$$

$$P(2i+1)=C(2i+1)+\lfloor\_(P(2i)+P(2i+2))/2\_\rfloor \quad (7)$$

As in the case of the (forward) wavelet transform, center pixels may lack adjacent pixels in the edge parts of the image. The lacking pixel values are also supplemented by the mirroring method in this case.

By the above-described processing, the coefficient array of FIG. 47 is (inversely) transformed to the coefficient array of FIG. 46. Likewise, thereafter, inverse low-pass filtering is performed vertically on each coefficient of an even Y-coordinate value y (y=2i) using its adjacent coefficients, and then, inverse high-pass filtering is performed on each coefficient of an odd Y-coordinate value (y=2i+1) using its adjacent results of the inverse low-pass filtering. This process is performed on each X-coordinate value x. Thereby, one inverse wavelet transform operation is completed, so that the image of FIG. 45 is restructured. If the wavelet transform has been performed a plurality of times, the original image is restructured by repeating the same inverse wavelet transform operation as described above using the HL and other coefficients, considering the coefficient array of FIG. 45 as the LL sub-band.

According to the above-described wavelet transform, normally, the number of tiles serving as its processing units, or the tile size, is determined as $2''\times2''$ so that the $\frac{1}{2}''$-resolution component of the original image may be easily obtained. Further, the origin of the X-Y coordinate plane is set easily at a vertex of the image as shown in FIG. 45. In the case of performing vertical filtering as shown in FIG. 46 under these conditions, as is made apparent by considering the entire image of FIG. 45 as a tile, the pixels adjacent to the upper edge (end) of the tile are subjected to low-pass filtering and the pixels adjacent to the lower edge (end) of the tile are subjected to high-pass filtering. Likewise, in the case of performing lateral filtering as shown in FIG. 47, the pixels adjacent to the left edge (end) of the tile are subjected to low-pass filtering, and the pixels adjacent to the right edge (end) of the tile are subjected to high-pass filtering.

As the aforementioned document (A New Method for Reducing Boundary Artifacts in Block-Based Wavelet Image Compression) points out, it is known that in the case of performing mirroring, if the H coefficients on the lower edge of a tile boundary include quantization error, the error appears as great errors in the pixel values of a final decompressed image. Similarly, it is known that if the H coefficients on the right edge of the tile boundary include quantization error, the error appears as great errors in the final pixel values. On the other hand, it is also known that the quantization error of the L coefficients on the upper and left edges of the tile boundary does not appear as great errors in the pixel values of the final decompressed image.

Accordingly, the mean squares of pixel value errors generated in the pixels within a tile are distributed as shown in FIGS. 51A and 51B. FIGS. 51A and 51B are graphs showing the lateral and vertical distributions of the mean squares of pixel value errors of eight laterally and vertically successive tiles, respectively. FIGS. 51A and 51B show that the error values are significantly larger in the lower edge than in the upper edge of each tile, and in the left edge than in the right edge of each tile. That is, the mean square errors (MSEs) of the pixel values are extremely asymmetric with respect to the tile boundaries.

Figure 52A:
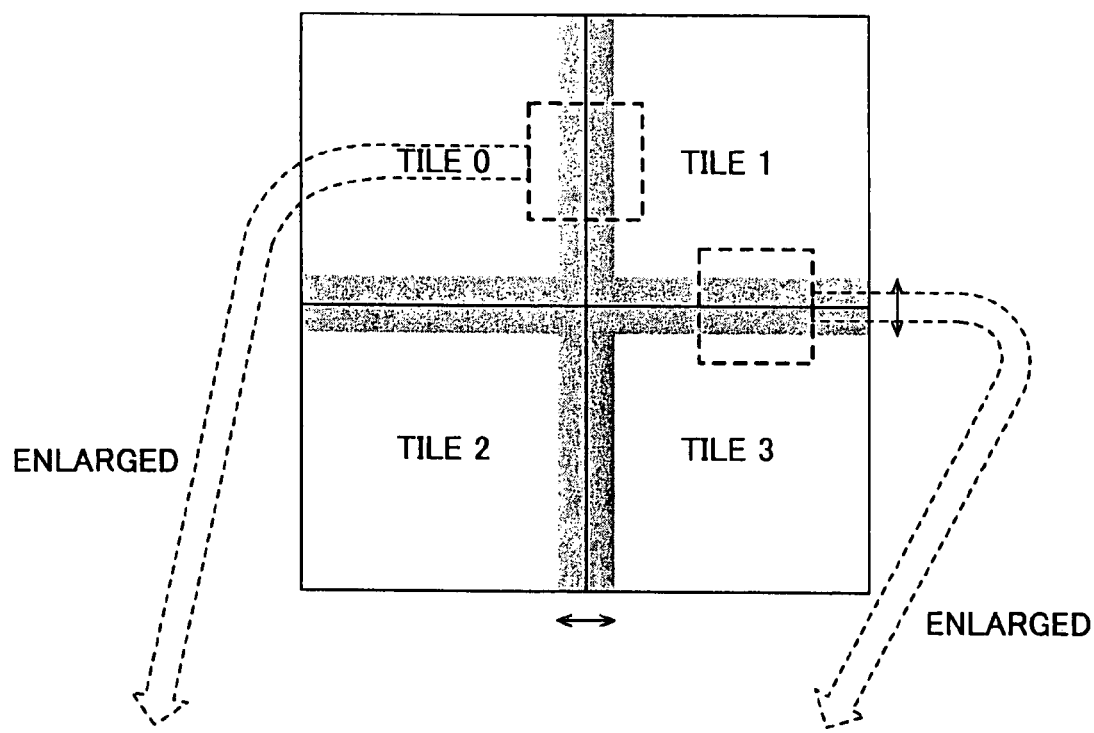
FIGS. 52A through 52C are diagrams showing symmetric low-pass filters applied to vertical and lateral tile boundaries.
Figure 52B:
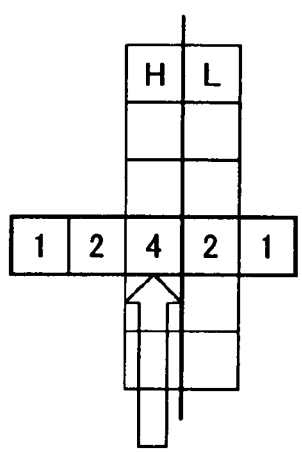
Figure 52C:
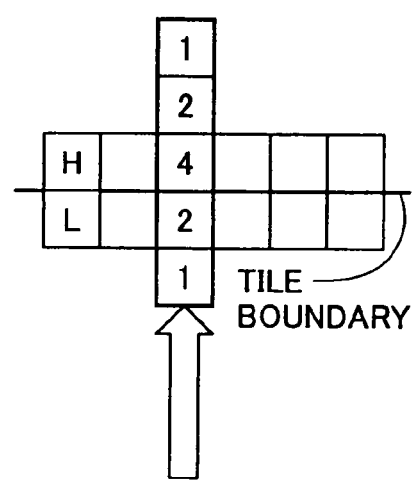

Under such error distributions, filters having symmetrically arranged weights with respect to the direction of a tile boundary may be employed. For instance, if, with respect to four adjacent tiles 0 through 3 as shown in FIG. 52A, a low-pass filter as shown in FIG. 52B is applied to the right vertical boundary of the tile 0 and a low-pass filter as shown in FIG. 52C is applied to the lower lateral boundary of the tile 1, the filters do not match the above-described asymmetric errors, so that relatively large errors may be caused in the pixel values obtained after the smoothing by the filters. As is apparent from FIG. 52B, this is because the largest weight (=4) is provided to the pixel having the large error while only the half (=2) or less of the weight is provided to the other pixels having smaller errors. In other words, the weighting factors of a filter should be determined based on the expected asymmetry or sizes of pixel value errors in some cases.

An image processing apparatus according to this embodiment effectively suppresses the tile boundary distortion, taking into consideration the asymmetry of the above-described errors generated in the tile boundaries. In order to suppress the distortion of the boundary of each of the predetermined division units (or tiles) of an image decompressed division unit by division unit after being compressed division unit by division unit, the image processing apparatus includes a part for applying a low-pass filter to the peripheral pixels of the boundary. The weighting factors of the low-pass filter are asymmetric with respect to the direction of the boundary.

Alternatively, the image processing apparatus according to this embodiment may effectively suppress the tile boundary distortion, taking into consideration the sizes of the above-described errors generated in the tile boundaries. In this case, in order to suppress the distortion of the boundary of each of the predetermined division units (or tiles) of an image decompressed division unit by division unit after being compressed division unit by division unit, the weighting factors of the low-pass filter of the image processing apparatus are determined so as to reflect the sizes of the mean pixel value errors of the pixels.

The above-described filter should be applied to the pixels within a predetermined range from the boundary over which range the tile boundary distortion extends. For instance, in the case of using the above-described 5×3 filter at decomposition level 3, the 5×3 filter may be applied to about eight pixels in the periphery of the boundary. As is apparent from FIG. 52B, as the target pixel to which the filter is applied moves away from the tile boundary, the weight of the filter by which the H coefficient (indicated by the arrow) having the largest error is multiplied naturally becomes smaller. That is, the asymmetry of the errors depends on the distance between the target pixel and the boundary, and as the target pixel moves away from the boundary, the asymmetry of the filter may be reduced, for instance. That is, the filter is allowed to become more symmetric. It is not preferable to use a symmetric low-pass filter for the above-described asymmetric errors. However, if the asymmetry of the errors is small, it may be less harmful and safer to use a symmetric filter.

In view of this point, in the above-described image processing apparatus, the degree of asymmetry of the weighting factors of the low-pass filter or the degree of reflection of the sizes of the mean pixel value errors in the weighting factors of the low-pass filter may depend on the distance from the (tile) boundary of each division unit. That is, the weighting factors of the low-pass filter are controlled based on the distance from the tile boundary so as to suppress the tile boundary distortion more effectively.

Further, as is apparent from FIG. 52B, when the target pixel moves away from the tile boundary, the tile boundary is excluded from the effective region of the filter. In this case, the above-described precondition of the asymmetry of errors with respect to the tile boundary does not hold.

The image processing apparatus according to the present invention effectively suppresses the tile boundary distortion, focusing on this point. That is, in the above-described image processing apparatus, the weighting factors of the low-pass filter may become asymmetric or the sizes of the mean pixel value errors may be reflected in the weighting factors of the low-pass filter only when the taps of the low-pass filter cross the tile boundary.

Figure 53:
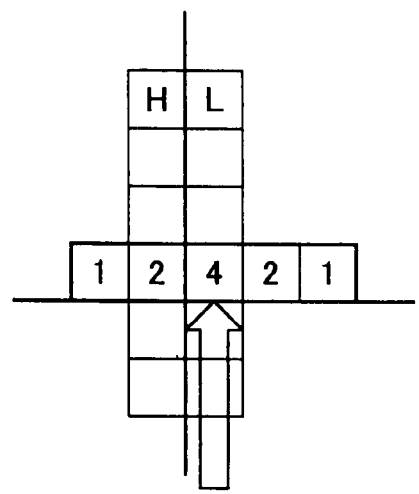
FIG. 53 is a diagram showing a low-pass filter application in the case where a target pixel is located at an L coefficient position.

Further, as shown in FIG. 53, if the target pixel is adjacent to a tile boundary but its position corresponds to an L coefficient, normally, the weighting factor of the low-pass filter for the target pixel is set to a large value from the beginning. Therefore, even if the errors are asymmetric, a symmetric filter may be employed less harmfully in such a case.

In view of this point, in the above-described image processing apparatus, the weighting factors of the low-pass filter may be asymmetric or the sizes of the mean pixel value errors may be reflected in the weighting factors of the low-pass filter only when the mean pixel value error generated in the target pixel is greater than the mean pixel value errors of its adjacent two pixels. That is, the tile boundary distortion may be effectively suppressed by providing the low-pass filter with asymmetric weighting factors or reflecting the sizes of the mean pixel value errors in the weighting factors of the low-pass filter only with respect to the pixel having a large mean pixel value error.

In the case of compressing a color image made up of three components of R, G, and B, for instance, the R, G, and B values may directly be subjected to wavelet transform. However, in order to increase the compression rate, normally, color conversion is performed on the R, G, and B components so that the R, G, and B components are converted to three new components of one luminance component and two color difference components, and the converted components are individually subjected to wavelet transform.

The following is a color conversion method employed in JPEG2000 which method is called RCT (reversible component transform).

$$\text{Luminance } Y = \lfloor (R+2G+B)/4 \rfloor$$

$$\text{Color difference } Cr = R - G$$

$$\text{Color difference } Cb = B - G \quad (8)$$

The inverse conversion of RCT is given by the following:

$$R = G + Cr$$

$$G = Y - \lfloor (Cr+Cb)/4 \rfloor$$

$$B = Cb + G \quad (9)$$

The degree of asymmetry differs among the R, G, and B components or the luminance and color difference components. How it differs depends on the quantization method. In the case of the luminance and color difference components, for instance, the asymmetry becomes greater in the color difference components than in the luminance component if the color difference components are extremely quantized.

In view of this point, in the above-described image processing apparatus, the degree of asymmetry of the weighting factors of the low-pass filter or the degree of reflection of the sizes of the mean pixel value errors in the weighting factors of the low-pass filter may differ among the components of the image. That is, by controlling the reflection of the sizes of the mean pixel value errors according to the components, the tile boundary distortion in a color image can be suppressed more effectively.

Further, the asymmetry of the weighting factors of the low-pass filter, which results from the quantization error of the wavelet coefficients at the time of compression, increases as the compression rate becomes higher.

Accordingly, in the above-described image processing apparatus, the degree of asymmetry of the weighting factors of the low-pass filter or the degree of reflection of the sizes of the mean pixel value errors in the weighting factors of the low-pass filter may differ depending on the compression rate of the compressed image. That is, by controlling the reflection of the sizes of the mean pixel value errors according to the compression rate, the tile boundary distortion can be suppressed more effectively.

Further, the degree of asymmetry of the weighting factors of the low-pass filter depends on the range of mirroring at the time of (forward and inverse) wavelet transform, that is, the tap length of a wavelet filter. Generally, the degree of asymmetry of the weighting factors is greater in a low-pass filter having a longer tap length although it depends on the frequency characteristics.

Accordingly, in the above-described image processing apparatus, the degree of asymmetry of the weighting factors of the low-pass filter or the degree of reflection of the sizes of the mean pixel value errors in the weighting factors of the low-pass filter may depend on the type of the wavelet filter employed for the compression and decompression of the image. That is, by controlling the reflection of the sizes of the mean pixel value errors according to the type of the wavelet filter, the tile boundary distortion can be suppressed more effectively.

In the present invention, it is extremely effective to use any of the above-described methods for controlling the degree of smoothing of a low-pass filter simultaneously with the asymmetry of the weighting factors of the low-pass filter and the reflection of the sizes of the mean pixel value errors in the weighting factors of the low-pass filter. FIGS. 51A and 51B clearly show the tendency that an error generated in a pixel decreases in size as its distance from a tile boundary increases. Accordingly, the degree of smoothing of the low-pass filter should be reduced in proportion to the pixel-boundary distance. Further, like the asymmetry of the weighting factors of a low-pass filter, the discontinuity of tile boundary distortion itself depends on the image components, the compression rate, and the tap length of a wavelet filter. It is experimentally known that particularly in the case of the YCbCr luminance and color difference system, error generated in Cb is less perceivable than error generated in Cr due to the human visual characteristics. In this case, the low-pass filter may have a lower degree of smoothing. Further, if there is an actual edge (reflecting the original image) different from distortion on a tile boundary, the low-pass filter, which suppresses the tile boundary distortion, may even smooth the actual edge.

Accordingly, in the above-described image processing apparatus, the frequency characteristics of the low-pass filter may depend on the distance from the boundary of each division unit. By thus changing the frequency characteristics of the low-pass filter based on the distance from the boundary, the tile boundary distortion can be suppressed more effectively. In this case, the frequency characteristics of the low-pass filter may also depend on the edge degree of the periphery of the boundary. By thus considering both the distance from the boundary and the edges existing in the original image, the tile boundary distortion can be effectively suppressed without harming the actual edges of the original image.

Further, in the above-described image processing apparatus, the frequency characteristics of the low-pass filter may differ among the components of the image. Thereby, the tile boundary distortion of a color image can be suppressed more effectively.

Further, in the above-described image processing apparatus, the frequency characteristics of the low-pass filter may depend on the compression rate of the compressed image. By thus providing the low-pass filter with frequency characteristics according to the compression rate, the tile boundary distortion can be suppressed more effectively.

Further, in the above-described image processing apparatus, the frequency characteristics of the low-pass filter may depend on the type of the wavelet filter employed for the compression and decompression of the image. Thereby, the tile boundary distortion can be suppressed more effectively.

Further, in the above-described image processing apparatus, the frequency characteristics of the low-pass filter may depend on the edge degree of the periphery of the boundary. Thereby, the tile boundary distortion can be suppressed effectively without harming the edges existing in the original image.

Further, in the above-described image processing apparatus, the low-pass filter is applied to the R, G, and B pixel values of the decompressed image after inverse color conversion. This simplifies calculation for suppressing the tile boundary distortion.

Further, in the above-described image processing apparatus, the low-pass filter is applied to the luminance (Y) and color difference (Cr and Cb) values of the decompressed image before inverse color conversion. This is advantageous when calculation of the edge degree is required.

Further, in order to suppress the distortion of the boundary of each of the predetermined division units (or tiles) of an image decompressed division unit by division unit after being compressed division unit by division unit, an image processing method according to this embodiment includes the step of applying a low-pass filter to the peripheral pixels of the boundary, and the weighting factors of the low-pass filter are asymmetric with respect to the direction of the boundary. By considering the asymmetry of errors generated at the boundary, the tile boundary distortion can be suppressed effectively.

Alternatively, the image processing method according to this embodiment may include the step of applying to the peripheral pixels of the boundary a low-pass filter whose weighting factors reflect the sizes of the mean pixel value errors of the pixels. By considering the sizes of the errors generated at the boundary, the tile boundary distortion can be suppressed effectively.

A more detailed description will now be given, with reference to FIGS. 54 through 65, of this embodiment. The present invention is performable by hardware, software, or the combination thereof, but in this embodiment, the present invention is performed by software on the system of a multi-purpose computer such as a personal computer. Accordingly, each processing step and its contents in the following description may be understood as the corresponding part and its function included in the image processing apparatus of the present invention.

Figure 54:
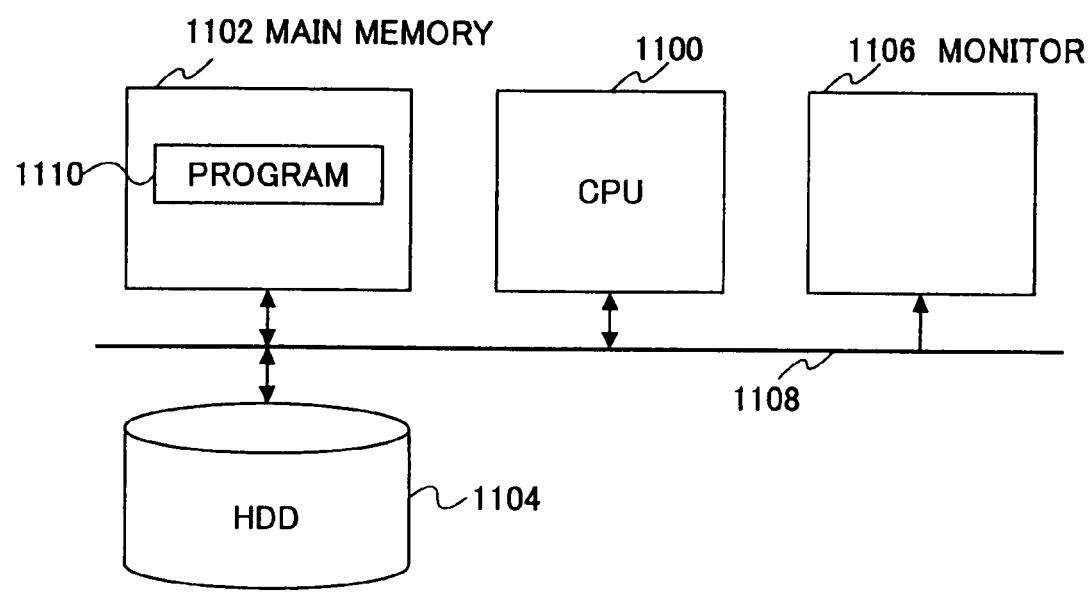
FIG. 54 is a block diagram showing a computer system according to an eighth embodiment of the present invention.

FIG. 54 is a block diagram showing a computer system according to the eighth embodiment of the present invention. The computer system includes a CPU 1100, a main memory 1102, a hard disk drive (HDD) 1104, and a monitor device 1106 that are connected via a system bus 1108. The main memory 1102 stores an image processing program 1110 for executing the functions of the image processing apparatus or the processing steps of the image processing method of the present invention.

The general processing flow according to this embodiment is as follows.

(a) By a command from the CPU 1100, the image data obtained by compressing an original image according to JPEG2000 is read from the HDD 1104 into the main memory 1102.

(b) The CPU 1100 reads the compressed image data from the main memory 1102, decompresses the image data, and performs processing for suppressing the tile boundary distortion on the decompressed image data according to JPEG2000. Then, the CPU 1100 generates the image data whose tile boundary distortion is suppressed on the main memory 1102.

(c) By a command from the CPU 1100, the image data whose tile boundary distortion is suppressed is displayed on the monitor device 1106 or stored in the HDD 1104. The compressed image data may be captured via a network such as the Internet or a LAN to be processed according to the present invention.

Figure 55:
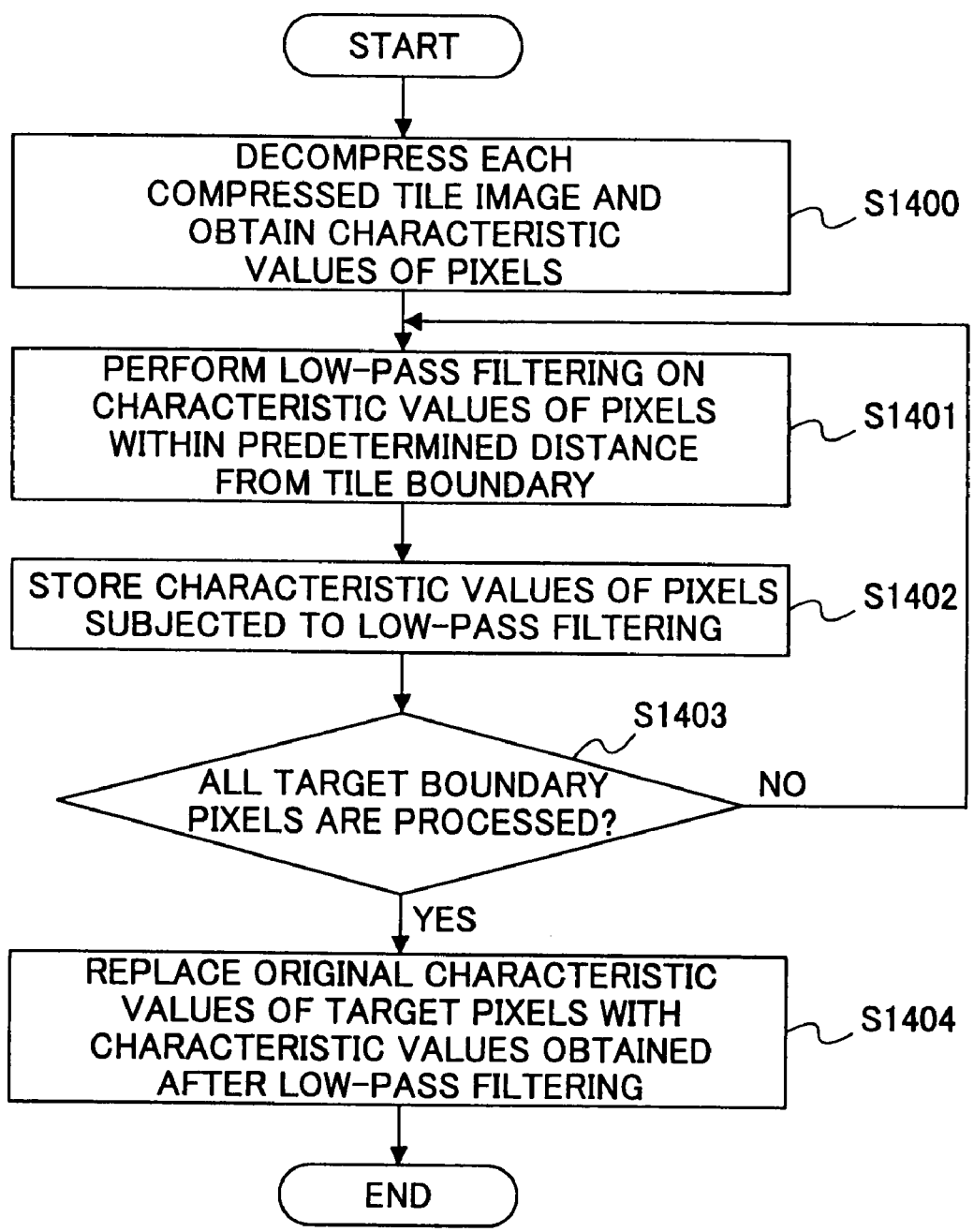
FIG. 55 is a flowchart for illustrating an image processing operation according to the eighth embodiment of the present invention.

FIG. 55 is a flowchart for illustrating the above-described process (b) in further detail. In the following description, the original image is divided into four tiles of the same size of $2^n \times 2^n$ pixels. Accordingly, the right end and the lower end of each tile are positions for H coefficients, and the left end and the upper end of each tile are positions for L coefficients. Further, in the process of compressing the image data, the image data is subjected to wavelet transform of decomposition level 3 using a 5×3 wavelet filter (a description will be given later of the case where a 9×7 wavelet filter is employed).

In step S1400 of FIG. 55, the compressed image of each tile is decompressed so that the characteristic values of the pixels are obtained. The characteristic values are, for instance, R, G, and B values or luminance and color difference values such as Y, Cb, and Cr. Explained with reference to FIG. 1, the characteristic values are R, G, and B values in the case of performing processing for suppressing the tile boundary distortion on the decompressed image data 1201, and are luminance Y and color differences Cb and Cr in the case of performing processing for suppressing the tile boundary distortion on the decompressed image data 1202. The characteristic values of the pixels of the decompressed image are stored in a specific region of the main memory 1102. Step S1400 is a step for decompression, and the following steps S1401 through 1404 are processing steps for suppressing the tile boundary distortion.

Figure 56:
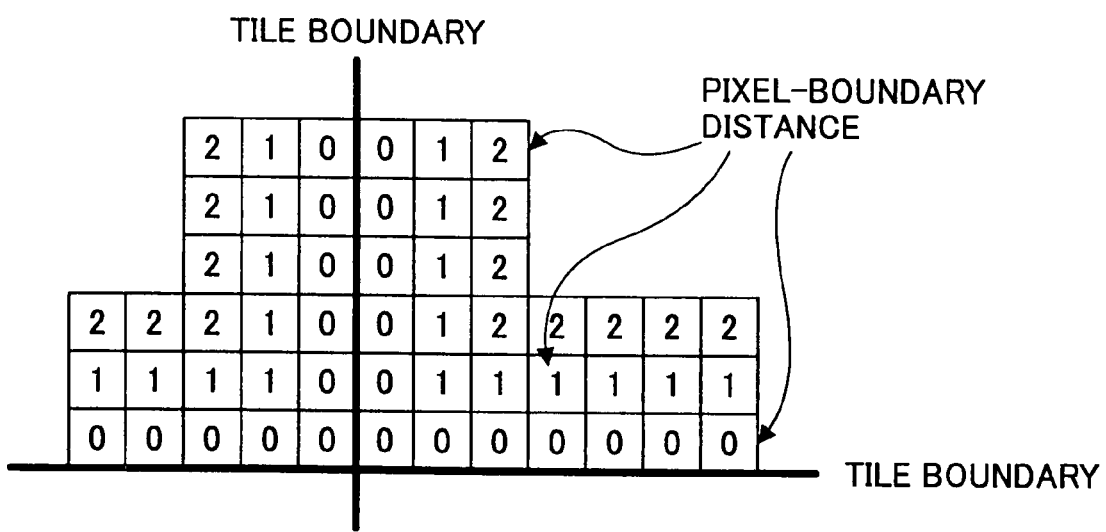
FIG. 56 is a diagram for illustrating the distance from a tile boundary according to the eighth embodiment of the present invention.

In step S1401, a low-pass filter for suppressing the tile boundary distortion is applied to the characteristic values of each pixel within a predetermined distance from the tile boundaries. The distance (of a pixel) from a tile boundary (that is, the pixel-boundary distance) is the shortest distance from the pixel to the tile boundary as shown in FIG. 56. In the case shown in FIG. 56, the low-pass filter is applied to each pixel whose pixel-boundary distance is less than or equal to 2 (that is, 0, 1, and 2). The pixel-boundary distance is determined to be less than or equal to 2 in order to reduce the amount of calculation. Further, the low-pass filter has a tap length of 5.

In step S1402, the characteristic values of the pixels subjected to the low-pass filtering are stored in a specific region of the main memory 1102.

The processing of steps S1401 and S1402 is repeated so that all the target boundary pixels (or peripheral pixels of the tile boundaries) of the low-pass filtering are processed. When the processing is completed (that is, "YES" in step S1403), the characteristic values stored in step S1402 replace the characteristic values of the corresponding pixels of the decompressed image stored in step S1400. As a result, the image data whose tile boundary distortion is suppressed is obtained.

A more detailed description will be given, with reference to the flowchart of FIG. 57, of the process of step S1401 of FIG. 55.

Figure 57:
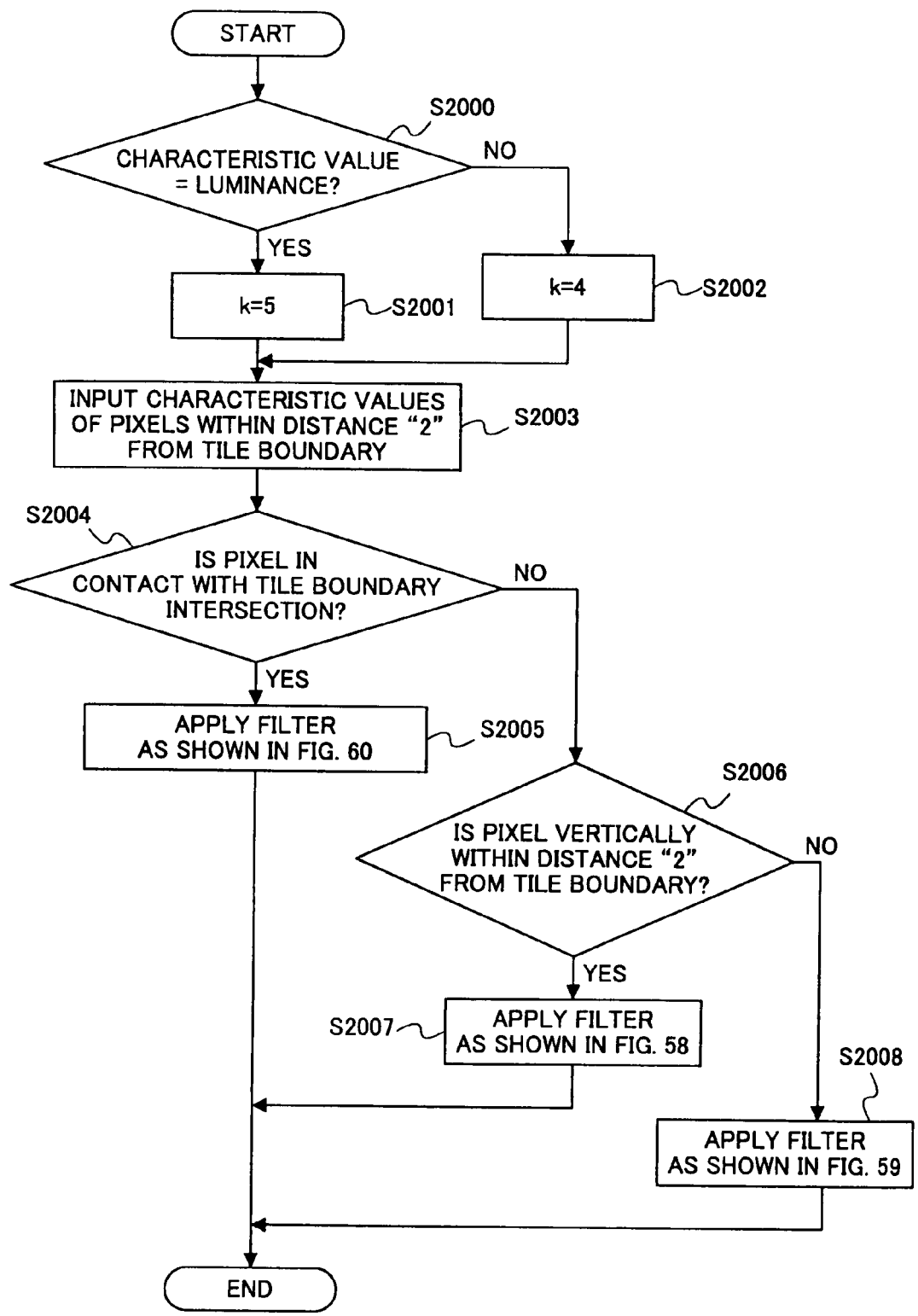
FIG. 57 is a flowchart for illustrating a process for smoothing a tile boundary according to the eighth embodiment of the present invention.

First, in step S2000 of FIG. 57, it is determined whether the characteristic value to be subjected to the low-pass filtering is a luminance component Y or a G component. If the characteristic value is a luminance component Y or a G component in step S2000, in step S2001, k is set to 5. If the characteristic value is a color difference component Cb or Cr, or a B or R component, in step S2002, k is set to 4. Here, k is a value for determining the weight of the low-pass filter at the target pixel position (or the weight of the center of the low-pass filter). Letting the pixel-boundary distance of the target pixel be d, the weight of the low-pass filter is given by k+64d. That is, in this case, the weight of the center of the low-pass filter is changed according to the pixel-boundary distance of the target pixel. Further, k=5 for the luminance component Y or the G component, and k=4 for the color difference component Cr or Cb, or the B or R component. That is, the weight of the center of the low-pass filter is changed according to the components.

Figure 58:
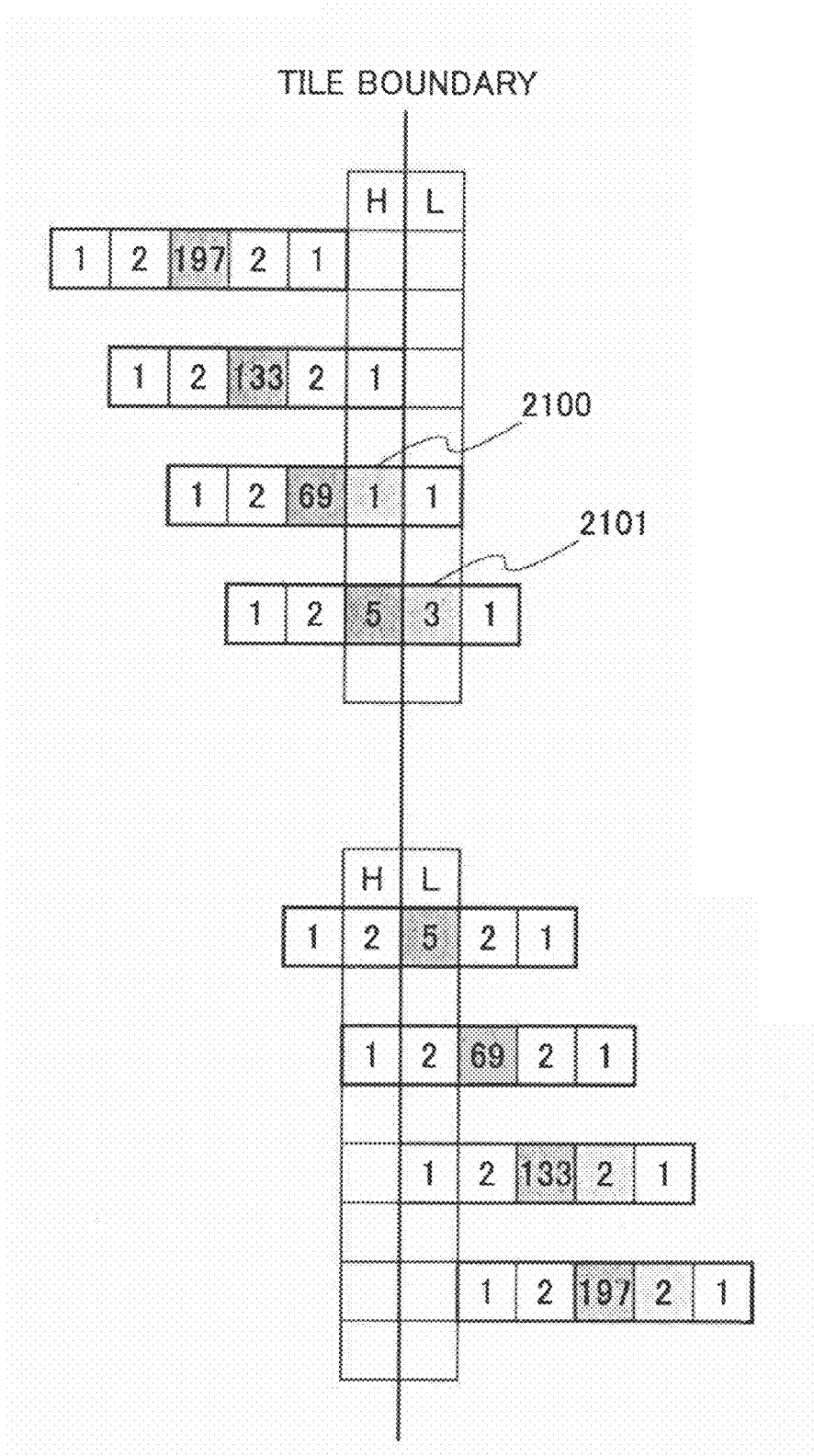
FIG. 58 is a diagram showing a configuration of a low-pass filter for application to a vertical tile boundary according to the eighth embodiment of the present invention.
Figure 59:
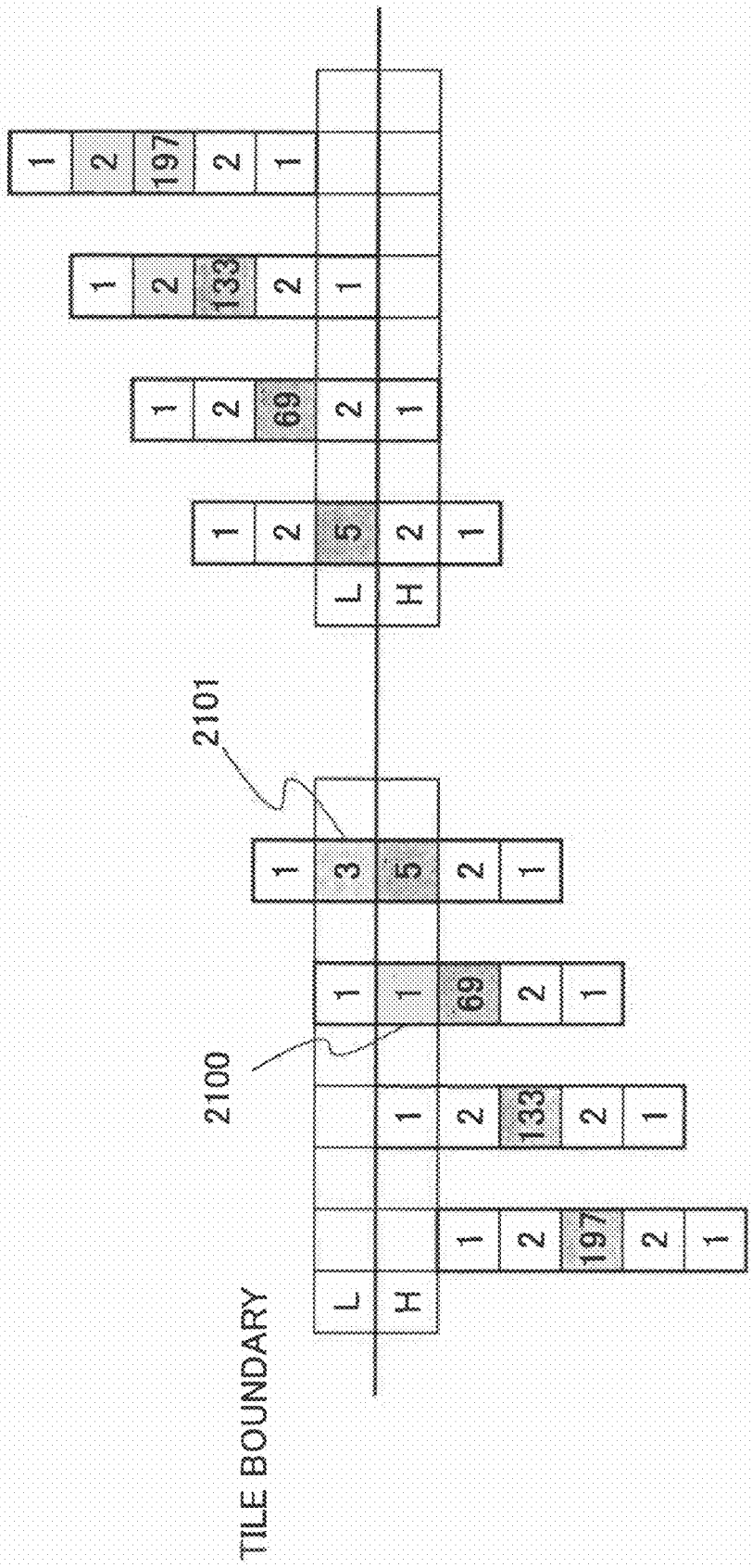
FIG. 59 is a diagram showing a configuration of the low-pass filter for application to a lateral tile boundary according to the eighth embodiment of the present invention.
Figure 60A:
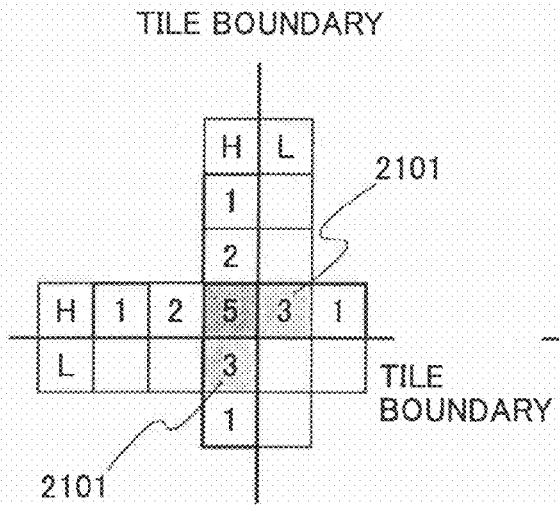
FIGS. 60A through 60D are diagrams showing configurations of the low-pass filter for application to a tile boundary intersection according to the eighth embodiment of the present invention.
Figure 60B:
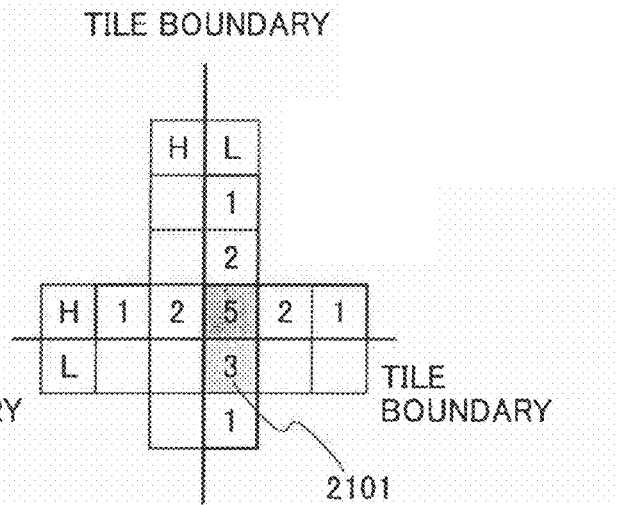
Figure 60C:
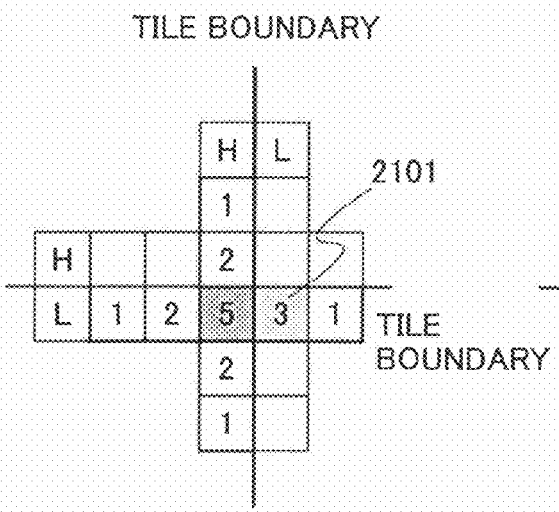
Figure 60D:
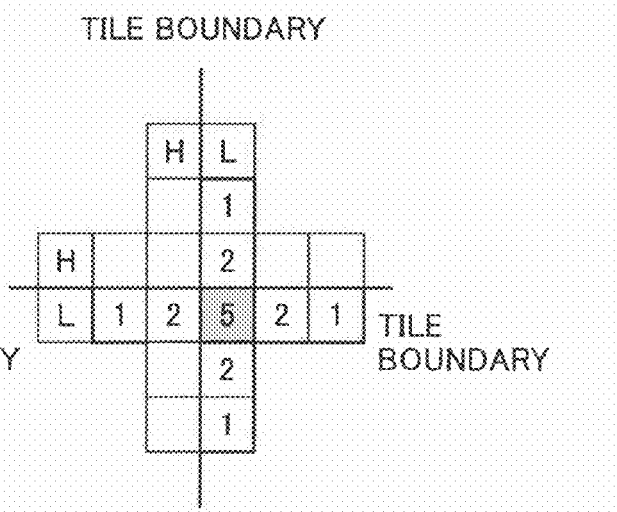

Next, in step S2003, the characteristic values of the pixels whose pixel-boundary distance is less than or equal to 2 are input. Then, in step S2004, it is determined whether the target pixel is in contact with a tile boundary intersection. If the target pixel is in contact with a tile boundary intersection in step S2004, in step S2005, the low-pass filter is applied with weighting factors as shown in FIGS. 60A through 60D. If the target pixel is not in contact with a tile boundary intersection, in step S2006, it is determined whether its pixel-boundary distance is vertically less than or equal to 2. If the pixel-boundary distance of the target pixel is vertically less than or equal to 2 in step S2006, in step S2007, the low-pass filter is applied with weighting factors as shown in FIG. 58. If the pixel-boundary distance of the target pixel is not vertically less than or equal to 2 in step S2006, in step S2008, the low-pass filter is applied with weighting factors as shown in FIG. 59. The weights of the center of the low-pass filter shown in each of FIGS. 58, 59, and 60 are the values in the case of applying the low-pass filter to the luminance component Y or the G component. Further, in the illustrated embodiment, the low-pass filter is applied in one-dimension or crisscrossed in order to reduce the amount of calculation. The low-pass filter may be applied two-dimensionally.

FIG. 58 shows that only in the case where the taps of the low-pass filter cross the tile boundary in the periphery of the right end of the tile, the weighting factors of the low-pass filter are made asymmetric in the direction of the tile boundary. Further, in order to reflect the sizes of the mean pixel value errors in the low-pass filter, the weight of the low-pass filter at an H coefficient position 2100 is reduced while the weight of the low-pass filter at an L coefficient position 2101 is increased. In the periphery of the left end of the tile, the low-pass filter is applied with symmetrically arranged weights even if the taps of the low-pass filter cross the tile boundary. The weights of the low-pass filter are set based on the same idea in the cases of FIGS. 59 and 60.

In the above-described case, all the components include a pixel to which the low-pass filter is applied with asymmetrically arranged weights. With respect to the luminance component Y, however, the low-pass filter may be applied with symmetrically arranged weights to all pixels. Such application of the low-pass filter is clearly understood from the above description, and a graphical representation thereof will be omitted.

Further, referring back to FIG. 55, it is also possible to determine the compression rate in step S1401. In this case, the low-pass filter may be applied with asymmetrically arranged weights only if the compression rate exceeds 20, and the low-pass filter may be applied less harmfully with symmetrically arranged weights if the compression rate is less than or equal to 20.

Further, in this case, if the compression rate is less than or equal to 20, k may be set to 5 for the luminance component Y or the G component and to 4 for the color difference component Cb or Cr, or the B or R component. If the compression rate exceeds 20, k may be set to 4 for the luminance component Y or the G component and to 3 for the color difference component Cb or Cr, or the B or R component. This is because generally, the degree of smoothing of the low-pass filter should be increased in proportion to the compression rate. The weights of the low-pass filter and the processing flow in this case are apparent from the above description, and a graphical representation thereof is omitted.

Figure 61:
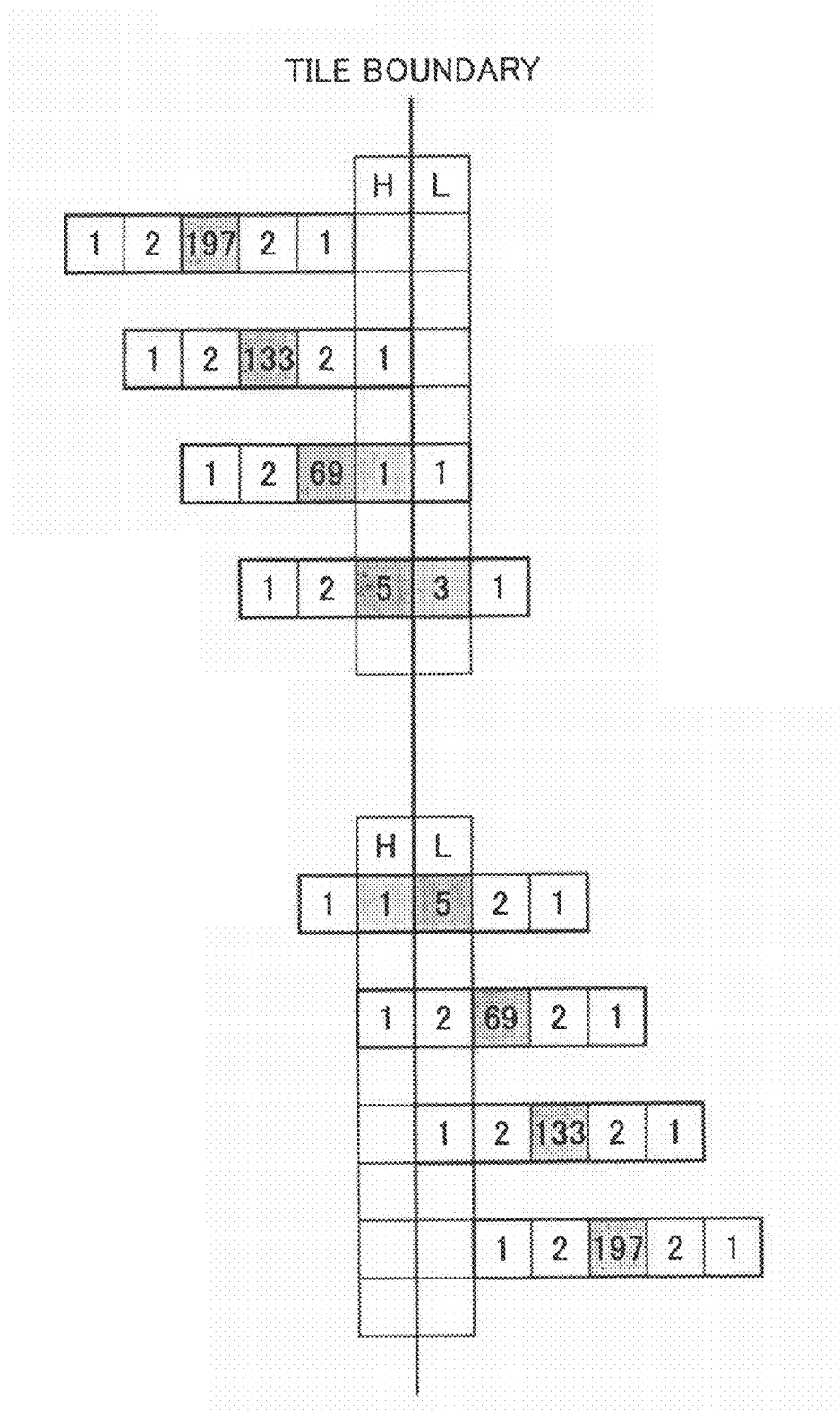
FIG. 61 is a diagram showing another configuration of the low-pass filter for application to the vertical tile boundary according to the eighth embodiment of the present invention.

Further, according to this embodiment, in order to give priority to accuracy over reduction in the amount of calculation, the low-pass filter may be applied with asymmetrically arranged weights even if the taps of the low-pass filter cross the tile boundary in the periphery of the left end of the tile as shown in FIG. 61.

Figure 62:
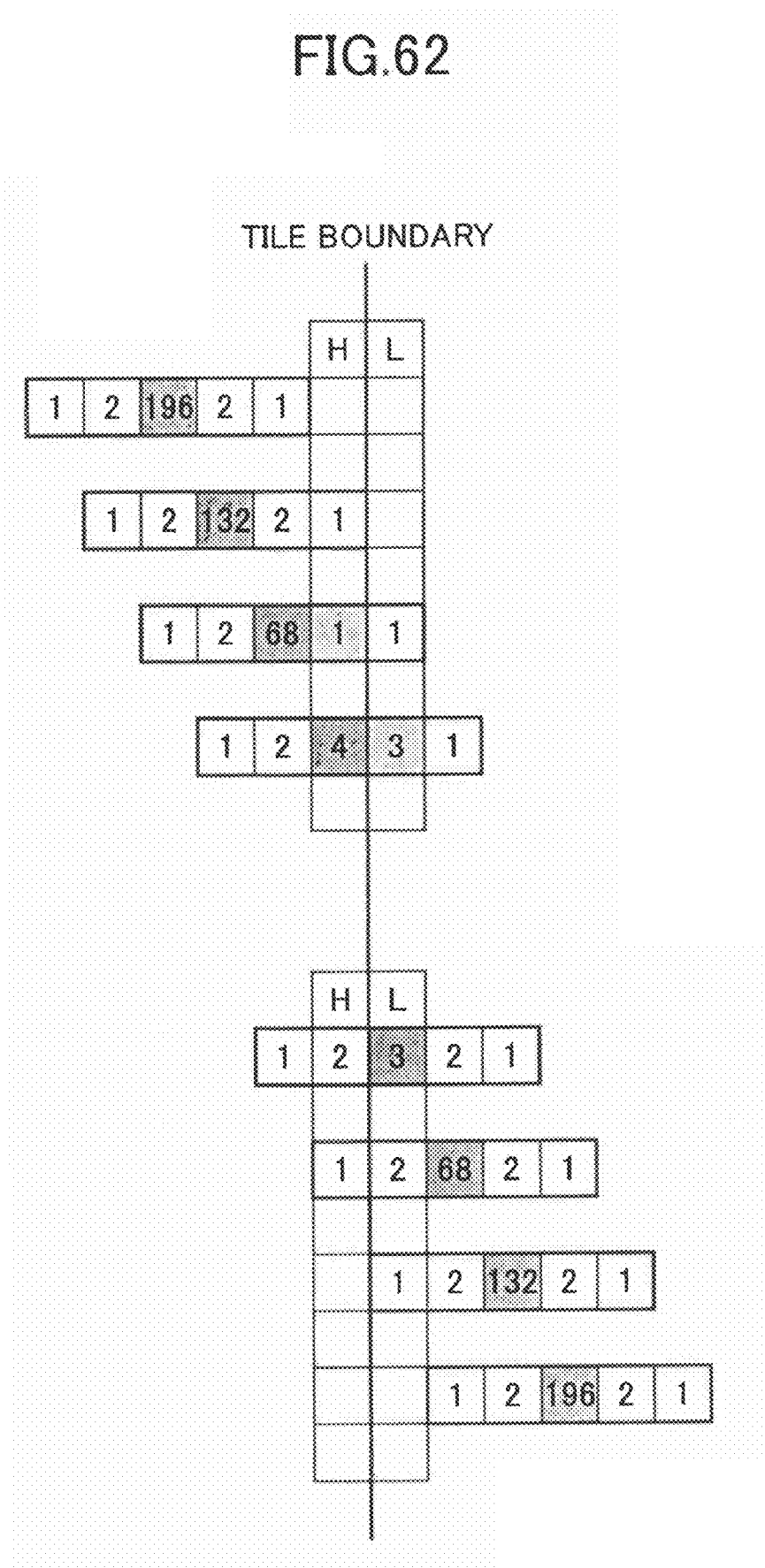
FIG. 62 is a diagram showing yet another configuration of the low-pass filter for application to the vertical tile boundary according to the eighth embodiment of the present invention.
Figure 63:
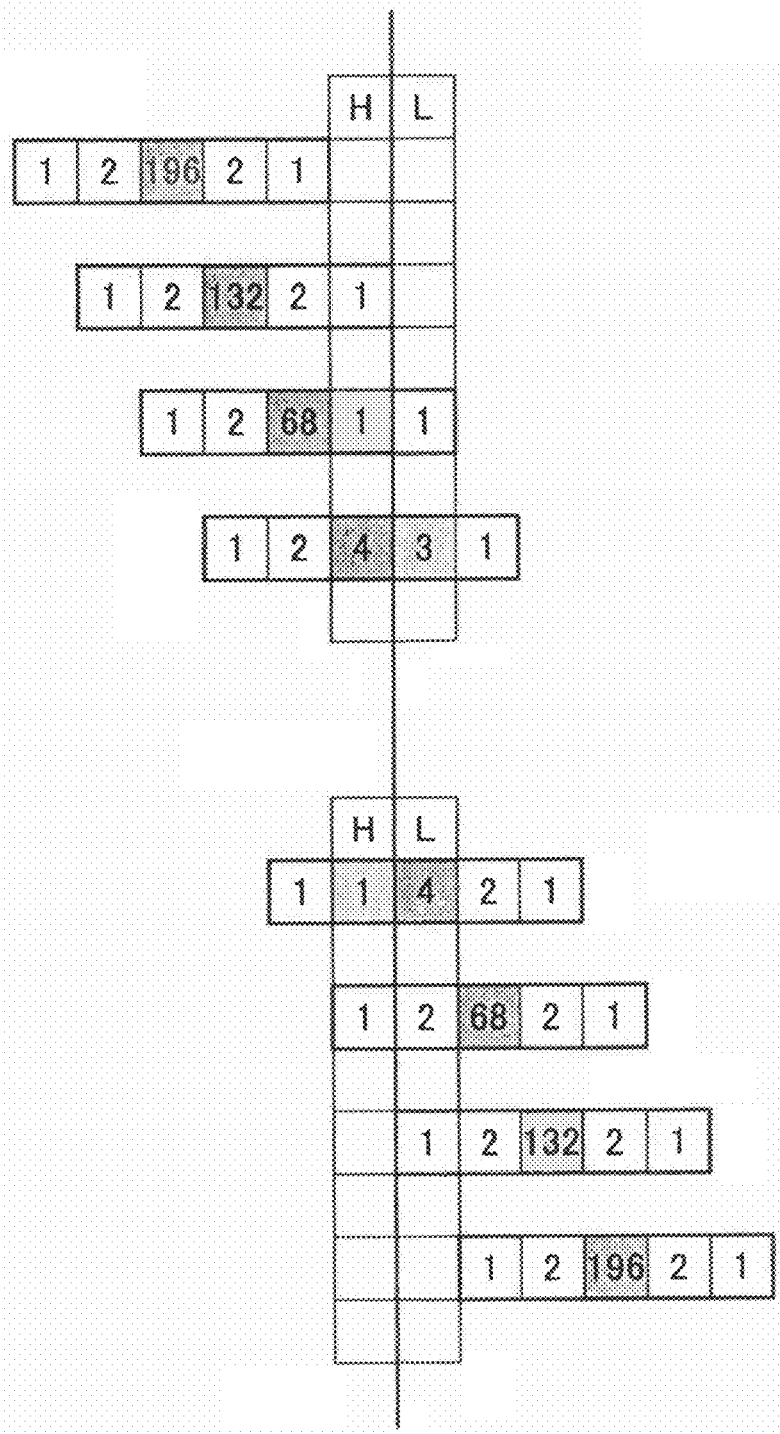
FIG. 63 is a diagram showing yet another configuration of the low-pass filter for application to the vertical tile boundary according to the eighth embodiment of the present invention.

In the case of 9×7 wavelet transform, the low-pass filter may be applied with a configuration as shown in FIG. 62 or 63. The configurations of the low-pass filter shown in FIGS. 62 and 63 are employable in the case of applying the low-pass filter to a vertical tile boundary. In FIGS. 62 and 63, the weight of the center of the low-pass filter is given by k+64d, where k=4 for the luminance component Y or the G component and k=3 for the color difference component Cb or Cr, or the B or R component. When the taps of the low-pass filter cross the tile boundary, the weight of the low-pass filter at an H coefficient position is reduced while the weight of the low-pass filter at an L coefficient position is increased. The configurations of FIGS. 62 and 63 may be rotated 90° to become configurations suitably employable in the case of applying the low-pass filter to a lateral tile boundary. The lateral configurations of FIGS. 62 and 63 and their vertical configurations may be combined into configurations suitably employable in the case of applying the low-pass filter to a tile boundary intersection as in the case of FIG. 60.

Further, in step S1401 of FIG. 55, the edge degree of each target pixel may be obtained by applying an edge degree calculation filter as shown in FIG. 64 to the target pixel, and the weight of the center of the low-pass filter shown in FIGS. 58 through 60 may be set as a function of the edge degree and the pixel-boundary distance. FIGS. 65A through 65C are diagrams showing configurations of the low-pass filter suitably employable in such a case. FIGS. 65A through 65C show a configuration for a vertical tile boundary, a configuration for a lateral tile boundary, and a configuration for a tile boundary intersection, respectively. In these configurations, in the case of d=0, the weight of the center of the low-pass filter m is given by m=5+abs(E) if abs(E)≧255, and is given by m=5 if abs(E)≦255. Here, abs(E) is the absolute value of the edge amount, that is, the edge degree, calculated by the edge degree calculation filter. In the case of d>0, m is given by max(5+64*d, 5+abs (E)). By thus controlling the weights of the low-pass filter, the tile boundary distortion can be suppressed effectively while preserving the edges existing in the original image. The configurations of the low-pass filter shown in FIGS. 65A through 65C are designed for the case of 5×3 wavelet transform.

Incidentally, the weighting factors of the low-pass filter are normalized so that the sum of the weights equal 1. That is, in the case of applying a low-pass filter with the weights of o p q
r s t
u v w to the center pixel (whose pixel value is e in the following pixel values) of the 3×3 pixels having the pixel values of a b c
d e f
g h i, the pixel values are multiplied by the weights that are normalized so that the sum of the weights equal 1. Therefore, if $\Sigma(o+p+q+r+s+t+u+v+w)=X$, the value of the center pixel after the low-pass filtering equals (ao+bp+cq+dr+es+ft+gu+hv+iw)/X. Likewise, in the case where the low-pass filter has a 1×n or crisscross mask shape, the weights of the low-pass filter are also normalized so that the sum of the weights equals 1.

The present invention also includes a program for causing a computer to execute the above-described steps or the corresponding functions according to this embodiment, and a variety of recording (storage) media recording the program. The program is not limited to an application program, but may be a device driver such as a printer driver.

The present invention is not limited to the specifically disclosed embodiments, and variations and modifications may be made without departing from the scope of the present invention.

The present application is based on Japanese priority applications No. 2002-208107, filed on Jul. 17, 2002, No. 2002-208156, filed on Jul. 17, 2002, and No. 2002-267692, filed on Sep. 13, 2002, the entire contents of which are hereby incorporated by reference.

What is claimed is:

1. An image decoder successively decoding a plurality of frames of an image, the frames each being hierarchically compressed and encoded through discrete wavelet transform on pixel values of each of tiles into which the frame is divided, the image decoder comprising:
   a tile boundary smoothing part configured to smooth a distortion of a tile boundary in each of the decoded frames;
   a mode selection part configured to select one of a first mode giving priority to image quality and a second mode giving priority to processing speed in the smoothing of the distortion of the tile boundary by the tile boundary smoothing part; and
   a tile boundary smoothing switching part configured to switch between the first mode and the second mode based on the selection by the mode selection part in the smoothing of the distortion of the tile boundary by the tile boundary smoothing part.

2. The image decoder as claimed in claim 1, wherein the tile boundary smoothing part is configured to perform low-pass filtering on a peripheral pixel of the tile boundary in each of the decoded frames in the second mode.

3. The image decoder as claimed in claim 1, wherein the tile boundary smoothing part is configured to perform low-pass filtering on a peripheral pixel of the tile boundary in each of the decoded frames based on a distance between the peripheral pixel and the tile boundary and an edge amount of the peripheral pixel in the first mode.

4. The image decoder as claimed in claim 3, wherein the edge amount of the peripheral pixel of the tile boundary is calculated in a diagonal direction.

5. The image decoder as claimed in claim 1, wherein the tile boundary smoothing part is configured to perform low-pass filtering on a peripheral pixel of the tile boundary in each of the decoded frames based on a distance between the peripheral pixel and the tile boundary, an edge amount of the peripheral pixel, and a ratio of a quantity of decoded codes to a quantity of all codes in the first mode.

6. The image decoder as claimed in claim 5, wherein the edge amount of the peripheral pixel of the tile boundary is calculated in a diagonal direction.

7. An image decoding method successively decoding a plurality of frames of an image, the frames each being hierarchically compressed and encoded through discrete wavelet transform on pixel values of each of tiles into which the frame is divided, the image decoding method comprising: using a processor to perform the steps of:

smoothing a distortion of a tile boundary in each of the decoded frames, wherein one of a first mode giving priority to image quality and a second mode giving priority to processing speed is selected in the smoothing of the distortion of the tile boundary; and a processing mode is switched between the first mode and the second mode based on said selection in the smoothing of the distortion of the tile boundary.

8. The image decoding method as claimed in claim 7, wherein the low-pass filtering is performed on a peripheral pixel of the tile boundary in each of the decoded frames in the second mode.

9. The image decoding method as claimed in claim 7, wherein low-pass filtering is performed on a peripheral pixel of the tile boundary in each of the decoded frames based on a distance between the peripheral pixel and the tile boundary and an edge amount of the peripheral pixel in the first mode.

10. The image decoding method as claimed in claim 9, wherein the edge amount of the peripheral pixel of the tile boundary is calculated in a diagonal direction.

11. The image decoding method as claimed in claim 7, wherein low-pass filtering is performed on a peripheral pixel of the tile boundary in each of the decoded frames based on a distance between the peripheral pixel and the tile boundary, an edge amount of the peripheral pixel, and a ratio of a quantity of decoded codes to a quantity of all codes in the first mode.

12. The image decoding method as claimed in claim 11, wherein the edge amount of the peripheral pixel of the tile boundary is calculated in a diagonal direction.

13. A computer-readable recording medium containing a program for causing a computer to execute the image decoding method as set forth in claim 7.

14. The computer-readable recording medium as claimed in claim 13, wherein the low-pass filtering is performed on a peripheral pixel of the tile boundary in each of the decoded frames in the second mode.

15. The computer-readable recording medium as claimed in claim 13, wherein low-pass filtering is performed on a peripheral pixel of the tile boundary in each of the decoded frames based on a distance between the peripheral pixel and the tile boundary and an edge amount of the peripheral pixel in the first mode.

16. The computer-readable recording medium as claimed in claim 15, wherein the edge amount of the peripheral pixel of the tile boundary is calculated in a diagonal direction.

17. The computer-readable recording medium as claimed in claim 13, wherein low-pass filtering is performed on a peripheral pixel of the tile boundary in each of the decoded frames based on a distance between the peripheral pixel and the tile boundary, an edge amount of the peripheral pixel, and a ratio of a quantity of decoded codes to a quantity of all codes in the first mode.

18. The computer-readable recording medium as claimed in claim 17, wherein the edge amount of the peripheral pixel of the tile boundary is calculated in a diagonal direction.

* * * * *

UNITED STATES PATENT AND TRADEMARK OFFICE
CERTIFICATE OF CORRECTION

| | | |
|---|---|---|
| PATENT NO. | : 7,522,778 B2 | Page 1 of 1 |
| APPLICATION NO. | : 11/980580 | |
| DATED | : April 21, 2009 | |
| INVENTOR(S) | : Suino et al. | |

It is certified that error appears in the above-identified patent and that said Letters Patent is hereby corrected as shown below:

On the title page, the Terminal Disclaimer information has been omitted. Item (45) and the Notice information should read as follows:

--(45) **Date of Patent: *Apr. 21, 2009**

( * ) Notice: Subject to any disclaimer, the term, of this patent is extended or adjusted under 35 U.S.C. 154(b) by 0 days.

This patent is subject to a terminal disclaimer.--

Signed and Sealed this

Twenty-sixth Day of May, 2009

JOHN DOLL
*Acting Director of the United States Patent and Trademark Office*